(12) United States Patent  
Arai et al.

(10) Patent No.: US 7,728,734 B2  
(45) Date of Patent: *Jun. 1, 2010

(54) ID LABEL, ID TAG, AND ID CARD

(75) Inventors: Yasuyuki Arai, Atsugi (JP); Mai Akiba, Isehara (JP); Yuko Tachimura, Atsugi (JP); Yohei Kanno, Atsugi (JP)

(73) Assignee: Semiconductor Energy Laboratory Co., Ltd, Atsugi-shi, Kanagawa-ken ( * ) Notice: Subject to any disclaimer, the term of this patent is extended or adjusted under 35 U.S.C. 154(b) by 0 days.

This patent is subject to a terminal disclaimer.

(21) Appl. No.: 12/336,611

(22) Filed: Dec. 17, 2008

(65) Prior Publication Data

US 2009/0128338 A1   May 21, 2009

Related U.S. Application Data

(63) Continuation of application No. 11/044,609, filed on Jan. 28, 2005, now Pat. No. 7,561,052.

(30) Foreign Application Priority Data

Feb. 4, 2004   (JP) .............................. 2004-027699

(51) Int. Cl.  
*G08B 13/14* (2006.01)
(52) U.S. Cl. ................................... 340/572.7; 235/492
(58) Field of Classification Search ............. 340/572.7, 340/572.8, 572.1; 235/487, 492
See application file for complete search history.

(56) References Cited

U.S. PATENT DOCUMENTS 5,378,536 A   1/1995   Miller et al.

(Continued)

FOREIGN PATENT DOCUMENTS

CN   1258252   6/2000

(Continued)

OTHER PUBLICATIONS

Nikkei Electronics, "*Sense of Crisis" is a trigger. Ignited evolution of a sesame-grain sized chip*, Nov. 18, 2002, pp. 67-76.

(Continued)

*Primary Examiner*—John A Tweel, Jr.  
(74) *Attorney, Agent, or Firm*—Eric J. Robinson; Robinson Intellectual Property Law Office, P.C.

(57) ABSTRACT

In commercial products to which a non-contact type or contact type ID label or ID tag is attached and ID cards, there is fear that, due to a difference between coefficients of thermal expansion between an antenna for communication and a resin provided around the antenna, stress is applied to the resin with the larger coefficient of thermal expansion to break the resin. This contributes to a decrease in manufacturing yield, lifetime, and reliability of an ID label or the like. In an article such as an ID label, an ID tag, and an ID card according to the present invention, a filler is included in a filling layer provided around an antenna forming an ID label, an ID tag, and an ID card so that the difference in coefficient of thermal expansion between the antenna and the filling layer can be reduced. This makes it possible to ease generation of stress due to the difference in coefficient of thermal expansion and prevent peeling and cracks of the filling layer.

24 Claims, 32 Drawing Sheets

U.S. PATENT DOCUMENTS

| | | |
|---|---|---|
| 5,389,438 A | 2/1995 | Miller et al. |
| 5,858,481 A | 1/1999 | Fukushima et al. |
| 6,073,856 A * | 6/2000 | Takahashi .................. 235/492 |
| 6,168,829 B1 | 1/2001 | Russ et al. |
| 6,377,176 B1 | 4/2002 | Lee |
| 6,509,217 B1 | 1/2003 | Reddy |
| 6,795,025 B2 | 9/2004 | Saito |
| 7,405,665 B2 | 7/2008 | Yamazaki |
| 7,561,052 B2 * | 7/2009 | Arai et al. ................ 340/572.7 |
| 2005/0045729 A1 | 3/2005 | Yamazaki |
| 2005/0210302 A1 | 9/2005 | Kato et al. |
| 2006/0177972 A1 | 8/2006 | Takeuchi et al. |
| 2008/0062451 A1 | 3/2008 | Yamazaki |

FOREIGN PATENT DOCUMENTS

| | | |
|---|---|---|
| EP | 0 443 263 | 8/1991 |
| EP | 0 607 709 A1 | 7/1994 |
| EP | 0 607 709 B1 | 7/1994 |
| EP | 0 607 709 B1 | 6/1998 |
| JP | 04-351685 | 12/1992 |
| JP | 06-299127 | 10/1994 |
| JP | 2992092 | 12/1999 |
| JP | 2001-30403 | 2/2001 |
| JP | 2001-118041 | 4/2001 |

OTHER PUBLICATIONS

Office Action (Chinese Application No. 200510009153.3) dated Sep. 19, 2008 with English translation.

"Nikkei Electronics, *"Sense of Crisis" is a Trigger. Ignited Evolution of a Sesame- Grain Sized Chip - Technology Development is Entering into the Second Phase*, Nov. 18, 2002, No. 835, pp. 67-76.".

* cited by examiner

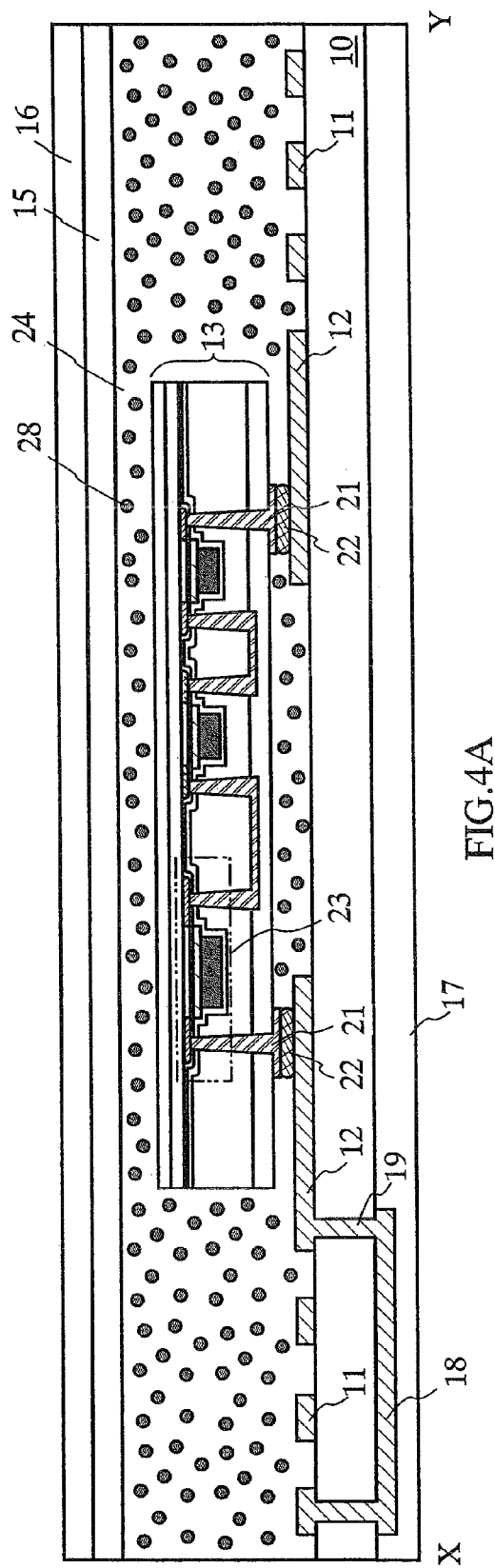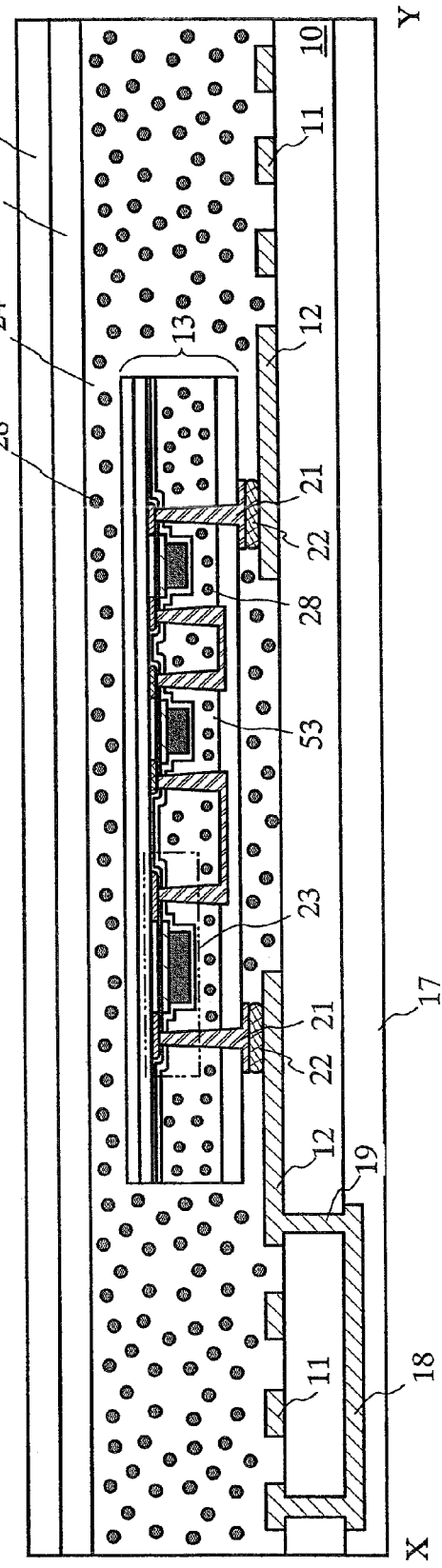
FIG.4A
FIG.4B

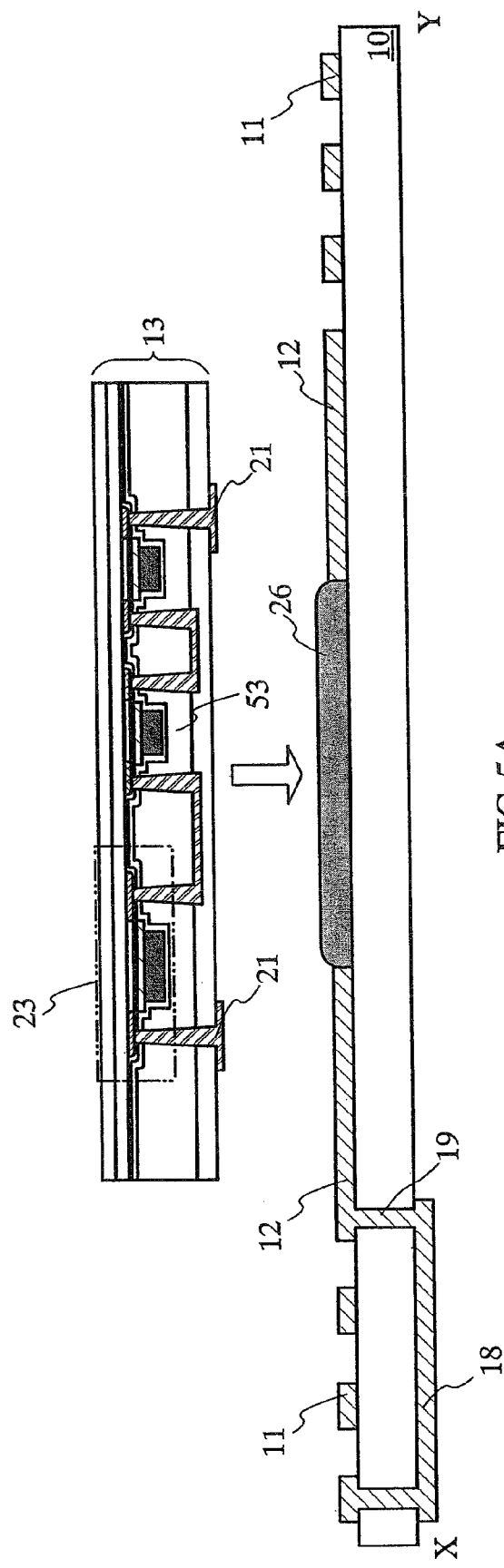
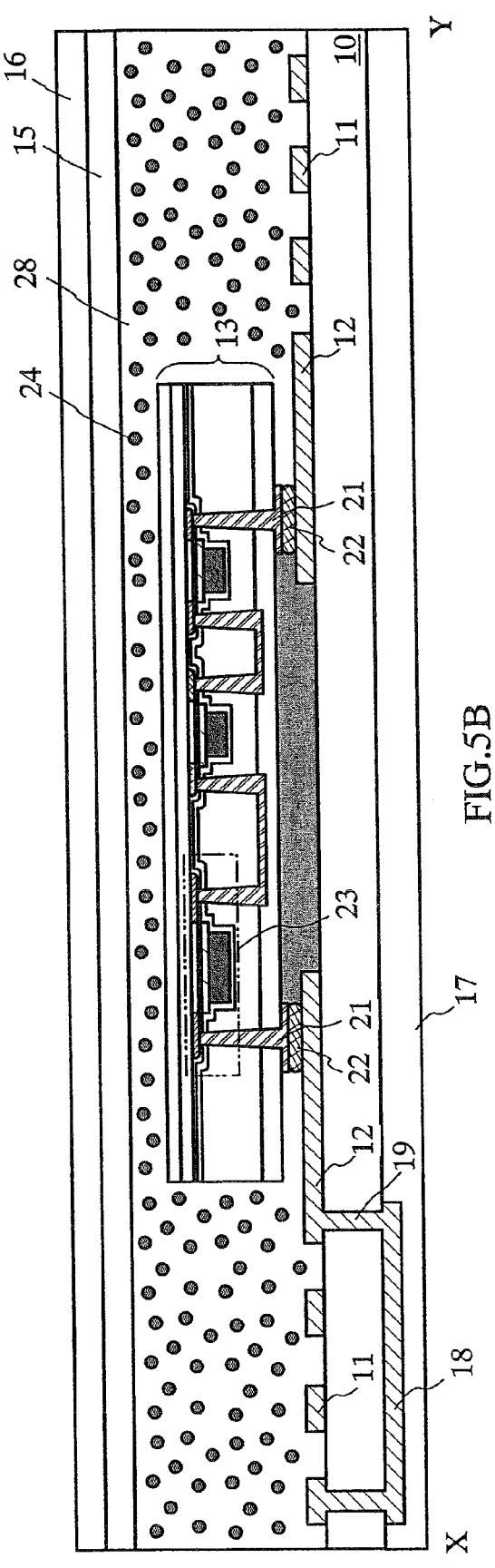
FIG.5A
FIG.5B

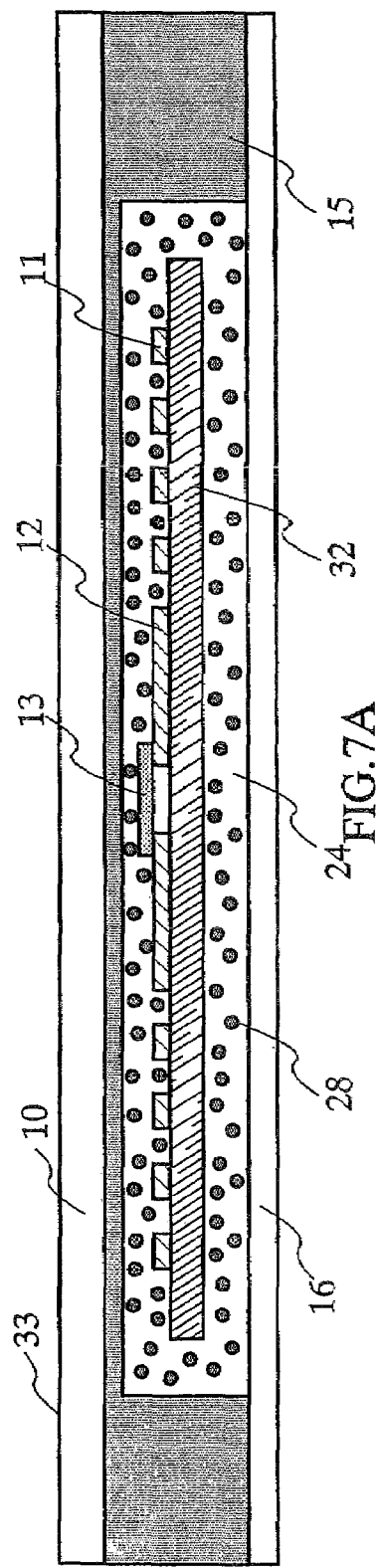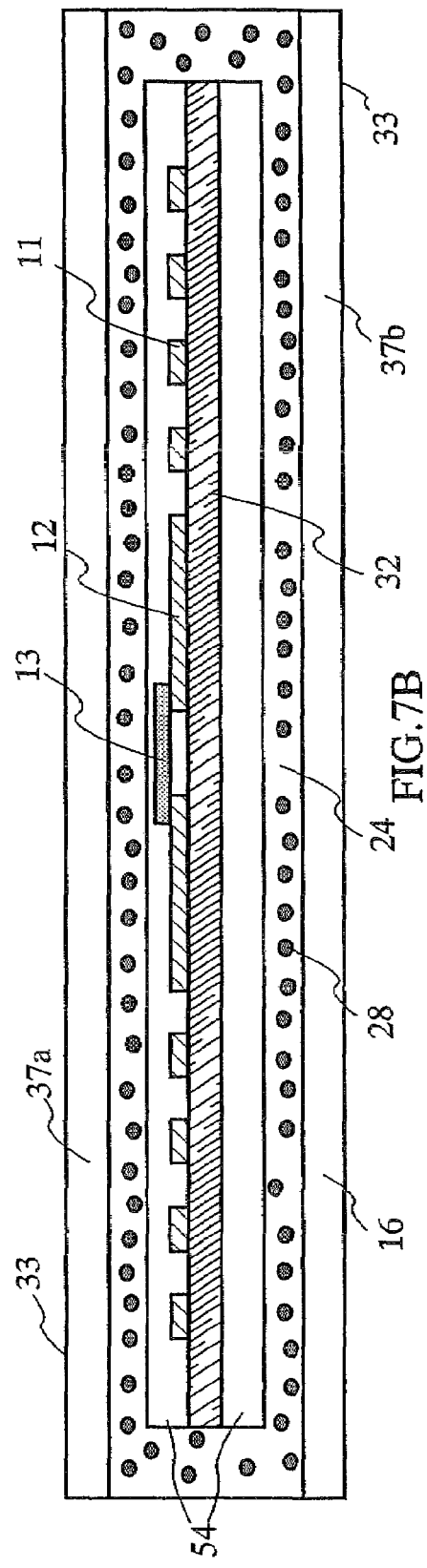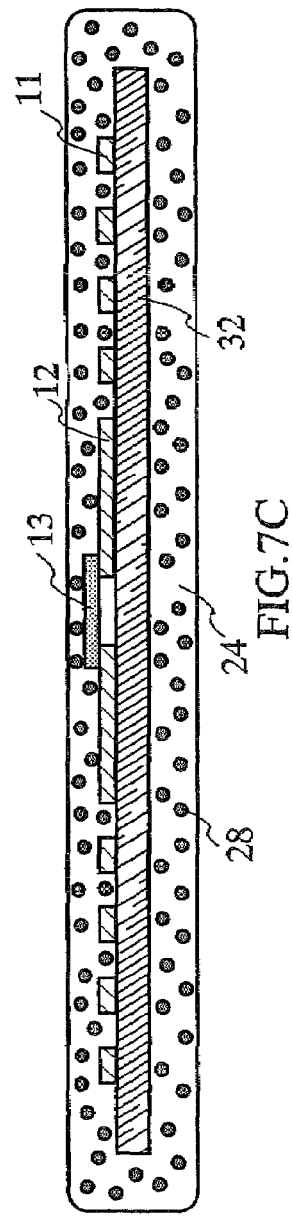

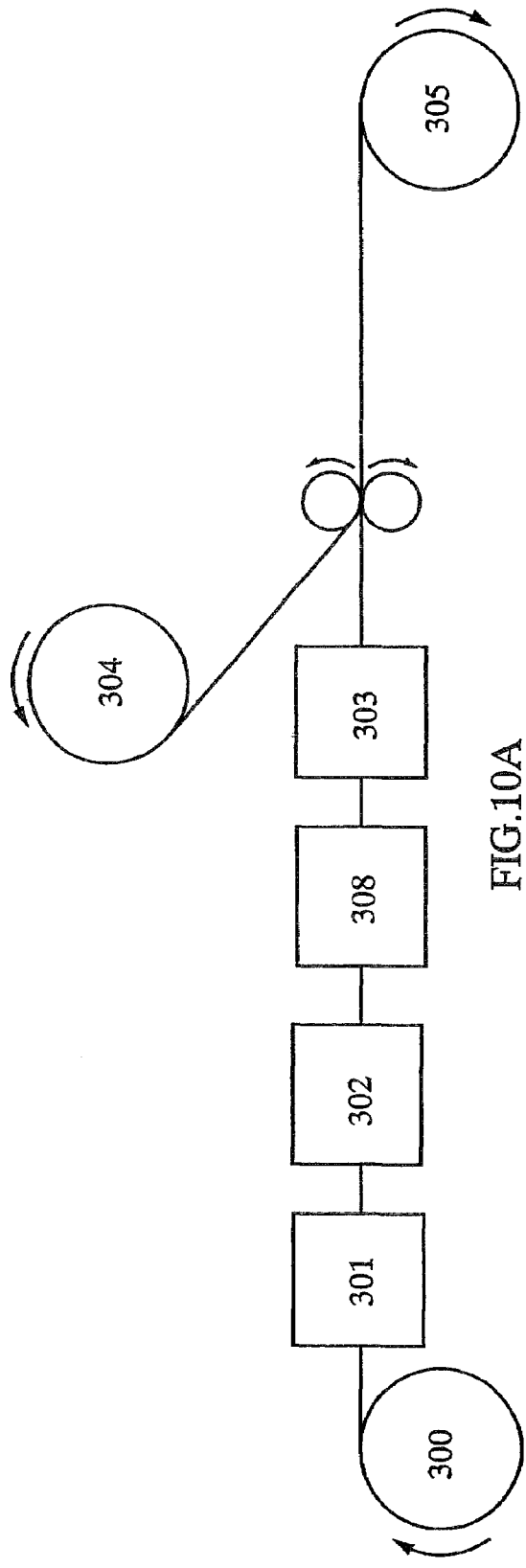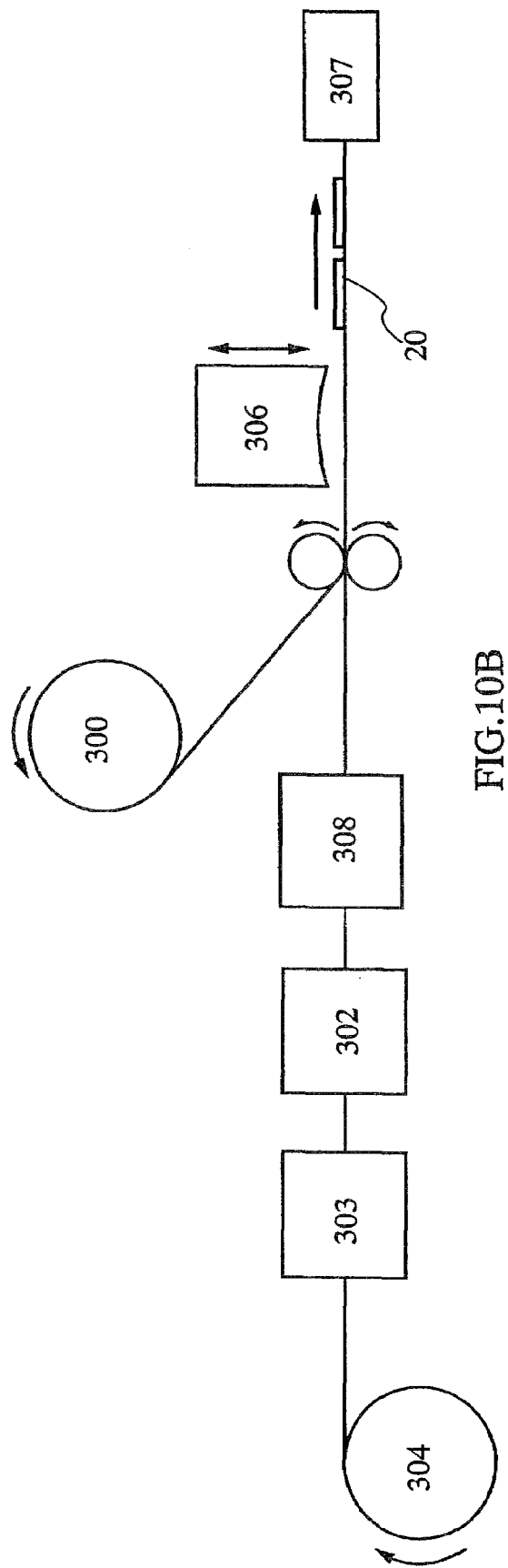

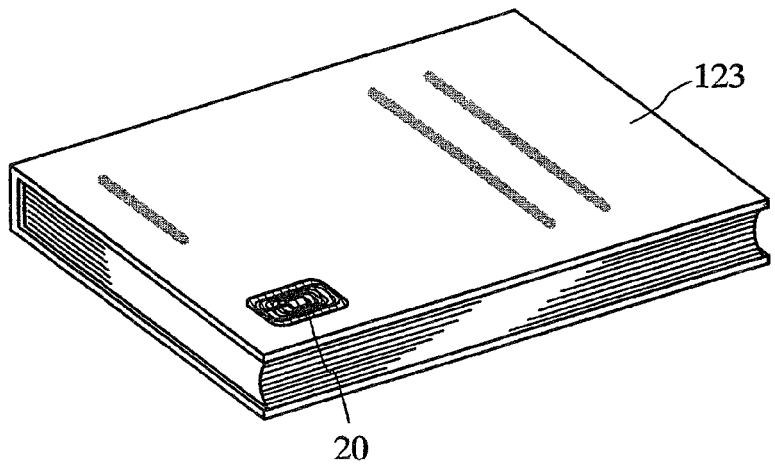
FIG.25A
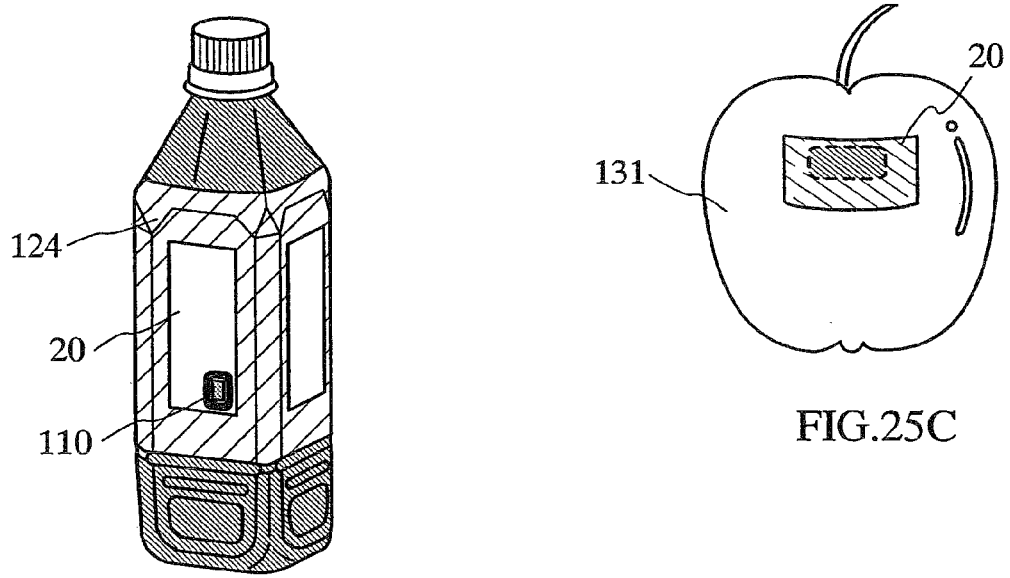
FIG.25B
FIG.25C
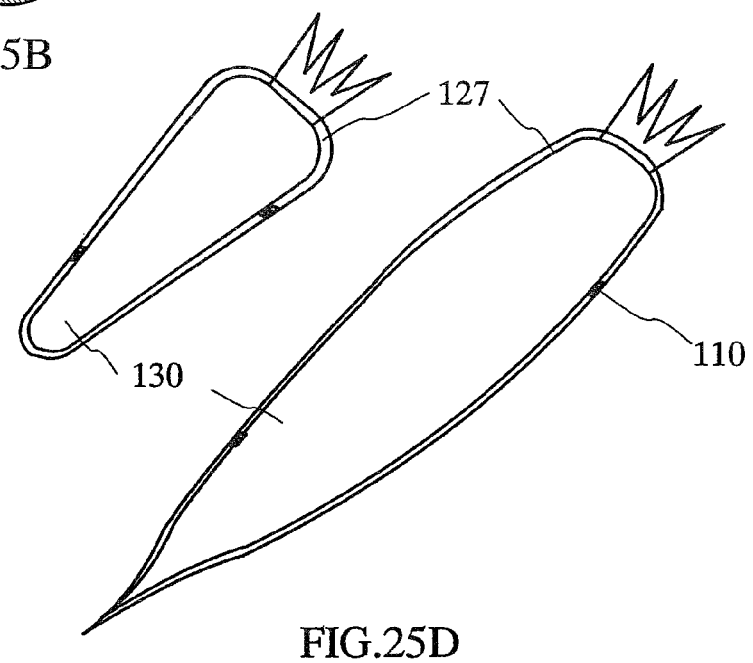
FIG.25D

ID LABEL, ID TAG, AND ID CARD

This application is a Continuation of U.S. application Ser. No. 11/044,609, now U.S. Pat. No. 7,561,052.

BACKGROUND OF THE INVENTION

1. Field of the Invention

The present invention relates an article carrying a quite thin-model thin film integrated circuit that functions as a memory, a microprocessor (a central processing part, a CPU, or a MPU), or the like. The article includes, for example, an ID label, an ID tag, and an ID card, mainly for identifying human beings, animals and plants, commercial products, and the like.

2. Description of the Related Art

Recently, in all kinds of industrial worlds such as food industry, manufacturing industry, or the like, calls have been heightened for strengthening safety and management systems of commercial products, and therewith, the amount of information on the commercial products are increasing. However, the current information on a commercial product is just information such as a country of manufacture, a manufacturer, an item number, or the like, mainly provided by ten and several figures of a bar cord, and the mount of information is quite small. Further, in the case of using a bar-code, carrying out by hand item by item makes reading of the bar-code require long time. Consequently, instead of the bar-code system, an automatic recognition technique by a non-contact IC tag utilizing an electromagnetic wave, referred to as RFID (Radio Frequency Identification), has been attracting attention.

In addition, in order to ensure safety (for example, a place of origin, or whether infected with an infectious disease or not) of animals and plants, a system is becoming common, in which IC chips are directly implanted into bodies of the animals and plants to obtain and manage information on the animals and plants by an information reading device (reader) outside the bodies.

In addition, the number of cards being carried per person has been recently growing, and above all, a non-contact IC card communicating by utilizing electromagnetic field is becoming common, for example, in forms of electronic money and electronic tickets (refer to Non-Patent Document 1).

(Non-Patent Reference 1) Nikkei Electronics (Nikkei Business Publications, Inc.) published on Nov. 18, 2002, pp. 67-76

SUMMARY OF THE INVENTION

Now, among commercial products and ID cards to which a non-contact type or contact type ID label or ID tag is attached, depending on the kinds, quite a lot of commercial products and ID cards are used in conditions with a wide range of temperature. In the case of attaching a non-contact type ID label or ID tag to that kind of commercial products, there is fear that, due to a difference between coefficients of thermal expansion of an antenna for communication and a resin provided around the antenna, stress is applied to the resin with the larger coefficient of thermal expansion to break the resin. In addition, in the case of attaching a contact type IC chip to the commercial products, there is fear again that, a resin is broken due to a difference between coefficients of thermal expansion of a contact electrode and the resin provided around the contact electrode. This naturally contributes to decrease in manufacturing yield, lifetime and reliability of an ID label or the like.

The present invention is made in view of the foregoing situation, and it is an object of the present invention to provide structures of an article such as an ID label, an ID tag, and an ID card and manufacturing processes thereof so that a resin covering an antenna or a contact electrode can be prevented from being broken due to stress even when an extreme difference in temperature is given to the ID label, the ID tag, and the ID card.

1) An ID label according to the present invention has a feature of having an antenna, a thin film integrated circuit device including a thin film transistor connected to the antenna, a filling layer including a filler provided around the antenna, an adhesive layer, and a separator.

2) An ID tag according to the present invention has a feature of having an antenna, a thin film integrated circuit device including a thin film transistor connected to the antenna, and a filling layer including a filler provided around the antenna.

An ID chip carrying an antenna, which is capable of radio communication, is also referred to as a wireless chip.

3) An ID card according to the present invention has a feature of having an antenna, a thin film integrated circuit device including a thin film transistor connected to the antenna, and a filling layer including a filler provided around the antenna.

The ID label, the ID tag, the ID card, and the wireless chip according to the present invention are also referred to as "a semiconductor device".

Each of the thin film integrated circuit devices of the ID label, the ID tag, the ID card according to the present invention has a feature of including a thin film active element (thin film nonlinear element) such as a thin film transistor (TFT). For example, in the case of using a TFT to manufacture the thin film integrated circuit devices, there is a feature that the thin film integrated circuit devices including the TFT can be mass-produced at low cost by forming the TFT on a substrate to be peeled and then peeling the substrate to be peeled to separate the devices. The method for the substrate is broadly classified into chemical peeling of removing a peel-off layer by a method such as etching or physical peeling of separating a peel-off layer by applying shock (stress) externally. However, the method is not limited to these.

The thin film integrated circuit device is a conception distinguished from a conventional "IC (Integrated Circuit) chip" formed on a silicon wafer, and indicates an integrated circuit device including thin film active elements typified by a TFT, a wiring connecting the thin film active elements to each other, and a wiring connecting the thin film active elements to an external structure (for example, an antenna in the case of a non-contact type ID label or a contact electrode in the case of a contact type ID label). Of course, the components of the thin film integrated circuit device are not to be considered limited to these. As long as at least one thin film active element typified by a TFT is included in a device, the device is referred to as a thin film integrated circuit device.

The thin film integrated circuit device used in the present invention, which is a thin film unlike a conventional IC chip, is referred to as an IDT chip (Identification Thin Chip) or the like. In addition, the thin film integrated circuit device to be used in the present invention, which uses not a silicon wafer but an insulating substrate such as a glass substrate or a quartz substrate in principle and can be transferred to a flexible substrate, as described later, is also referred to as an IDG chip (Identification Glass Chip), an IDF chip (Identification Flexible Chip), a soft chip, or the like. Hereinafter, "thin film integrated circuit device" may be referred to as "IDF chip", or the like.

The ID label (Identification Label) has functions of identifying commercial products distributed in the market and storing information on the commercial products, and is also referred to as an ID seal, an ID sticker, or the like. Basically, one side of the ID label is an adhesive side so that the ID label can be attached to commercial products and the like at will, and the ID label includes one that has a function of being capable of bonding repeatedly more than once. Of course, as long as belonging in categories such as a label, a seal, a sticker, a badge, and a marker from common sense, the ID label is not to be considered limited to these.

The antenna has a function of communicating with an external reader/writer or the like, which may be formed on a substrate forming the ID label, the ID tag, or the ID card or may be formed to be integrated with the thin film integrated circuit device. This substrate itself may be a substrate exposed to the outside or an unexposed substrate (internal substrate or inlet substrate). The substrate may have a single layer structure or a laminated structure, and the material thereof is not particularly limited. The substrate may play a role of covering or coating.

The ID tag has functions of identifying commercial products distributed in the market and storing information on the commercial products, just like the ID label. By mounting the ID label or the ID tag on commercial products, management of the commercial products becomes easier. For example, in the case where the commercial product is stolen, the thief can be figured out quickly by tracing the pathway of the commercial product. In this way, by providing the ID tag, commercial products that are superior in so-called traceability (in the case where a problem is caused at each step of complicated manufacturing or distribution making an arrangement by tracing the pathway to figure out the cause quickly) can be distributed. Further, in the fact of an increasing number of cases such as heinous crimes and disappearances, the ID tag can be used in order to recognize an individual for exactly grasping whereabouts of the individual particularly such as an infant, a pupil, or an old man constantly and reducing possibility of getting involved in an accident.

The ID card indicate a card including a minute thin film integrated circuit device that is capable of storing various information, and means all cards such as a cash card, a credit card, a prepaid card, an electronic ticket, electronic money, a telephone card, and a membership card.

The filler is a filling material or mixture that functions to decrease or increase the coefficient of thermal expansion of the filling layer. There are materials for the filler, which include, but not limited to, silica ($SiO_2$), alumina ($Al_2O_3$), boron nitride (BN), magnesia (magnesium oxide), aluminum nitride (AlN), silicon nitride, glass fiber (continuous glass fiber such as column-shaped glass rod), silicon oxide (for example, spherical silicon oxide), carbon fiber, calcium carbonate, talc (talcan), and mica. It is preferable to use a material that reduces a difference in coefficient of thermal expansion from a film forming the thin film active element such as a TFT or a conductive material of the antenna. This makes it possible to prevent peeling and cracks of the filling layer, which is generated by a difference in coefficient of thermal expansion between different materials with integration of antennas and TFTs. For example, in the case of using a resin as the filling layer, since the resin has a larger coefficient of thermal expansion (CTE) than a conductive material or a semiconductor material, by including the filler in the filling layer, the CTE of the resin can be made closer to those of the conductive material and the semiconductor material to reduce the thermal expansion. It is preferable that the filling layer has high forming properties (low viscosity, low thixotropy, high stability of viscosity, and optimized particle size), heat release characteristics, and high heat conduction.

Now, each of an ID label, an ID tag, and an ID card according to the present invention has an antenna formed on a substrate forming the ID label, ID tag, or the ID card, a thin film integrated circuit device which is including a thin film transistor and provided in contact with the antenna, and a filling layer which is including a filler and provided in contact with the substrate, to make it possible to reduce a difference in coefficient of thermal expansion between the filling layer and a conductive material of the antenna or between the filling layer and a film forming a thin film active element such as the TFT. Therefore, it is possible to ease stress caused by a difference in coefficient of thermal expansion between different materials so that peeling and cracks of the filling layer provided around and between the antenna and the TFT can be prevented.

Further, each of the thin film integrated circuit devices of the ID label, the ID tag, the ID card according to the present invention has a feature of including a thin film active element such as the TFT. Therefore, the thin film integrated circuit devices can be mass-produced at low cost by, for example, a method of forming the TFT on a substrate to be peeled and then peeling the substrate to be peeled to separate the devices. In addition, since the thin film integrated circuit devices are formed by using the thin film active element, the obtained ID label, ID tag, and ID card can be thinner as compared with conventional ID labels, ID tags, and ID cards.

Further, backgrinding is unnecessary unlike an IC chip formed on a conventional silicon substrate. Therefore, the process can be substantially simplified and the manufacturing cost can be substantially reduced. As the substrate to be peeled, a substrate that is more inexpensive than a silicon substrate, such as a glass substrate, a quartz substrate, a solar-cell grade silicon substrate can be used, and the substrate to be peeled can be used again, so that reduction in cost can be achieved.

Further, unlike an IC manufactured by using a silicon wafer, it is unnecessary to perform backgrinding causing cracks and scars by polishing, and non-uniformity in thickness of device, which depends on non-uniformity during deposition of each film and is approximately several hundreds nm at a maximum, can be remarkably reduced more as compared with a non-uniformity of several to several tens μm by backgrinding.

Further, the thin film integrated circuit device used in the present invention, which is quite thin (about 0.1 to 3 μm) as compared with a conventional IC chip with a thickness of about 0.06 mm (60 μm), is very suitable for inserting into thin articles particularly comprising paper or film-like resin as a chip. The IDF chip, which has a quite thin thickness, can be filled with an organic resin material to make a combined object. This makes it possible to prevent effect on the IDF chip due to bending stress.

The use of a highly elastic organic material as the filling layer particularly concentrates stress due to a deformation on an insulating film and protective film including an organic material, and then these films are mainly deformed. Therefore, stress applied on the thin film transistor is reduced. In addition, since a portion (such as an edge or a corner) on which stress is most applied when a deformation is caused is not an edge of a semiconductor film but an edge of a base film, stress concentration on an edge or interface of the semiconductor film can be suppressed.

As described above, according to the present invention, various articles such as the ID label, the ID tag, and the ID card, which can be mass-produced at low cost, is thinner, and is superior in functionality, can be provided.

BRIEF DESCRIPTION OF THE DRAWINGS

In the accompanying drawings:

FIGS. 4A and 4B are perspective views illustrating structures of ID labels according to the present invention (using an isotropic conductive film);

FIGS. 5A and 5B are perspective views illustrating structures of ID labels according to the present invention (using a non-conductive adhesive material layer);

FIGS. 7A to 7C are cross-sectional views illustrating structures of an ID label, an ID card, and an ID tag according to the present invention (using an internal substrate);

FIGS. 10A and 10B are pattern diagrams illustrating manufacturing lines of an ID label and the like according to the present invention;

FIGS. 25A to 25D are illustrating examples of commercial products to which an ID label or the like according to the present invention is attached;

DETAILED DESCRIPTION OF THE INVENTION

Embodiment modes and embodiments of the present invention will be described below with reference to the drawings. However, the present invention can be implemented in various different embodiments, and it is to be understood that various changes and modifications will be apparent to those skilled in the art. Therefore, unless otherwise such changes and modifications depart from the scope of the present invention, they should be construed as being included therein. For example, any of the embodiment modes and embodiments can be appropriately combined to implement the present invention. Therefore, the embodiment modes and embodiments are not intended as a definition of the limits of the invention.

Embodiment Mode 1

Figure 1A:
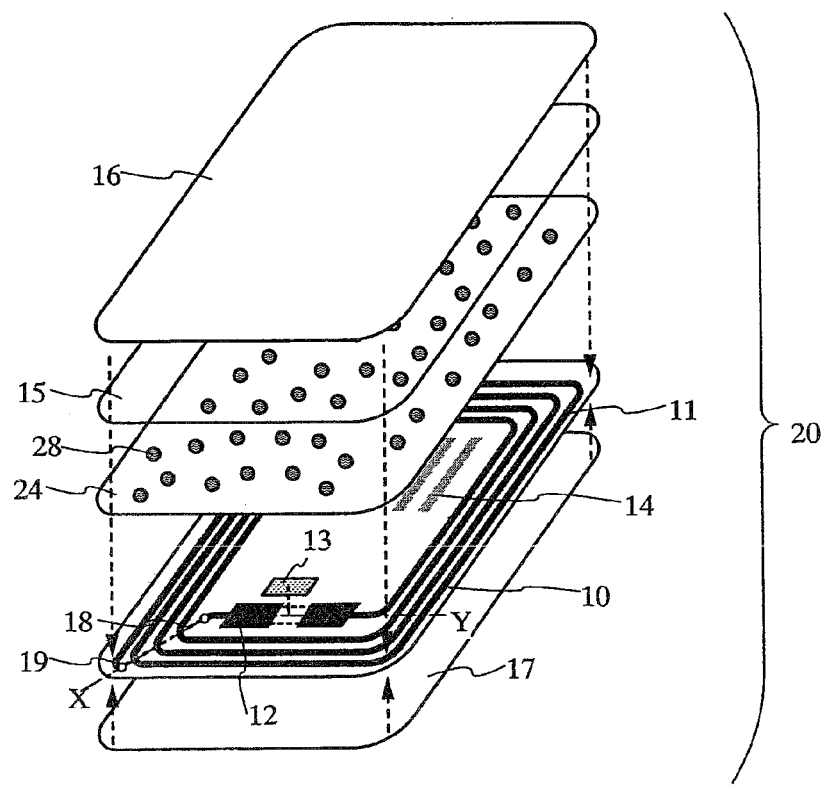
FIGS. 1A and 1B are perspective views illustrating structures of ID labels according to the present invention.

A structure and manufacturing method of an ID label according to the present invention will be described, mainly with reference to FIG. 1A, FIGS. 4A and 4B, and FIGS. 5A and 5B. FIG. 1A is a perspective view illustrating a structure of an ID label according to the present invention, where a substrate forming an ID label (generally referred to as "Tack Paper", but not limited to paper) portion to be attached to a commercial product or the like is shown below and a separator to serve as a board of the label is show above for the sake of convenience.

FIG. 1A shows a case, where an antenna 11 and a connecting pad 12 that is a connecting portion connecting the antenna and a thin film integrated circuit device are formed in advance on a substrate 10 forming the ID label (hereinafter, which may be referred to as simply "a substrate" or "a label substrate"), and then, a thin film integrated circuit device 13 formed separately is attached to the label substrate. On a surface (a backside in the figure) of the label substrate, print 14 such as characters, symbols, or drawings is given according to need. In the case of desiring a so-called hybrid type ID label that has non-contact type and contact type functions at once, a wiring pattern forming a connecting terminal may be formed by a method such as printing.

Next, a filling layer 24 including a filler 28 is formed in contact with the substrate 10 on which the antenna 11 and the thin film integrated circuit device 13 are formed. In the drawings attached to the specification, the each filler is drawn in an exaggerated form as for the size thereof. As the filling layer 24, photosensitive or non-photosensitive organic materials such as epoxy, polyimide, acrylic, polyamide, resist, and benzocyclobutene, and heat-resistant organic resins such as siloxane (a material that has a skeleton formed by a bond of silicon (Si) and oxygen (O) and includes at least hydrogen as a substituent or at least one selected from the group consisting of fluoride, an alkyl group, and aromatic hydrocarbon as the substituent) can be used. As a forming method thereof, a method such as spin coating, dipping, spraying, or droplet discharge (for example, inkjet, screen printing, offset printing, or gravure printing), a doctor knife, a roll coater, a curtain coater, or a knife coater can be employed depending on the material. The filling layer 24 may have a single-layer structure including the material mentioned above or may have a laminated structure using the materials mentioned above in combination.

There are materials for the filler 28, which include, but not limited to, silica, alumina, boron nitride, magnesia, aluminum nitride, silicon nitride, glass fiber, silicon oxide, carbon fiber, calcium carbonate, talc, and mica. It is preferable to use a material that reduces a difference in coefficient of thermal expansion from a film forming a thin film active element such as a TFT or a conductive material of the antenna. The filling layer 24 also has a function of protecting the substrate 10. The filling layer may be formed to cover the substrate entirely or may be formed to cover a portion thereof the substrate.

Now, an advantage of the filling layer 24 including the filler 28 such as silicon oxide will be briefly described in the case of using epoxy resin (coefficient of thermal expansion: approximately $25 \times 10^6$ to $90 \times 10^6/°C$.) as the filling layer 24 and Cu (coefficient of thermal expansion: $16.5 \times 10^6/°C$.) as a conductive material of the antenna 11. In the case where 50 weight % of filler is included in the epoxy resin, the coefficient of thermal expansion thereof is decreased to about half (approximately $12.5 \times 10^6$ to $45 \times 10^6/°C$.). Further, in the case where 75 weight % of filler is included in the epoxy resin, the coefficient of thermal expansion thereof is decreased to about one third (approximately $8 \times 10^6$ to $30 \times 10^6/°C$.). However, as the filler content is more increased, the viscosity of the epoxy resin is more enhanced to decrease the forming properties thereof. Therefore, it is preferable that the filler content is limited to 75 weight % or less. On that basis, as long as the coefficient of thermal expansion of the resin including the filler 28 can be reduced to less than or equal to twice the coefficient of thermal expansion of the conductive material of the antenna, stress due to a difference between the coefficients of thermal expansion can be sufficiently prevented from being generated.

In addition, a combination of a conductive material with a higher coefficient of thermal expansion and a resin with a lower coefficient of thermal expansion can reduce the filler content. The conductive material with the higher coefficient of thermal expansion typically includes, in addition to Cu, Ag (coefficient of thermal expansion: $19.6 \times 10^6/°C$.), Al (coefficient of thermal expansion: $24.6 \times 10^6/°C$.), Sn (coefficient of thermal expansion: $21 \times 10^6/°C$.), Zn (coefficient of thermal expansion: $30 \times 10^6/°C$.), Pb (coefficient of thermal expansion: $29 \times 10^6/°C$.), Au (coefficient of thermal expansion: $14.2 \times 10^6/°C$.) or the like. The resin with the lower coefficient of thermal expansion typically includes, in addition to epoxy resin, silicone resin (approximately $5 \times 10^6$ to $55 \times 10^6/°C$.), alkyd resin (approximately $15 \times 10^6$ to $55 \times 10^6/°C$.), amino resin (approximately $10 \times 10^6$ to $60 \times 10^6/C$), phenol resin (approximately $15 \times 10^6$ to $125 \times 10^6/°C$.), and allyl resin (approximately $25 \times 10^6$ to $115 \times 10^6/°C$.).

In the case of providing the filling layer 24 only in a portion connecting the thin film integrated circuit device 13 and the antenna 11, a conductive filler may be used. As the conductive filler, typically, metal based conductive fillers such as silver powder, copper powder, nickel powder, and copper powder coated with silver, non-metal based conductive fillers, and carbon based conductive fillers can be used. Of course, the conductive filler is not to be considered limited to these.

For the thin film integrated circuit device 13, a thin film active element such as a TFT is used. A specific structure and manufacturing method of a TFT will be described later. The thin film integrated circuit device 13, which is formed by using the thin film active element such as a TFT, can be made to be a film thickness (except the thickness of a protective film in the case of forming the protective film above and below a TFT) of about 5 μm or less, and is preferably made to be 0.1 to 3 μm. The size of the IDF chip is made to have an area of 25 mm² or less, preferably 0.09 mm² to 16 mm². The protective film above and blow the TFT is preferably formed to have a larger size than the IDF chip.

Further, the substrate 10 with the filling layer 24 provided is attached to a separator 16 with an adhesive material layer 15 interposed therebetween to complete an ID label 20.

As the substrate 10 forming the ID label 20, typically, resin materials such as paper, synthetic paper, plastics, PET, polypropylene, polyethylene, polystyrene, and nylon, inorganic materials, or the like can be used. However, the substrate 10 is not to be considered limited to these. In order for the ID label to enable being attached to not only a commercial product of a flat shape but also commercial products of various shapes, it is preferable to use a flexible material for the label substrate. As a resin material, for example, a high density polyethylene (HDPE) described in Japanese Patent Application Laid-Open 2001-30403 can also be used. Alternatively, two or more kinds of the above-mentioned materials may be combined and used.

As conductive materials to be used for the antenna 11 and the connecting pad 12, a metal such as Ag, Au, Al, Cu, Zn, Sn, Ni, Cr, Fe, Co, or Ti and an alloy including the metal can be used. Of course, the conductive materials are not to be considered limited to these. However, it is preferable to use Al in view of workability and cost. The film thicknesses thereof are preferably 5 to 60 μm.

The materials of the antenna 11 and the connecting pad 12 may be different from each other. The antenna 11 and the connecting pad 12 may be formed by patterning after forming the conductive material all over by sputtering, or may be selectively formed directly by droplet discharge. The above-mentioned materials may be laminated to form the antenna 11 and the connecting pad 12. After forming a conductive pattern by using these methods, a conductive material that is identical to or different from the connecting pattern may be formed by plating. Through the specification, a connecting pad portion may be provided on the side of a TFT.

The antenna 11 and the connecting pad 12 are formed to have a metal material with malleability and ductility, and more preferably, the film thicknesses are made thicker to withstand stress due to a deformation. In order to surely connect the thin film integrated circuit device 13, it is preferable to form the connection pad 12 as far as possible.

For the adhesive material layer 15, known materials such as cyanoacrylate materials that react with a slight amount of water in the air to become hardened (mainly used as an instant adhesive), vinyl acetate resin emulsions, rubber materials, vinyl chloride resin materials that is transparent, dry quickly, and water-resistant, vinyl acetate solution materials, epoxy materials, and hot-melt (thermal melting type) materials can be employed. Of course, the adhesive material layer is not to be considered limited to these as long as a material is adhesive. In the case of peeling and attaching again after attaching the ID label to a commercial product or the like, an adhesive material that can be attached and detached repeatedly, which is used for products such as "Post-it" (registered trademark) manufactured by THREE M INNOVATIVE PROPERTIES and "NOTESTIX" (registered trademark) manufactured by MOORE BUSINESS FORMS INC., may be used. For example, an acrylic adhesive, a synthetic rubber adhesive, and a natural rubber adhesive, described in Japanese Patent Application Laid-Open No. 2001-30403, Japanese Patent No. 2992092, and Japanese Patent Application Laid-Open No. 6-299127, can be used.

As the separator 16, resin materials such as paper, synthetic paper, plastics, PET, polypropylene, polyethylene, polystyrene, and nylon, and inorganic materials can be used. However, the separator 16 is not to be considered limited to these. The print 14 may be formed on the label substrate by a method such as known printing. As the thin film integrated circuit device 13, typically, a chip including a thin film active element such as a TFT can be used. A specific structure and manufacturing method thereof will be described later.

FIGS. 4A and 4B and FIGS. 5A and 5B show cross-sectional views of the label substrate in FIG. 1A along the line X-Y. In the thin film integrated circuit device 13, a plurality of TFTs 23 is formed, and further, a connecting wiring 21 for connecting to the antenna 11 is formed. For the connecting wiring 21, various materials can be selected. Typically, silver (Ag), copper (Cu), gold (Au), nickel (Ni), platinum (Pt), chromium (Cr), tin (Sn), palladium (Pd), iridium (Ir), rhodium (Rh), ruthenium (Ru), rhenium (Re), tungsten (W), aluminum (Al), tantalum (Ta), indium (In), tellurium (Te), molybdenum (Mo), cadmium (Cd), zinc (Zn), iron (Fe), titanium (Ti), silicon (Si), germanium (Ge), zirconium (Zr), barium (Ba), antimonial lead, tin oxide-antimony, fluorine-doped zinc oxide, carbon, graphite, glassy carbon, lithium, beryllium, sodium, magnesium, potassium, calcium, scandium, manganese, zirconium, gallium, niobium, a sodium-potassium alloy, mixtures such as a magnesium/copper mixture, a magnesium/silver mixture, a magnesium/aluminum mixture, a magnesium/indium mixture, an aluminum/aluminum oxide mixture, and a lithium/aluminum mixture, particles or dispersed nanoparticles of silver halide, and indium tin oxide (ITO), zinc oxide (ZnO), gallium-doped zinc oxide (GZO), indium zinc oxide (IZO) of indium oxide mixed with zinc oxide at 2 to 20%, an organoindium compound, an organic tin compound, and a conductive material of ITO including silicon oxide (hereinafter, referred to as "ITSO" for descriptive purposes), which are used as a transparent conductive film, can be used. Also, a connecting wiring 21 is formed by laminating layers consisted of these material.

In order to connect to the antenna 11 easily, the connecting wiring 21 may have a shape like a comb, or a comb-shaped conductor may be formed separately.

FIGS. 4A and 4B are cases, where the connecting wiring 21 of the thin film integrated circuit device 13 and the connecting pad 12 of the label substrate are connected with an anisotropic conductive film (hereinafter, which may be referred to as simply "ACF" or an anisotropic conductive paste (ACP)) 22 provided therebetween. As in the present embodiment mode, a method of attaching a thin film integrated circuit device upside down is referred as facedown.

The ACF have a structure in which conductive particles are dispersed in a layer including a main component forming an adhesive material, which is referred to as a binder layer. Therefore, conduction can also be ensured at the same time as bonding the thin film integrated circuit device 13 and the connecting pad 12. As described later, after manufacturing a plurality of thin film integrated circuit devices, the devices are separated from each other by dicing or the like, and each thin film integrated circuit device is carried with the use of, for example, small vacuum tweezers, so that the thin film integrated circuit device can be attached to a desired portion of the label substrate.

Next, the cross-sectional structure of the antenna will be described. In the present embodiment mode, a case of an electromagnetic induction type and a non-contact type ID label using a coiled antenna, as shown in FIG. 1A, will be described. As for current flowing through the antenna, when the coiled antenna is made to come close to a magnetic field generated from a reader/writer (hereinafter, which may be referred to as simply "R/W"), which is not shown in the figure, current flows in the closed-loop of the coil by electromagnetic induction to start the thin film integrated circuit device 13. Therefore, it is necessary that the thin film integrated circuit device 13 is connected to both ends (for example, outer and inner ends) of the antenna, as shown in FIG. 1A.

In this case, in order to prevent antennas from shorting out together, a crossed wiring 18 as shown in FIG. 1A and FIGS. 4A and 4B is provided to connect the thin film integrated circuit device 13 and the outer end through a contact portion 19. The contact portion 19 is preferably provided in the label substrate in advance. The crossed wiring 18 may be formed with the use of a conductive material that is identical to or different from the antenna 11. The forming method thereof is not particularly limited. The crossed wiring 18 can be formed just like the antenna.

As shown in FIG. 4B, the filler 28 may be included also in an interlayer film 53 of the thin film integrated circuit device 13. This makes it possible to decrease a difference in coefficient of thermal expansion between a film forming the TFT 23 and the interlayer film 53 and prevent peeling of the interlayer film 53. Further details will be described later.

FIGS. 5A and 5B show a case, where the thin film integrated circuit device 13 and the label substrate 10 are bonded with a non-conductive adhesive material layer 26, and the connecting wiring 21 of the thin film integrated circuit device 13 and the connecting pad 12 are directly connected to each other. For the adhesive material layer 26, the above-mentioned materials that can be used for the adhesive material layer 15 can be used. Each separated thin film integrated circuit device can be attached to a desired portion of the label substrate by carrying with the use of, for example, small vacuum tweezers. Also in the case of FIGS. 5A and 5B, the filler 28 may be included in an interlayer film of the TFT 23 in the thin film integrated circuit device 13.

As a method for bonding the thin film integrated circuit device 13 and the label substrate 10, a method other than the methods shown in FIGS. 4A and 4B and FIGS. 5A and 5B can be employed. For example, not shown in a figure, there are a method of using a double-sided adhesive tape and a method of forming a resin to cover the thin film integrated circuit device.

In the present embodiment mode, since the crossed wiring 18 is exposed outside the label substrate 10, a coating layer 17 for planarization of the surface of the label substrate 10 may be formed (refer to FIG. 1A, FIG. 4B, and FIG. 5B). For the coating layer 17, for example, transparent resin materials such as plastics, PET, polypropylene, polyethylene, polystyrene, and nylon, DLC (diamond-like carbon), or the like can be used.

In the present embodiment mode, the antenna structure using an electromagnetic induction type is employed. However, any of an electromagnetic coupling type using mutual induction of a coil due to an AC magnetic field, a microwave type transmitting and receiving data with microwave (2.45 GHz), and an optical communication type such as near infrared rays updating an ID label by using optical space transmission can also be appropriately employed. Although two contact points are provided between the thin film integrated circuit device 13 and the antenna 11 in the present embodiment mode, the number of contact points is not to be considered limited to this number.

Embodiment Mode 2

Figure 1B:
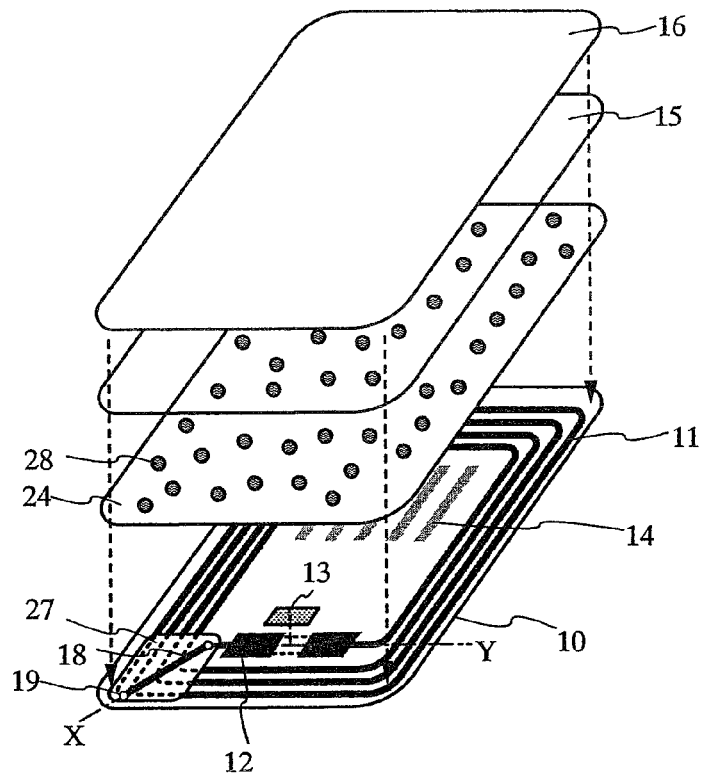
Figure 6A:
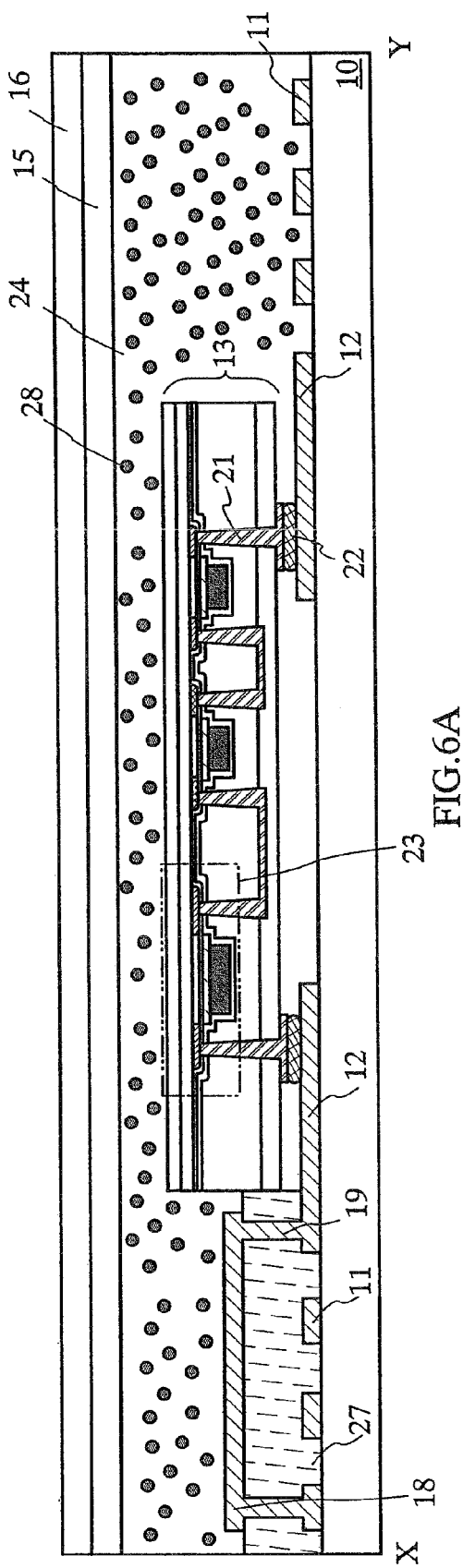
FIGS. 6A and 6B are perspective views illustrating structures of ID labels according to the present invention (internal cross-wiring)

A structure and manufacturing method of an ID label according to the present invention will be described, mainly with reference to FIG. 1B and FIG. 6A. FIG. 1B is a perspective view illustrating a structure of an ID label according to the present invention, where a label substrate portion to be attached to a commercial product or the like is shown below and a separator to serve as a board of the label is show above for the sake of convenience.

FIG. 1B is the same as FIG. 1A in terms of showing a case, where an antenna 11 and a connecting pad 12 that is a connecting portion connecting the antenna and a thin film integrated circuit device are formed in advance on a label substrate 10, and then, a thin film integrated circuit device 13 formed separately is attached to the label substrate 10, and has a feature that a crossed wiring 18 connecting the thin film integrated circuit device 13 and the antenna 11 is formed on the inside of the label substrate 10.

In this case, an insulating layer 27 is provided in order to prevent the antenna 11 and the crossed wiring 18 from shorting out. Further, a contact portion 19 is formed in the insulating layer 27 to connect a terminal of the antenna 11 and the crossed wiring 18. FIG. 6A shows a cross-sectional view of FIG. 1B along the line X-Y.

For the insulating layer 27, organic resins such as polyimide, acrylic, polyamide, resist, and siloxane, and inorganic materials such as silicon oxide, silicon nitride, silicon oxynitride (silicon oxide including nitrogen), a film including carbon such as DLC or carbon nitride (CN), PSG (phosphosilicate glass), and BPSG (borophosohposilicate glass) can be used. However, in order to prevent the total thickness of the ID label from becoming thick unnecessarily, it is preferable that the film thickness including the insulating layer 27 and the crossed wiring 18 is made to be the film thickness of the thin film integrated circuit device 13 or less, as shown in FIG. 6A. Although an anisotropic conductive film 22 is used to connect the thin film integrated circuit device 13 and the label substrate 10 to each other in the present embodiment mode as in FIGS. 4A and 4B, the method shown in FIG. 5B may be employed. The other structure can be the same as Embodiment Mode 1.

Since the crossed wiring 18 is formed on the inside of the label substrate 10 in the present embodiment mode, it is unnecessary to provide a coating layer on a surface of the label substrate 10 so that the whole of the ID label can be made thinner.

In the present embodiment mode, the antenna structure using an electromagnetic induction type is employed. However, any of an electromagnetic coupling type, a microwave type, and an optical communication type can also be appropriately employed. The ID label may be a hybrid ID label that has non-contact type and contact type functions at once. Although two contact points are provided between the thin film integrated circuit device 13 and the antenna 11 in the present embodiment mode, the number of contact points is not to be considered limited to this number.

Embodiment Mode 3

Figure 2A:
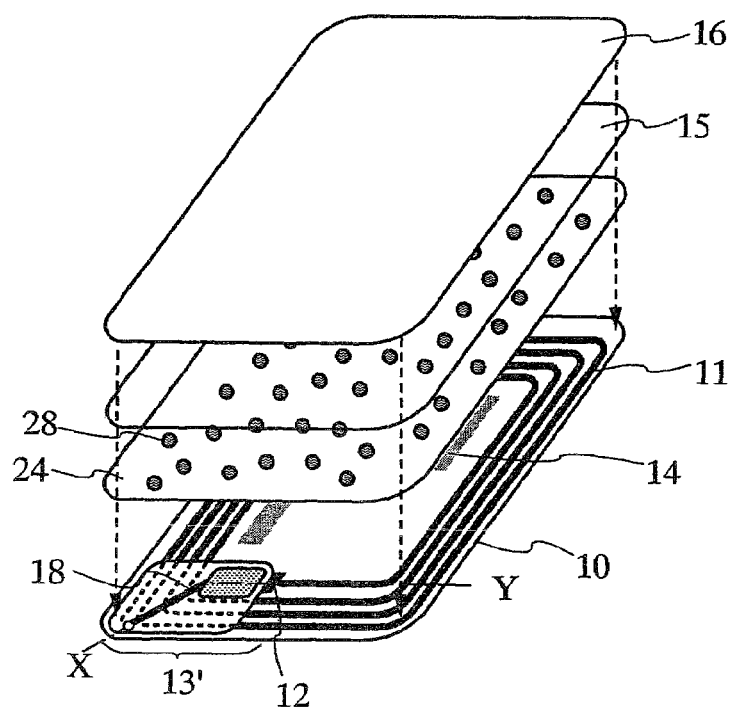
FIGS. 2A and 2B are perspective views illustrating structures of ID labels according to the present invention.

A structure and manufacturing method of an ID label according to the present invention will be described, mainly with reference to FIG. 2A and FIG. 6B. FIG. 2A is a perspective view illustrating a structure of an ID label according to the present invention, where a label substrate portion to be attached to a commercial product or the like is shown below and a separator to serve as a board of the label is show above for the sake of convenience.

FIG. 2A is the same as FIG. 1A in terms of showing a case, where an antenna 11 and a connecting pad 12 that is a connecting portion connecting the antenna and a thin film integrated circuit device are formed in advance on an ID label substrate 10, and then, a thin film integrated circuit device 13' formed separately is attached to the substrate 10, and has a feature that a crossed wiring 18 connecting the thin film integrated circuit device 13' and the antenna 11 is formed in the thin film integrated circuit device 13'.

The substrate 10 on which the antenna 11 and the thin film integrated circuit device 13' are formed is covered with a filling layer 24 including a filler 28. The material and shape of the filler 28 can be appropriately selected. As a material for the filling layer 24, the materials mentioned above can be used. Although the filling layer 24 serves as also a function for protecting the thin film integrated circuit device 13' and the antenna 11, a protective film of an inorganic film may be formed separately at the periphery thereof. As the protective film, for example, a film including a material such as silicon oxide, silicon nitride, or silicon oxynitride (silicon oxide including nitrogen), which has a function to block impurities such as a Na element, is preferably used, and more preferably, the materials are laminated to form the protective film.

Figure 6B:
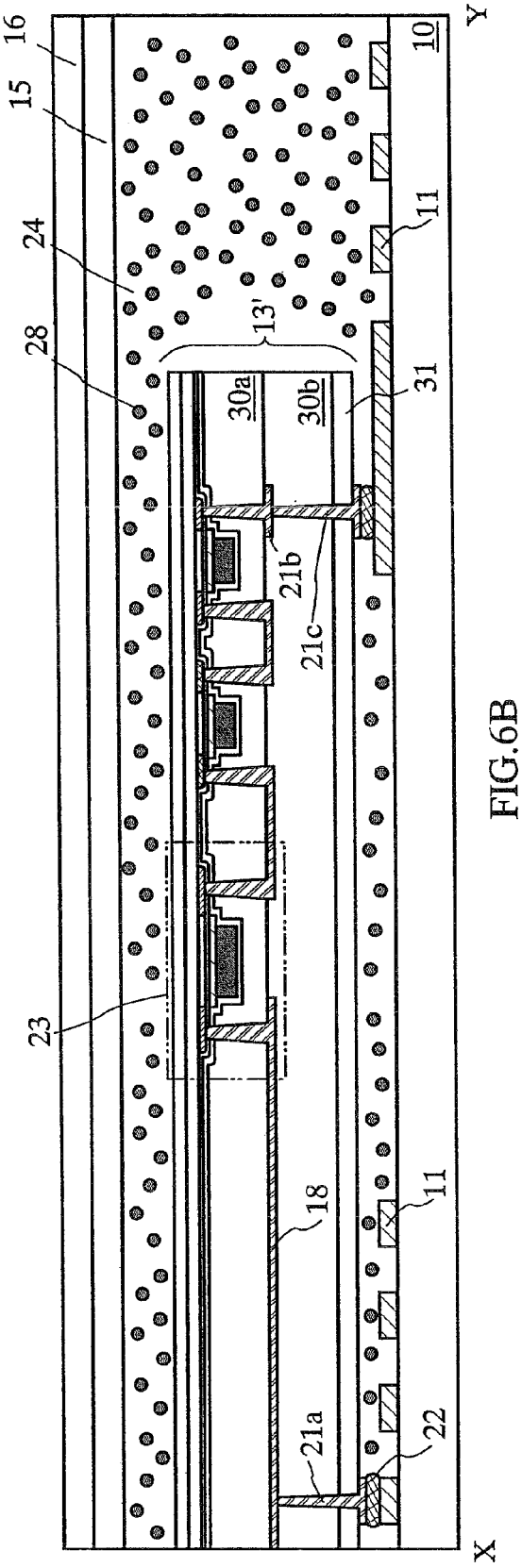

FIG. 6B shows a cross-sectional view of FIG. 2A along the line X-Y. For connecting a region in which TFTs 23 are formed to an inner end and outer end of the antenna 11, connecting wirings 21a to 21c are provided. Between the connecting wiring 21a connected to the outer end of the antenna 11 and the TFT 23, the crossed wiring 18 is provided. The crossed wiring 18 can be formed by manufacturing the region in which the TFTs 23 are formed, then forming a first interlayer film 30a, forming a contact hole, and then, depositing a conductive material by sputtering or discharging the conductive material by droplet discharge. Further, in order to prevent the crossed wiring 18 and the antenna 11 from shorting out, a second interlayer film 30b is formed, and the connecting wiring 21c is formed. For the connecting wirings 21a to 21c and the crossed wiring 18, the conductive materials mentioned above can be appropriately employed. Furthermore, a protective film 31 may be formed on the second interlayer film 30b.

As materials for the interlayer films (first and second interlayer films 30a and 30b) described above, photosensitive or non-photosensitive organic materials such as polyimide, acrylic, polyamide, resist and benzocyclobutene and heat-resistant organic resins such as siloxane can be used. As a forming method thereof, a method such as spin coating, dipping, spraying, or droplet discharge, can be employed depending on the material. Alternatively, a SOG film (for example, a SiOx film including an alkyl group) obtained by coating can also be used. Also, inorganic materials may be used, and in this case, a film including a material such as silicon oxide, silicon nitride, silicon oxynitride (silicon oxide including nitrogen), carbon such as DLC or carbon nitride, PSG, BPSG, or alumina can be used. As a forming method thereof, a method such as plasma CVD, low pressure CVD (LPCVD), or atmospheric pressure plasma can be used. The materials of the interlayer films 30a and 30b are identical to or different from each other.

For the protective film 31, in addition to silicon oxide (SiOx) and silicon oxide including nitrogen (SiOxNy), materials such as silicon nitride (such as SiNx, $Si_3N_4$, or SiNOx) and silicon nitride including oxygen (SiNxOy), which have a function of blocking alkali metal elements such as a Na element, are preferably used. In particular, ID labels, ID cards, ID tags, and the like are often treated directly with bare hands. In that case, penetration of Na included in sweat can be prevented. More preferably, the materials mentioned above are laminated. For example, SiN, a two-layered film of SiNO, $SiO_2$ in order, a three layered film of SiN, TFT, SiON in order, or a three-layered film of SiON, TFT, SiNO can be employed. These laminated structures can be freely combined. In addition, not only the top and bottom of the TFTs but also a periphery portion may be covered with the material. Hereinafter, silicon oxide including nitrogen (SiOxNy) and silicon nitride including oxygen (SiNxOy) may be collectively "silicon oxynitride". It is preferable to form the protective film 31 as far as possible to prevent penetration from mixing impurities, which can be omitted.

The protective film using the material mentioned above, in the case where an adhesive material layer including an organic resin material is provided in contact with the protective film, can protect the TFTs against impurities included in the adhesive material layer. In the case where the antenna is formed in contact with or inside the protective film, the protective film mentioned above can prevent penetration of conductive materials (in particular, Cu and Ag).

Although an anisotropic conductive film 22 is used to connect the thin film integrated circuit device 13' and the label substrate 10 to each other in the present embodiment mode as in FIGS. 4A and 4B, the method shown in FIG. 5B may be employed. The other structure can be the same as Embodiment Mode 1.

Since the crossed wiring 18 is formed in the thin film integrated circuit device 13' in the present embodiment mode, it is unnecessary to provide a coating layer on a surface of the label substrate 10 or form a contact hole in the label substrate 10.

In the present embodiment mode, the antenna structure using an electromagnetic induction type is employed. However, any of an electromagnetic coupling type, a microwave type, and an optical communication type can also be appropriately employed. The ID label may be a hybrid ID label that has non-contact type and contact type functions at once. Although two contact points are provided between the thin film integrated circuit device 13' and the antenna 11 in the present embodiment mode, the number of contact points is not to be considered limited to this number.

Embodiment Mode 4

Figure 2B:
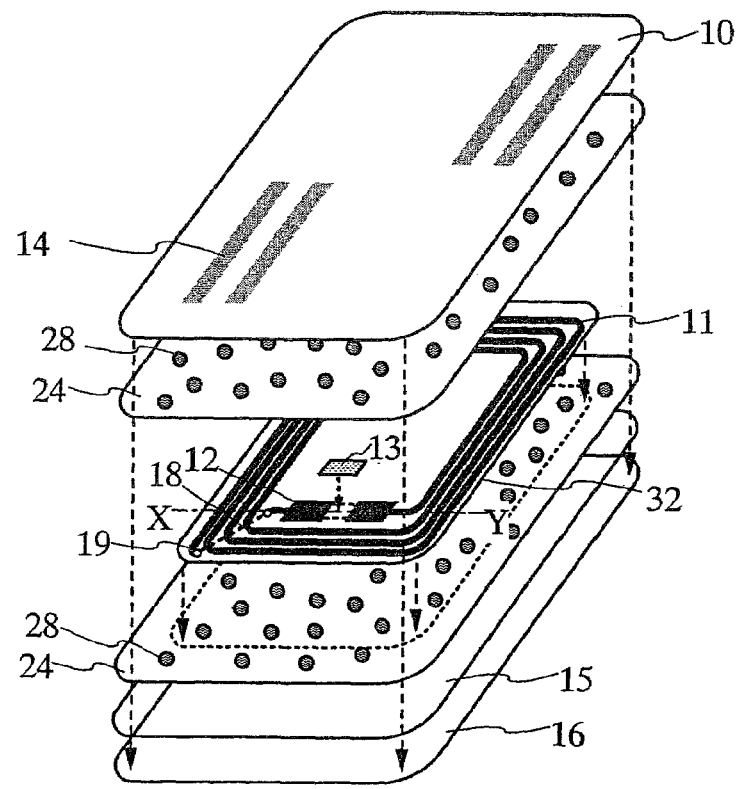

A structure and manufacturing method of an ID label according to the present invention will be described, mainly with reference to FIG. 2B and FIG. 7A. FIG. 2B is a perspective view illustrating a structure of an ID label according to the present invention, where a label substrate portion to be attached to a commercial product or the like is shown above and a separator to serve as a board of the label is show below.

The present embodiment mode has a feature of forming an antenna 11 and a connecting pad 12 that is a connecting portion connecting the antenna and a thin film integrated circuit device in advance on an internal substrate 32 (inlet substrate), attaching a separately formed thin film integrated circuit device 13 to the internal substrate 32, and attaching a label substrate 10.

As a method for providing the antenna 11 and the thin film integrated circuit device 13 on an internal substrate 32, a similar method can be employed as in the case of providing on the label substrate in the embodiment mode described above (refer to FIGS. 4A to 6B). However, in order to prevent the total of the ID label from becoming thick unnecessarily, a thin filmy substrate is preferably used for the internal substrate 32. As a material thereof, resin materials such as paper, synthetic paper, plastics, PET, polypropylene, polyethylene, polystyrene, and nylon, and inorganic materials can be used. However, the internal substrate 32 is not to be considered limited to these. In order for the ID label to enable being attached to not only a commercial product of a flat shape but also commercial products of various shapes, it is preferable to use a flexible material also for the internal substrate. This makes it easier to treat the ID label. As a resin material, for example, a high density polyethylene (HDPE) described in Japanese Patent Application Laid-Open 2001-30403 can also be used.

FIG. 7A shows an enlarged cross-sectional view of a completed product of an ID label manufactured according to the present embodiment mode. The periphery of an internal substrate 32 on which an antenna 11 and a thin film integrated circuit device 13 are formed is covered with a filling layer 24 including a filler 28. The material and shape of the filler 28 can be appropriately selected. For example, a column-shaped filler may be used. As a material for the filling layer 24, the materials mentioned above can be used. Although the filling layer 24 serves as also a film for protecting the thin film integrated circuit device 13 and the antenna 11, a protective film of an inorganic film may be formed separately at the periphery thereof. As the protective film, for example, a film including a material such as silicon oxide, silicon nitride, or silicon oxynitride (silicon oxide including nitrogen), which has a function of blocking impurities such as a Na element, is preferably used, and more preferably, the materials are laminated to form the protective film.

This separately formed internal substrate 32 is attached to a label substrate 10 with an adhesive material layer 15 interposed therebetween. On a surface (printing surface 33) of the label substrate 10, print is given according to need. In the present embodiment mode, since the size of the internal substrate 32 is smaller than the size of the label substrate 10, the adhesive material layer 15 can be formed on the side surface of the internal substrate 32 so that a separator 16, the internal substrate 32, and the label substrate 10 can be held together.

In the case of attaching the ID label to a commercial product or the like actually, the ID label from which the separator 16 is separated may be attached with the adhesive material layer 15. In the case where the internal substrate 32 and the label substrate 10 have about the same size, an adhesive material layer may be provided on both the upper and lower surfaces of the internal substrate 32 to bond the label substrate 10 and the separator 16. The shapes of the internal substrate 32 and the antenna 11 are not limited to the shapes shown in FIG. 7A.

In the present embodiment mode, the antenna structure using an electromagnetic induction type is employed. However, any of an electromagnetic coupling type, a microwave type, and an optical communication type can also be appropriately employed. The ID label may be a hybrid ID label that has non-contact type and contact type functions at once. Although two contact points are provided between the thin film integrated circuit device 13 and the antenna 11 in the present embodiment mode, the number of contact points is not to be considered limited to this number.

Embodiment Mode 5

Figures 3A, 3B:
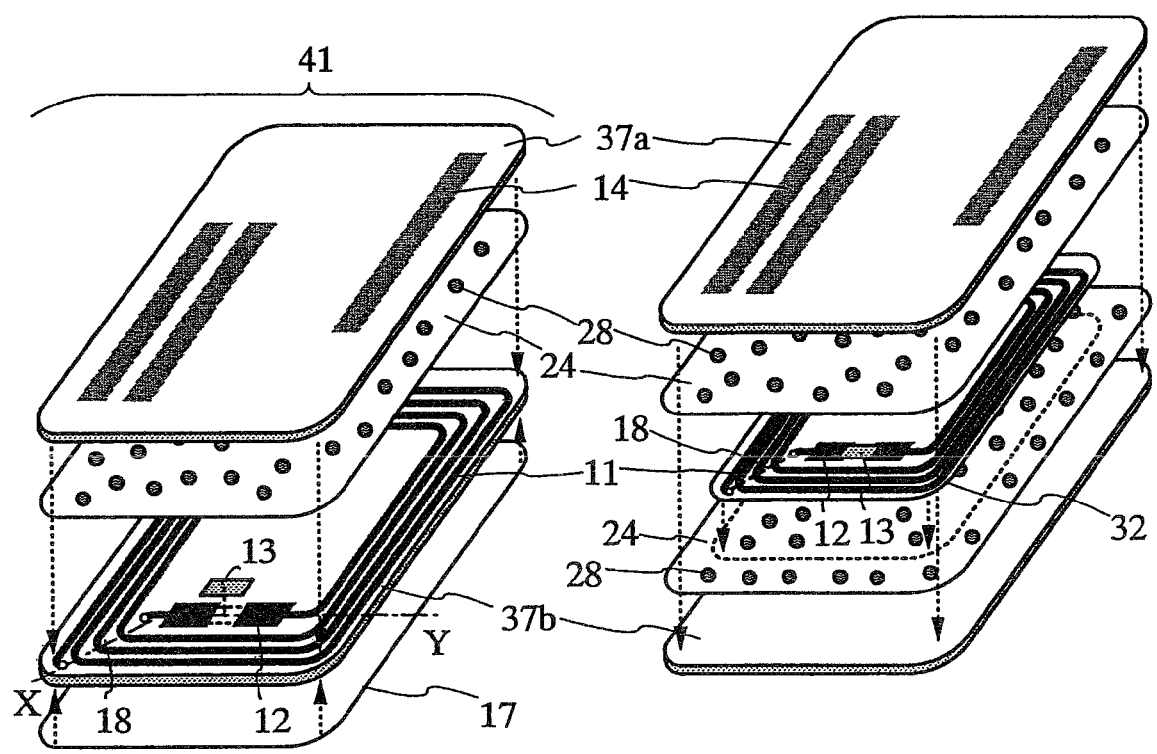
FIGS. 3A and 3B are perspective views illustrating structures of ID cards according to the present invention.

A structure and manufacturing method of an ID card according to the present invention will be described, mainly with reference to FIGS. 3A and 3B and FIG. 7B. FIGS. 3A and 3B are perspective views illustrating structures of ID cards according to the present invention.

FIG. 3A shows a case, where an antenna 11 and a connecting pad 12 that is a connecting portion connecting the antenna and a thin film integrated circuit device in advance on a lower card substrate 37b for an ID card, a separately formed thin film integrated circuit device 13 is attached to the lower card substrate 37b. Further, an upper card substrate 37a is provided over the lower card substrate 37b with a filling layer 24 interposed therebetween. On the upper card substrate 37a or the lower card substrate 37b, print 14 is given according to need. In the case where a crossed wiring 18 for connecting the connecting pad 12 and the antenna 11 to each other is exposed at the surface of the lower card substrate 37b, a coating layer 17 may be formed separately.

For each card substrate, a resin material such as plastics, PET, polypropylene, polyethylene, polystyrene, or nylon is used. However, materials such as paper, synthetic paper, inorganic materials may be used. In general, ID cards have little occasion to be folded and used. However, in the case of desiring a foldable ID card, it is preferable to use a flexible material for the card substrate. As a resin material, for example, a high density polyethylene (HDPE) described in Japanese Patent Application Laid-Open 2001-30403 can also be used. Also, a combination of two or more materials as described above may be used.

The structure of the antenna including the crossed wiring and method for connecting the thin film integrated circuit device and the antenna can be similarly employed as in Embodiment Modes 1 to 4. Thus, an ID card 41 is completed. The shapes of the internal substrate 32 and the antenna 11 are not limited to the shapes shown in FIG. 7C.

FIG. 3B shows another case, where an internal substrate 32 on which an antenna is formed and a thin film integrated circuit device 13 is attached is encapsulated with an upper card substrate 37a and a lower card substrate 37b, with a filling layer 24 provided around the internal substrate 32. When the internal substrate 32 is manufactured to have a smaller size than the card substrates (upper card substrate 37a and lower card substrate 37b), an adhesive material layer can be provided around the internal substrate 32 so that the ID card can be made thinner.

FIG. 7B shows an enlarged cross-sectional view of a completed product of an ID card manufactured according to the present embodiment mode. The periphery of an internal substrate 32 on which an antenna 11 and a thin film integrated circuit device 13 are formed is covered with a protective film 54, where the materials described above can be used for the protective film 54.

Further, the internal substrate 32 covered with the protective film 54 is covered with a filling layer 24 including a filler 28. As materials for the filling layer 24 and the filler 28, the materials mentioned above can be used. The filling layer 24 may be formed before forming the protective film 54.

This separately formed internal substrate 32 is held by an upper card substrate 37a and a lower card substrate forming the ID card with the protective film 54 and the filling layer 24, thereby completing the ID card. On a surface of the card substrate printing surface 33), print 14 is given according to need.

In the present embodiment mode, the antenna structure using an electromagnetic induction type is employed. However, any of an electromagnetic coupling type, a microwave type, and an optical communication type can also be appropriately employed. The ID label may be a hybrid ID label that has non-contact type and contact type functions at once. Although two contact points are provided between the thin film integrated circuit device 13 and the antenna 11 in the present embodiment mode, the number of contact points is not to be considered limited to this number.

Embodiment Mode 6

A structure and manufacturing method of an ID tag according to the present invention will be described, mainly with reference to FIG. 7C. FIG. 7C shows a case, where an internal substrate 32 on which an antenna 11 is formed and a thin film integrated circuit device 13 is attached is encapsulated with a filling layer 24 including a filler 28. As materials for the internal substrate 32, the filler 28, and the filling layer 24, the materials mentioned above can be used. After forming the filling layer 24, pressing is performed according to need to achieve planarization. In the case of locating the ID tag to be invisible from outside, for example, implanting the ID tag in other solid, the planarization process can be omitted. The periphery of the filling layer 24 may be further covered with a protective film including an inorganic material or a substrate such as a pulp material (for example, paper or synthetic paper) or a resin. The substrate can be appropriately selected for many purposes such as a luggage tag, a price tag, a name tag, and a name plate. The shapes of the internal substrate 32 and the antenna 11 are not limited to the shapes shown in FIG. 7C.

In the present embodiment mode, the antenna structure using an electromagnetic induction type is employed. However, any of an electromagnetic coupling type, a microwave type, and an optical communication type can also be appropriately employed. The ID label may be a hybrid ID label that has non-contact type and contact type functions at once. Although two contact points are provided between the thin film integrated circuit device 13 and the antenna 11 in the present embodiment mode, the number of contact points is not to be considered limited to this number.

Embodiment Mode 7

Structures and manufacturing methods of an ID card and ID card according to the present invention will be described, mainly with reference to FIGS. 8A and 8B and FIGS. 9A and 9B. First, FIG. 8A is a perspective view illustrating a structure of an ID label according to the present invention, where a label substrate portion to be attached to a commercial product or the like is shown above and a separator to serve as a board of the label is show below.

Figure 8A:
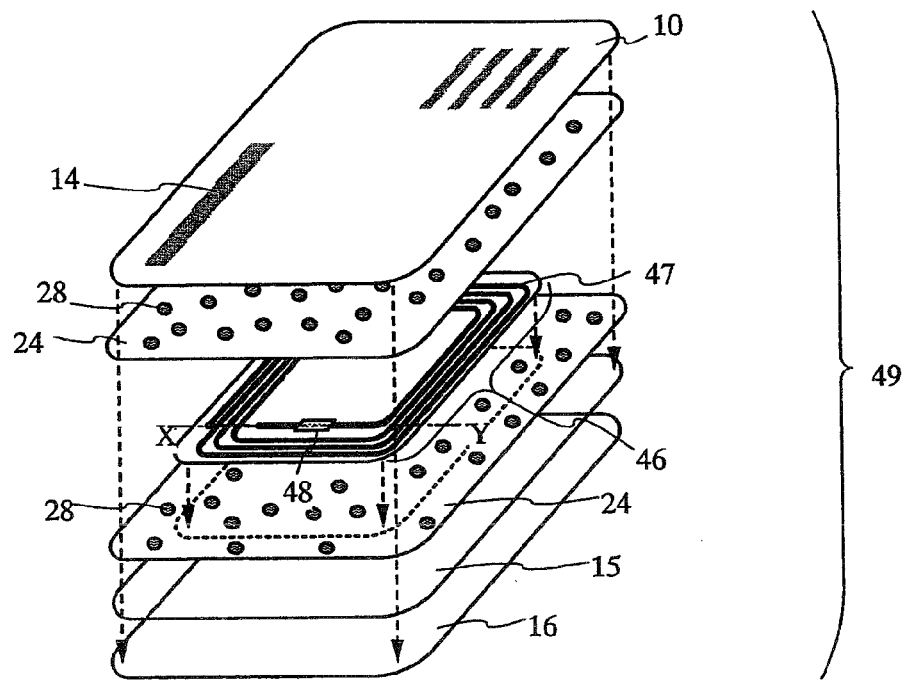
FIGS. 8A and 8B are perspective views illustrating structures of an ID label and ID card according to the present invention (built-in antenna type)

FIG. 8A shows a case, where in an ID label 49, an antenna integrated thin film integrated circuit device 46 (hereinafter, which may be referred to "antenna integrated IDF chip") in which an antenna 47 and a thin film integrated circuit device 48 are integrated is covered with a filling layer 24 including a filler 28, and is attached to a separator 16 with an adhesive material layer 15 interposed therebetween. The materials of the label substrate 10, the adhesive material layer 15, the separator 16, the filler 28, and the filling layer 24 are based on the embodiment mode described above. The shapes of the IDF chip and the antenna are not limited to the shapes of FIG. 8A. The filling layer 24 including the filler 28 may be formed only above or below the antenna integrated thin film integrated circuit device 46.

Figure 8B:
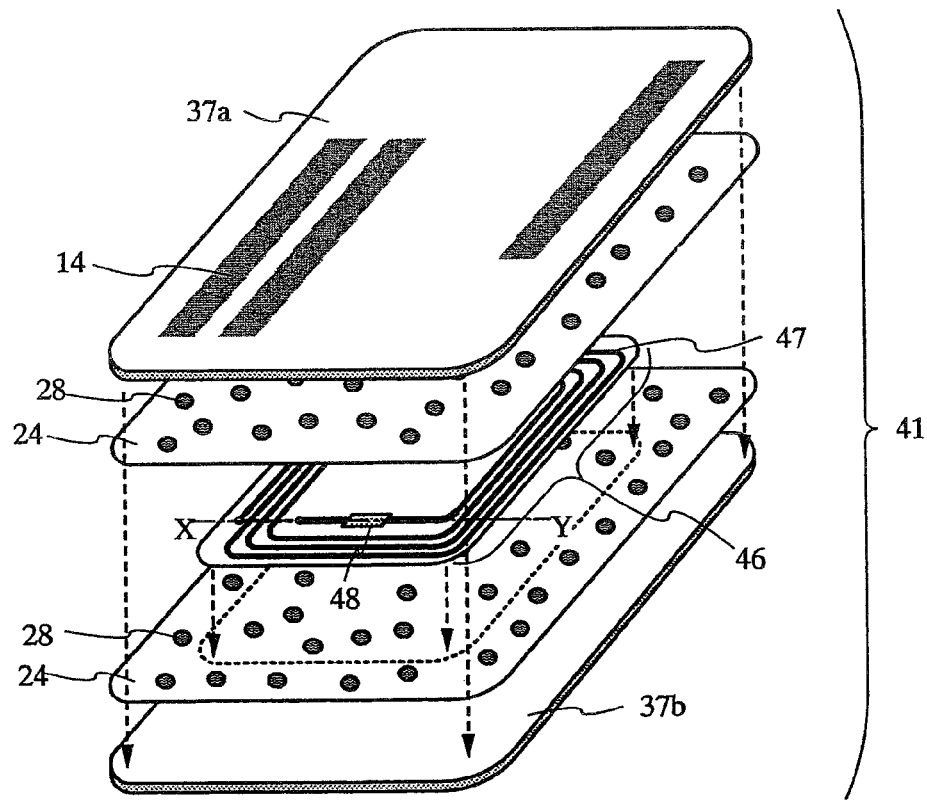

FIG. 8B shows a case, where in an ID label 41, an antenna integrated thin film integrated circuit device 46 (in which an antenna 47 and a thin film integrated circuit device 48 are integrated) is covered with a filling layer 24 including a filler 28, and is attached to an upper card substrate 37a and a lower card substrate 37b with an adhesive material layer 15 (not in the figure) interposed therebetween. The materials of a card substrate 10 and the adhesive material layer 15 are based on the embodiment mode described above. The shapes of the IDF chip and the antenna are not limited to the shapes of FIG. 8B. The filling layer 24 including the filler 28 may be formed only above or below the antenna integrated thin film integrated circuit device 46.

Figure 9A:
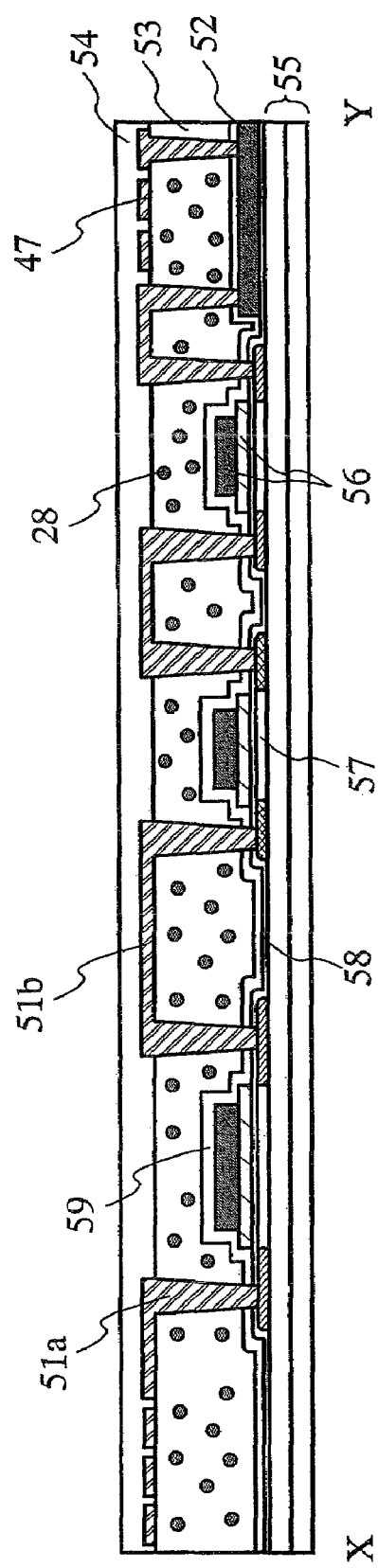
FIGS. 9A and 9B are cross-sectional views of built-in antenna type thin film integrated circuit devices to be used for an ID label and the like according to the present invention.
Figure 9B:
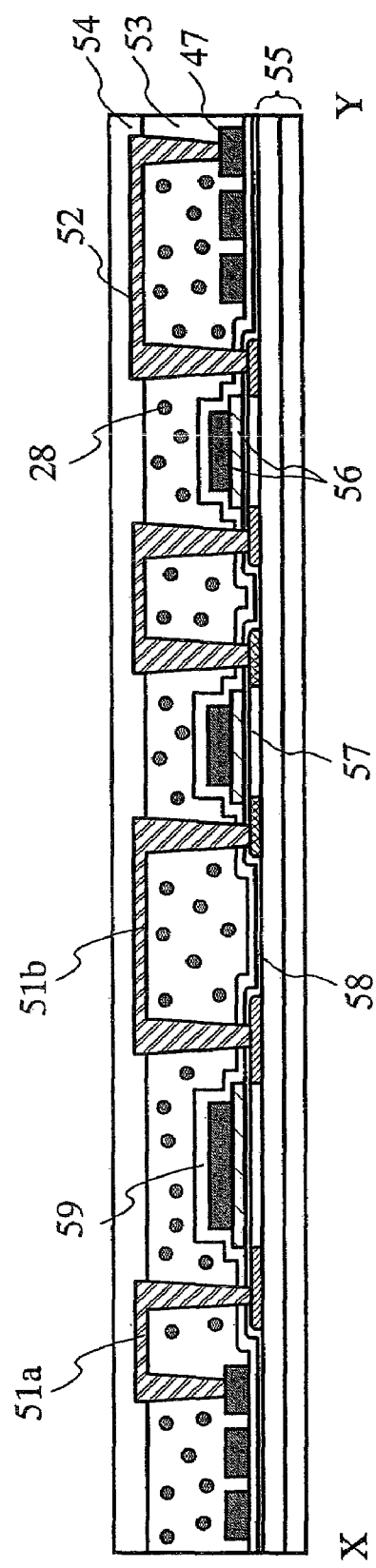

FIGS. 9A and 9B show cross-sectional views of the antenna integrated IDF chips (only the antenna integrated thin film integrated circuit devices 46) of the ID label 49 and the ID card 41 shown in FIGS. 8A and 8B along the line X-Y. FIG. 9A shows a case, where island-shaped semiconductor films 57 and a gate insulating film 58 are formed on a protective film 55, and then, a gate electrode 56 (which has a two-layered structure here) and a crossed wiring 52 are formed at the same time. Further, an antenna 47, a wiring 51a for connecting a TFT and the antenna to each other, and wiring 51b for connecting TFTs to each other are formed through contact holes formed in a passivation film 59 and an interlayer film 53. It is preferable to manufacture the gate electrode 56, the crossed wiring 52, the antenna 47, and the wirings 51a and 51b in the same process, which may be formed in stages.

FIG. 9B shows a case, where island-shaped semiconductor films 57 and a gate insulating film 58 are formed on a protective film 55, and then, a gate electrode 56 (which has a two-layered structure here) and an antenna 47 are formed at the same time. Further, a wiring 51a for connecting a TFT and the antenna to each other, a crossed wiring 52, and wiring 51b for connecting TFTs to each other are formed through an interlayer film 53. It is preferable to manufacture the gate electrode 56, the antenna 47, the crossed wiring 52, and the wirings 51a and 51b in the same process, which may be formed in stages.

In both FIGS. 9A and 9B, a filler 28 is mixed also in the interlayer film 53. However, the filler 28 in the interlayer film 53 can be omitted. Although the TFTs employ a top-gate structure, a bottom-gate structure may be of course employed. A specific method for manufacturing the TFTs will be described later. In order to prevent impurity diffusions into the island-shaped semiconductor films 57, it is preferable to form the protective film 55 of a single-layered structure or laminated structure. In addition, it is preferable to form the protective film 54 also after forming the antenna 47. The protective films 54 and 55, which can employ a material such as silicon nitride, silicon oxide, or silicon oxynitride, preferably include silicon nitride blocking impurities such as Na.

The antenna integrated thin film integrated circuit devices 46 in the present embodiment mode can be mounted on an ID tag of which an example is shown in FIG. 7C.

The present embodiment mode shows examples of structures in the case of forming TFTs and an antenna integrally, and is not always limited to these.

Embodiment Mode 8

A method for manufacturing an ID label according to the present invention will be described mainly with reference to FIGS. 10A and 10B.

FIGS. 10A and 10B are pattern diagrams illustrating manufacturing lines of an ID label according to the present invention. First, label paper to serve as a substrate for an ID label is supplied from a label paper supply means 300 (Role 1), and an IDF chip (thin film integrated circuit device) is attached to a desired portion of the label paper. In this case, a material such as an adhesive material or an ACF or a method such as ultrasonic bonding or UV bonding is appropriately used. In the present embodiment mode, an antenna is supposed to be formed on the label paper, and by using an ACF supply means 301 and an IDF chip attaching means 302, the label paper and the IDF chip are bonded to each other with an ACF provided therebetween. Of course, the antenna formed on the label paper and the IDF chip are connected to each other. Instead of the ACF supply means 301, a non-conductive adhesive material supply means may be provided. This makes it possible to manufacture an ID label that has a structure as shown in FIG. 5B.

Figure 24A:
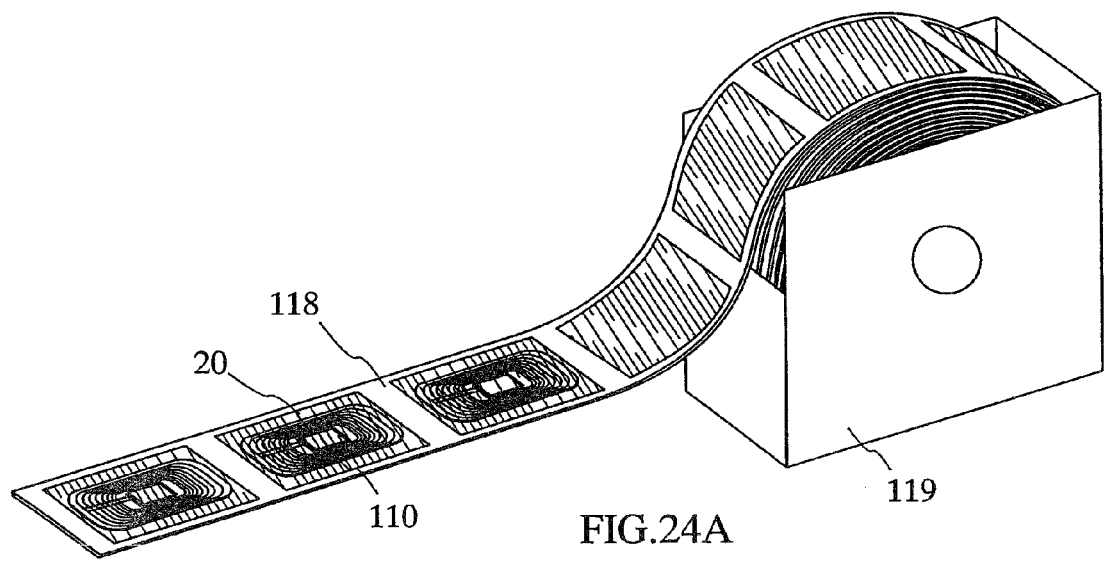
FIGS. 24A to 24E are diagrams illustrating examples of articles according to the present invention.

Next, a filling layer and an adhesive material layer are respectively provided from a filling layer supply means 308 and an adhesive material layer supply means 303, and separate paper (a separator) supplied from a separate paper supply means 304 (Role 2) is attached to complete an ID label. Finally, the ID label is taken up by a label take-up means 305 (Role 3). The ID label substrate is preferably separated in advance with respective to each individual label, and strip-shaped paper is preferably supplied as the separate paper. In this case, ID labels 20 separated from each other can be obtained on a roll of label board 118 (separator), as shown in FIG. 24A.

As for the supply of the label paper and the supply of the separate paper, the order may be inverse as shown in FIG. 10B. In the figure, the ACF supply means 301 or the non-conductive adhesive material supply means is omitted since an antenna is supposed to be formed in an IDF chip. After forming a plurality of ID labels in a strip shape, the ID labels may be separated by a label separating means 306 such as a clicker cutter to be make each an individual ID label, and then, the ID labels may be collected by a collecting means 307 as products. Of course, FIGS. 10A and 10B can be combined alternately.

The method according to the present embodiment mode can be appropriately employed for not only ID cards and ID tags according to the present invention but also banknotes, coins, certificates, bearer bonds, and securities in which a thin film integrated circuit device is incorporated. For example, in the case of an ID card, a lower substrate material and an upper substrate material may be held by Role 1 and Role 2, respectively.

Embodiment Mode 9

Figure 11A:
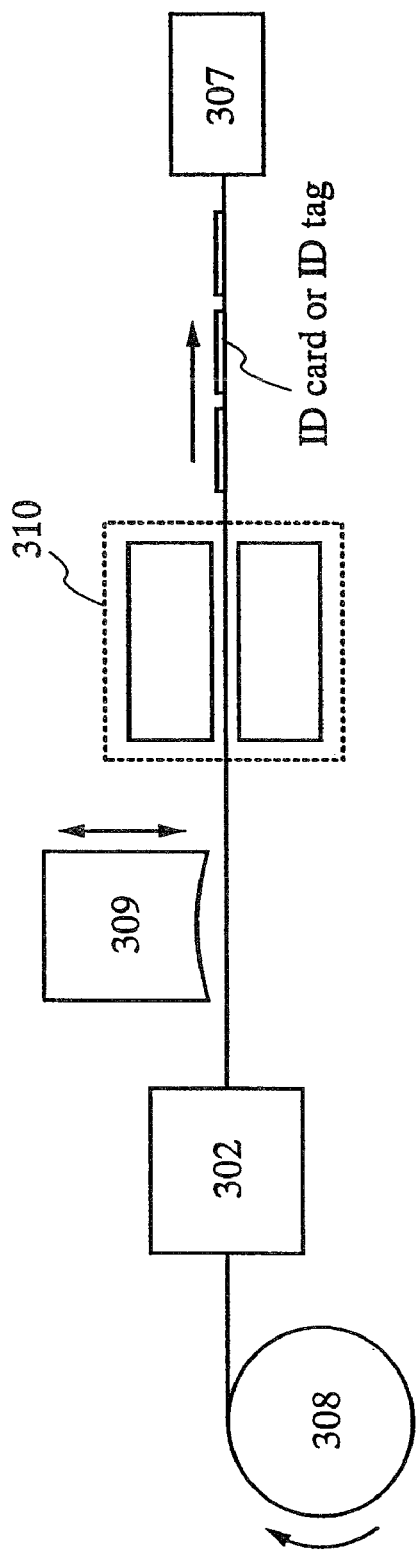
FIGS. 11A and 11B are pattern diagrams illustrating a manufacturing line of an ID card, an ID tag, and the like according to the present invention and an enlarged view of a completed product.
Figure 11B:
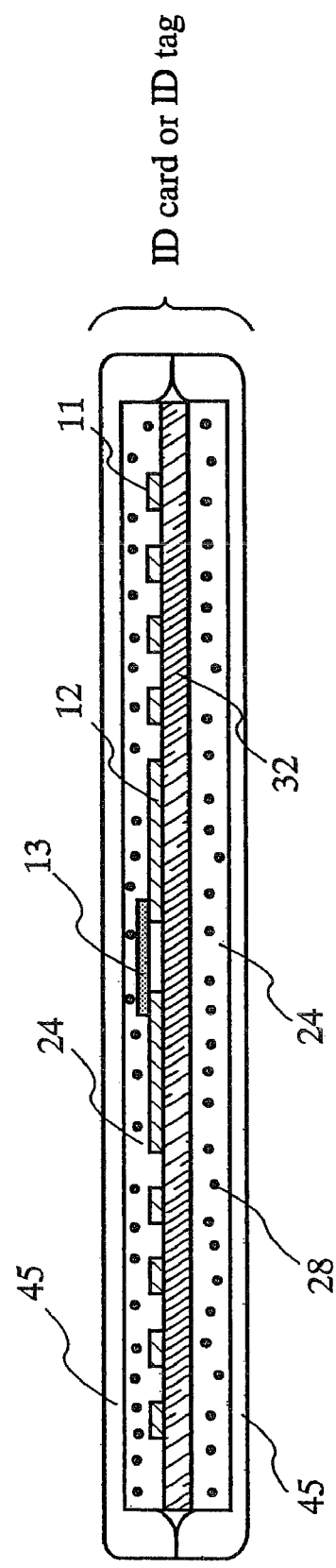

A method for manufacturing an ID card and ID tag according to the present invention will be described mainly with reference to FIGS. 11A and 11B. FIGS. 11A and 11B are a pattern diagram illustrating a manufacturing line of an ID card and ID tag according to the present invention and an enlarged view of a completed product.

First, as shown in FIG. 11A, a material for a substrate of an ID card or an ID tag is supplied from a substrate supply material 311 (Role 1), and an IDF chip is attached to a desired position of the substrate by a IDF chip attaching means 302. In this case, a material such as an adhesive material or an ACF or a method such as ultrasonic bonding or UV bonding is appropriately used. Next, when the substrate lies in a strip shape, the substrate is separated by a substrate separating means 309 with respect to each individual ID card or ID tag. Then, a laminating system 310 is used to perform a laminating process for a periphery of the individual substrate. In this case, a periphery of the IDF chip is preferably covered with a filling layer 24 including a filler 28 in advance. The filler 28 may be included in a laminate resin layer 45.

In this way, the ID card or the ID tag is completed. After forming an IDF chip in a desired position of a strip-shaped substrate and performing a laminating process, the substrate may be separated with respect to each individual ID card or ID tag. The ID card or ID tag after the laminate processing is collected by a collecting means 307.

FIG. 11B is an enlarged cross-sectional of a completed product of an ID card or ID tag manufactured with the use of the method according to the present embodiment mode. In a label substrate, an antenna 11 and a thin film integrated circuit device 13 connected to the antenna 11 are formed, and the label substrate with the antenna 11 and thin film integrated circuit device 13 formed is covered with a laminate resin layer 45, with a filling layer 24 including a filler 28 interposed therebetween. In order to protect the thin film integrated circuit device 13 and the antenna 11 in a heat treatment and the like during the laminating process, it is preferable to use a heat-resistant organic resin such as siloxane for the filling layer 24. In addition, a protective film may be formed separately. As the protective film, a film including carbon such as DLC or carbon nitride, a silicon nitride film, a silicon nitride film including oxygen can be used. However, the protective film is not to be considered limited to this film. As a forming method thereof, a method such as a plasma CVD or an atmospheric pressure plasma The manufacturing process can be employed for not only ID cards and ID tags but also another commercial products as long as the commercial products are suitable for the laminate processing.

Embodiment 1

In the present embodiment, a specific manufacturing method of a thin film integrated circuit device will be described with reference to FIGS. 12A to 16B. For simplification, the manufacturing method will be described here by showing cross-sectional structures of a CPU and memory using an n-channel TFT and a p-channel TFT.

Figure 12A:
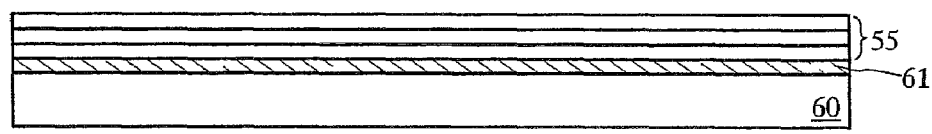
FIGS. 12A to 12E are diagrams illustrating manufacturing processes of a CPU and a memory in a thin film integrated circuit device to be used in the present invention.

First, a peel-off layer 61 is formed on a substrate 60 (FIG. 12A). An a-Si film (amorphous silicon film) with a film thickness of 50 nm (500 Å) is formed on a glass substrate (for example, a Corning 1737 substrate) by CVD here. As the substrate, in addition to a glass substrate, substrates such as a quartz substrate, a substrate including an insulating material such as alumina, a silicon wafer substrate, and a heat-resistant plastic substrate that can withstand processing temperatures in subsequent processes can be used.

As the peel-off layer, in addition to amorphous silicon, a layer including silicon as its main component, such as poly-crystalline silicon, single-crystal silicon, or SAS (semi-amorphous silicon (also referred to as micro-crystalline silicon)), can be used. These peel-off layers may be formed by a method such as sputtering instead of CVD. It is preferable that the film thickness of the peel-off layer is made to be 500 to 540 Å. As for SAS, the film thickness may be made to be 300 to 500 Å.

Next, a protective film 55 (also referred to as a base film or a base insulating film) is formed on the peel-off layer 61 (FIG. 12A). Although a three-layered structure of from a substrate side a SiON film with a film thickness of 100 nm, a SiNO film with a film thickness of 50 nm, and a SiON film with a film thickness of 100 nm is employed here, the materials, the film thicknesses, or the number of laminations are not to be considered limited to this. For example, instead of the lower SiON film, a heat-resistant resin such as siloxane with a film thickness of 0.5 to 3 μm may be formed by a method such as spin coating, slit coater, or droplet discharge. Alternatively, a silicon nitride film (for example, SiN or $Si_3N_4$) may be used. It is preferable that each film thickness is made to be 0.05 to 3 μm, which can be freely selected within the range.

The silicon oxide film can be formed by a method such as thermal CVD, plasma CVD, atmospheric CVD, or bias ECRCVD with the use of a mixed gas such as $SiH_4/O_2$ or TEOS (tetraethoxysilane)/$O_2$. The silicon nitride film can be formed typically by plasma CVD with the use of a mixed gas of $SiH_4/NH_3$. The SiON film or SiNO film can be formed typically by plasma CVD with the use of a mixed gas of $SiH_4/N_2O$.

In the case where a material including silicon such as a-Si as a main component is used as the peel-off layer 61 and an island-shaped semiconductor film 57 to be formed later, as the protective film in contact with those, SiOxNy may be used from the viewpoint of ensuring adhesiveness.

Next, TFTs forming a CPU and memory of a thin film integrated circuit device are formed on the protective film 55. In addition to the TFTs, thin film active elements such as organic TFTs and thin film diodes can also be formed.

Figure 12B:
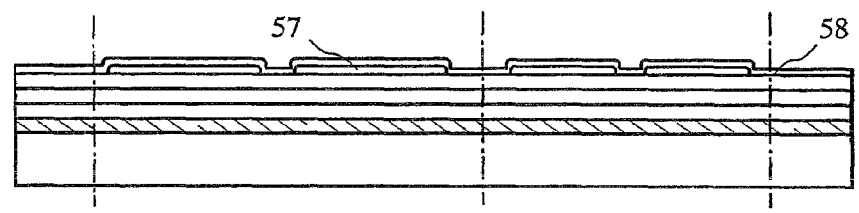

In a method for manufacturing the TFTs, island-shaped semiconductor films 57 are formed first on the protective film 55 (FIG. 12B). The island-shaped semiconductor films 57 are formed by using an amorphous semiconductor, a crystalline semiconductor, or semi-amorphous semiconductor. In any case, it is possible to use a semiconductor film including a material such as silicon or silicon-germanium (SiGe) as its main component.

In the present embodiment, amorphous silicon with a film thickness of 70 nm is formed, and a treatment with a solution including nickel is further given to the surface of the amorphous silicon. Further, a crystalline silicon semiconductor film is obtained by a thermal crystallization process at 500 to 750° C., and laser crystallization is performed to improve the degree of crystallinity. As a method for deposition, a method such as plasma CVD, sputtering, or LPCVD may be used. As a method for crystallization, a method such as laser crystallization, thermal crystallization, or thermal crystallization using another catalyst (such as Fe, Ru, Rh, Pd, Os, Ir, Pt, Cu, or Au) may be used, or the above-mentioned methods may be used alternatively more than once.

For crystallization of a semiconductor film with an amorphous structure, a continuous-wave laser may be used. In order to obtain a large-grain crystal by crystallization, it is preferable to use a continuous-wave solid laser and apply any of the second to fourth harmonics of the fundamental wave (the crystallization in this case is referred to as "CWLC"). Typically, the second harmonic (532 nm) or third harmonic (355 nm) of $Nd:YVO_4$ laser (fundamental wave: 1064 nm) may be used. In the case of using a continuous-wave laser, laser light emitted from continuous-wave $YVO_4$ laser (output: 10 W) is converted into a harmonic by a non-linear optical element. There is also a method in which one of an $YVO_4$ crystal and a $GdVO_4$ crystal and a non-linear optical element are put in which in a resonator to emit a harmonic. Then, rectangular or elliptic laser light is preferably formed at a surface to be irradiated by an optical system to irradiate an object to be processed. In this case, an energy density of approximately 0.01 to 100 MW/cm² (preferably, 0.1 to 10 MW/cm²) is necessary. The semiconductor film may be moved at a speed of approximately 10 to 2000 cm/s relatively with respect to the laser light.

In the case of using pulse oscillation laser, a frequency band of several tens to several hundreds Hz is generally used. However, pulse oscillation laser with an oscillation frequency of 10 MHz or more, which is much higher than the frequency band, may be used (the crystallization in this case is referred to as "MHzLC"). Since the time from irradiation to a semiconductor film with laser light in pulse oscillation to complete solidification of the semiconductor film is said to be several tens to several hundreds nsec, the use of the above-mentioned higher frequency band allows to, from melting of a semiconductor film by laser light to solidification thereof, irradiate the next pulse of laser light. Accordingly, a solid-liquid interface can be continuously moved in a semiconductor film unlike a case of using conventional pulse oscillation laser, so that a semiconductor film that has a crystal grain grown continuously toward the scanning direction is formed. Specifically, an assembly of crystal grains with a width of about 10 to 30 µm in the scanning direction and a width of about 1 to 5 µm in a direction perpendicular to the scanning direction can be formed. The formation of single-crystal crystal grains long extended along the scanning direction makes it possible to form a semiconductor film in which there is almost no crystal grain boundary in at least a channel direction of a TFT.

In the case of using siloxane that is a heat-resistant organic resin for a portion of the protective film 55, heat can be prevented from leaking from the semiconductor film during the crystallization described above so that the crystallization can be performed efficiently.

According to the method described above, the crystalline silicon semiconductor film is obtained, where it is preferable that crystals are oriented in a source-channel-drain direction and the thicknesses of the crystals are made to be 20 to 200 nm (typically, 40 to 170 nm, more preferably, 50 to 150 nm). After that, an amorphous silicon film for gettering of the metal catalyst is formed over the semiconductor film with an oxide film interposed therebetween, and a gettering is performed by a heat treatment at 500 to 750° C. Further, in order to control a threshold voltage of a TFT, boron ions of the dose amount on the order of $10^{13}/cm^2$ are injected into the crystalline silicon semiconductor film. After that, the island-shaped semiconductor films 57 are formed by etching with a resist as a mask.

When the crystalline semiconductor film is formed, disilane ($Si_2H_6$) and germanium fluoride (germanium tetrafluoride?) ($GeF_4$) may be used as a raw gas to form a polycrystalline semiconductor film directly by LPCVD so that a crystalline semiconductor film can be obtained. In this case, the gas flow rate may be $Si_2H_6/GeF_4=20/0.9$, the deposition temperature may be 400 to 500° C., and He or Ar may be used as a carrier gas. However, the conditions are not to be considered limited to these.

It is preferable that channel regions in the TFTs are particularly doped with hydrogen or halogen of $1\times10^{19}$ to $1\times10^{22}$ cm$^{-3}$, preferably $1\times10^{19}$ to $5\times10^{20}$ cm$^{-3}$, or $1\times10^{19}$ to $2\times10^{21}$ cm$^{-3}$ in the case of SAS. In any case, it is preferable to include more than the amount of hydrogen or halogen included in a single crystal to be used for an IC chip. This makes it possible, even when local cracks are generated in the TFTs, to terminate the local cracks with hydrogen or halogen.

Next, a gate insulating film 58 is formed on the island-shaped semiconductor films 57 (FIG. 12B). It is preferable that a method for forming a thin film such as plasma CVD or sputtering is used to form a single layer or laminated layers of a layer including silicon nitride, silicon oxide, silicon nitride including oxygen, or silicon oxynitride (silicon oxide including nitrogen) as the gate insulating film. In the case of the laminated layers, for example, a three-layered structure of, from the substrate side, a silicon oxide film, a silicon nitride film, and a silicon oxide film may be preferably employed.

Figure 12C:
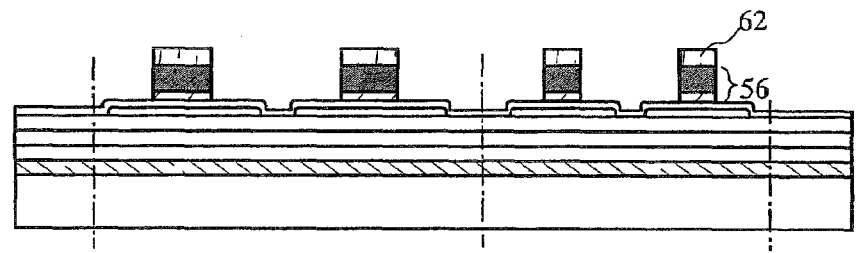

Next, gate electrodes 56 are formed (FIG. 12C). In the present embodiment mode, by etching with a resist 62 as a mask after laminating and forming Si and W (tungsten) by sputtering, the gate electrodes 56 are formed. Of course, the material, structure, or manufacturing method of the gate electrodes 56 is not to be considered limited to this, which can be appropriately selected. For example, a laminated structure of Si doped or non-doped with an n-type impurity and NiSi (nickel silicide) or a laminated structure of TaN (tantalum nitride) and W may be employed. Alternatively, various conductive materials may be used to form a single layer for the gate electrodes 56.

Instead of the resist mask 62, a mask such as SiOx may be used. In this case, a process of forming a mask such as SiOx or SiON (referred to as a hard mask) by patterning is added. However, since the mask is less reduced during etching than the resist, a gate electrode layer with a desired width can be formed. Alternatively, without using the resist 62, droplet discharge may be used to form the gate electrode 56 selectively.

As conductive materials, various materials can be selected depending on the function of a conductive film. In the case of forming the gate electrodes and an antenna at the same time, materials may be selected in consideration of their functions.

As an etching gas in the case of forming the gate electrode layers by etching, a mixed gas of $CF_4$, $Cl_2$, and $O_2$ or a $Cl_2$ gas is used. However, the etching gas is not limited these.

Figure 12D:
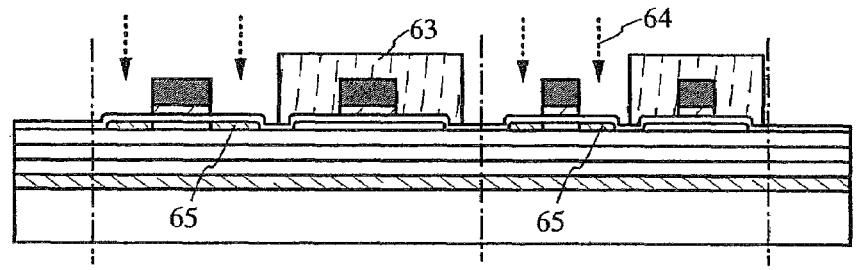

Next, portions to be p-channel TFTs 70 and 72 are covered with a resist 63, and the island-shaped semiconductor films of portions to be n-channel TFTs 69 and 71 are doped with an impurity element 64 (typically, P (phosphorus) or As (arsenic)) imparting n-type conductivity at a lower concentration with the gate electrode layers as masks (first doping process shown in FIG. 12D). The conditions of the first doping process are as follows: dose amount: $1\times10^{13}$ to $6\times10^{13}/cm^2$; and accelerating voltage: 50 to 70 keV. However, the conditions are not to be considered limited to these. This first doping process makes through doping through the gate insulating film 58 to form pairs of lower concentration impurity regions 65. The first doping process may be applied all over the area without covering the p-channel TFT regions with the resist.

Figure 12E:
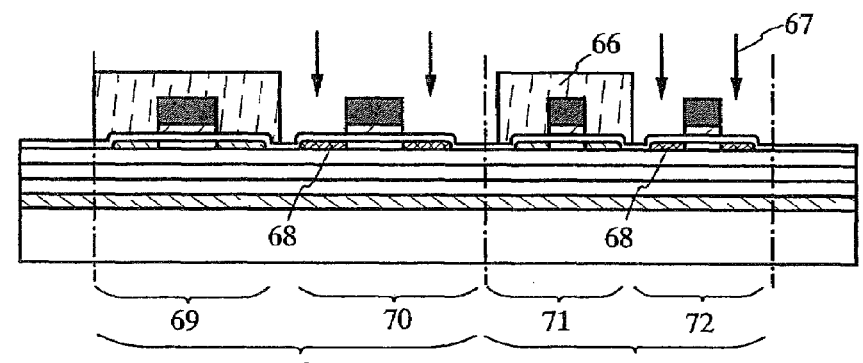

Next, after removing the resist 63 by a method such as ashing, a resist 66 is newly formed to cover n-channel TFT regions, and the island-shaped semiconductor films to be the p-channel TFTs 70 and 72 are doped with an impurity element 67 (typically, B (boron)) imparting p-type conductivity at a higher concentration with the gate electrode layers as masks (second doping process shown in FIG. 12E). The second doping process is performed under conditions as follows: dose amount: $1\times10^{16}$ to $3\times10^{16}/cm^2$; and accelerating voltage: 20 to 40 keV. This second doping process makes through doping through the gate insulating film 58 to form pairs of higher concentration p-type impurity regions 68.

Figure 13A:
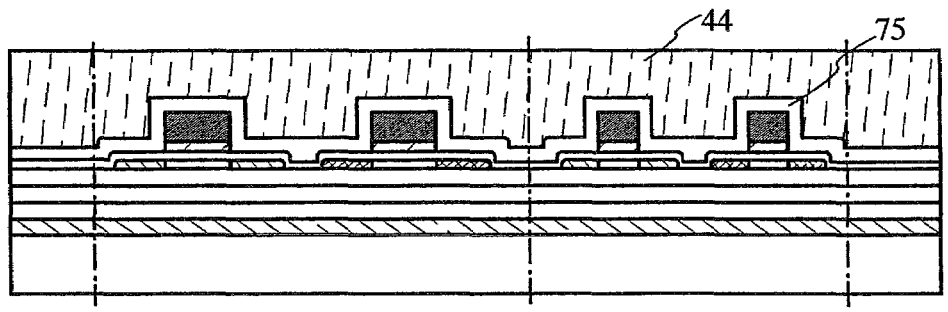
FIGS. 13A to 13D are diagrams illustrating manufacturing processes of a CPU and a memory in the thin film integrated circuit device to be used in the present invention.
Figure 13B:
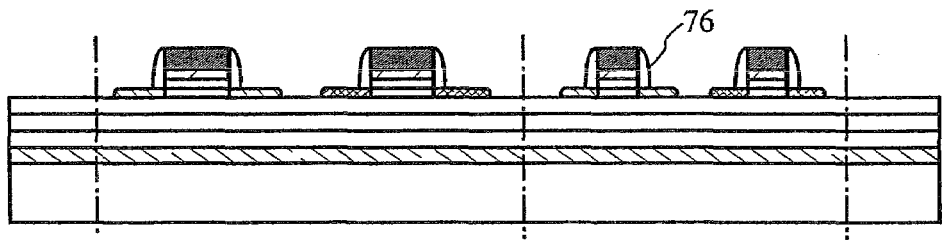

Next, after removing the resist 66 by a method such as ashing, an insulating film 75 is formed over the substrate (FIG. 13A). In the present embodiment mode, a $SiO_2$ film with a film thickness of 100 nm is formed by plasma CVD. After that, the whole area of the substrate is covered with a resist 44, the resist 44, the insulating film 75, the gate insulating film 58 are etched and removed by etch back to form sidewalls 76 (side walls) in a self-aligning manner (FIG. 13B). As the etching gas, a mixed gas of $CHF_3$ and He is used. The process for forming the sidewalls is not to be considered limited to what is shown in the present embodiment mode.

In the case where an insulating film is formed also on the backside of the substrate at the formation of the insulating film 75, the insulating film on the backside is etched and removed with the resist 44 as a mask (backside treatment).

Figure 16A:
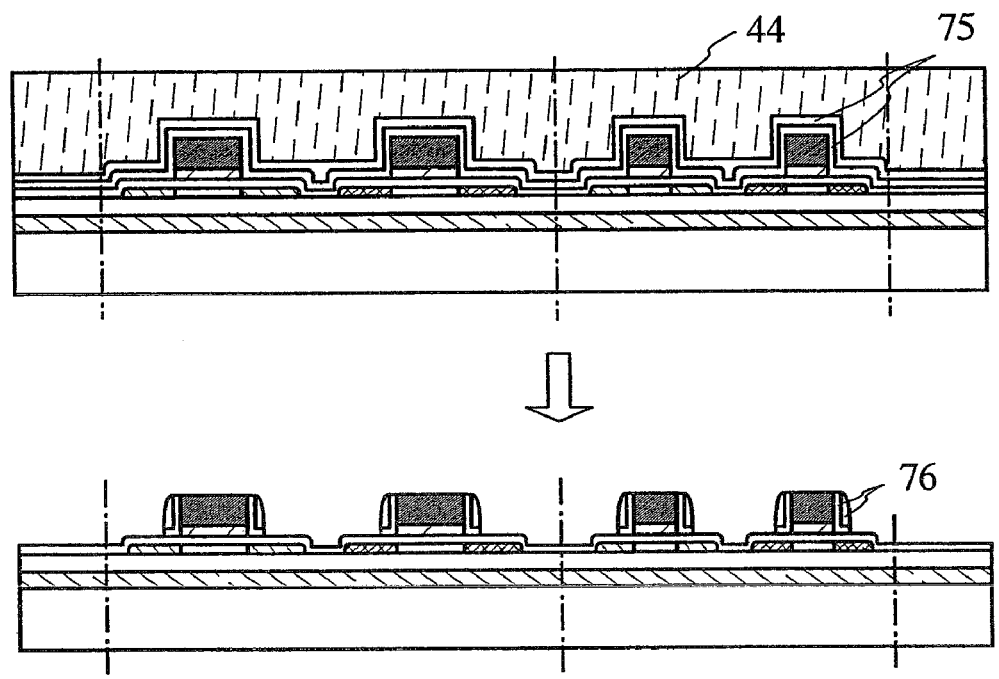
FIGS. 16A and 16B are diagrams illustrating methods of forming a sidewall.

The method for forming the sidewalls 76 is not to be considered limited to the method described above. For example, methods shown in FIGS. 16A and 16B can be used. FIG. 16A shows an example in which the insulating film 75 has a laminated structure of two or more layers. For the insulating film 75, for example, a two-layered structure of a SiON (silicon oxynitride) film with a film thickness of 100 nm and a LTO film (Low Temperature Oxide Film) with a film thickness of 200 nm is employed, where the SiON film is formed by plasma CVD and a $SiO_2$ film is formed by low pressure CVD as the LTO film. After that, and L-shaped and circular sidewalls 76 are formed by etch back with a resist 44 as a mask.

Figure 16B:
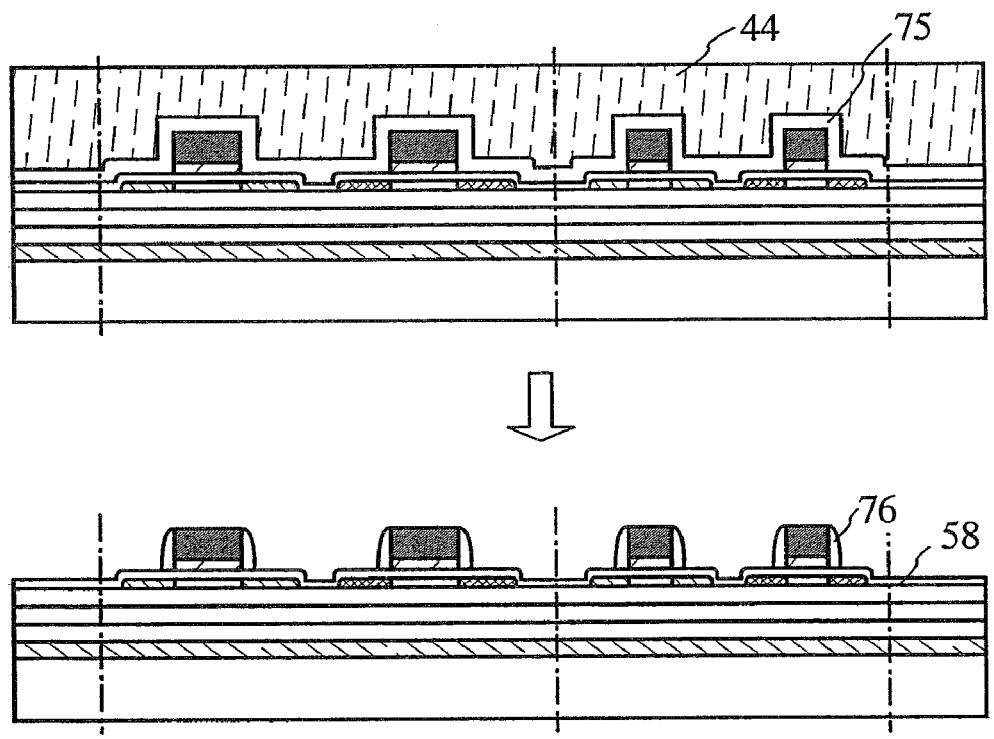

FIG. 16B shows an example in which etching is performed by etch back to leave the gate insulating film 58. The insulating film 75 in this case may have a single-layer structure or a laminated structure.

The sidewall 76 function as a mask for forming a lower concentration impurity region or a non-doped offset region below the sidewall 76 when doping is later performed with a higher concentration n-type impurity. In any of the above-described methods for forming the sidewalls, the condition for the etch back may be appropriately changed depending on the width of a desired lower concentration impurity region or offset region.

Figure 13C:
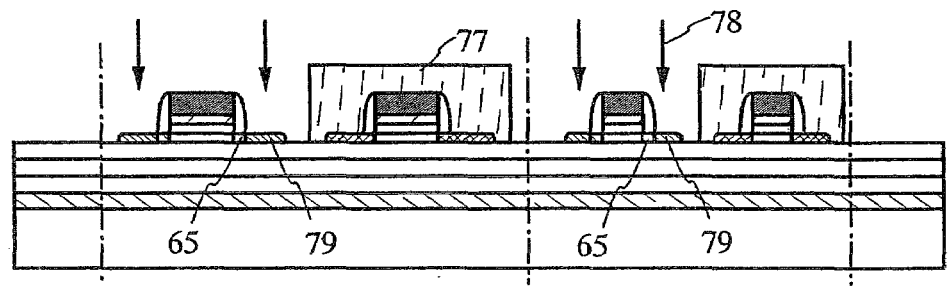

Next, a resist 77 is newly formed to cover the p-channel TFT regions, and with the gate electrode layers 56 and the sidewalls 76 as masks, doping at a higher concentration is performed with an impurity element 78 (typically, P or As) imparting n-type conductivity (third doping process shown in FIG. 13C). The third doping process is performed under conditions as follows: dose amount: $1\times10^{13}$ to $5\times10^{15}/cm^2$ and accelerating voltage: 60 to 100 keV. This third doping process makes through doping through the gate insulating film 58 to form pairs of higher concentration n-type impurity regions 79.

After removing the resist 77 by a method such as ashing, the impurity regions may be thermally activated. For example, a heat treatment may be performed at 500° C. for 4 hours under a nitrogen atmosphere after forming a SiON film of 50 nm. In addition, by a heat treatment at 410° C. for 1 hour under a nitrogen atmosphere after forming a SiNx film including hydrogen to have a film thickness of 100 nm, defects of the crystalline semiconductor film can be improved. This is a process, for example, for terminating dangling bonds existing in crystalline silicon, and is referred to as a hydrogenation treatment process. Further, after that, a SiON film with a film thickness of 600 nm is formed as a cap insulating film protecting the TFTs. The hydrogenation treatment process may be performed after forming the SiON film. In this case, the SiON film can be formed continuously on SiNx film. In this way, the three-layered insulating films of from a substrate SiON, SiNx, SiON are formed on the TFTs.

However, the structures or materials of the insulating films are not to be considered limited to these. These insulating films, which also have a function of protecting the TFTs, are preferably formed.

Figure 13D:
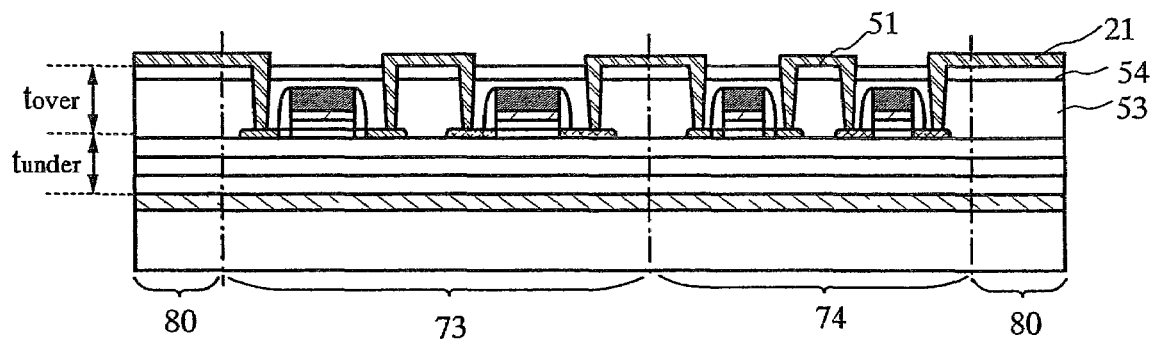

Next, an interlayer film 53 is formed over the TFTs (FIG. 13D). As the an interlayer film 53, polyimide, acrylic, polyamide, and heat-resistant organic resin such as siloxane can be used. As a forming method thereof, a method such as spin coating, dipping, spraying, or droplet discharge can be employed depending on the material. Also, inorganic materials may be used, and in this case, a film including a material such as silicon oxide, silicon nitride, silicon oxynitride, PSG, BPSG, or alumina can be used. These insulating films may be laminated to form the interlayer film 53.

Further, a protective film 54 may be formed on the interlayer film 53. As the protective film 54, a film including carbon such as DLC or carbon nitride, or a film such as a silicon oxide film, a silicon nitride film or a silicon nitride film including oxygen can be used. As a forming method thereof, a method such as plasma CVD or atmospheric pressure plasma can be used. Alternatively, a photosensitive or non-photosensitive organic material such as polyimide, acrylic, polyamide, resist, or benzocyclobutene or a heat-resistant organic resin such as siloxane may be used.

In order to prevent peeling and cracks of the interlayer film 53 and the protective film 54 from being generated due to stress generated by a difference in coefficient of thermal expansion between the interlayer film 53 or protective film 54 and a material such as a conductive material forming a wiring to be formed later, a filler may be mixed in the interlayer film 53 or the protective film 54.

Next, after forming a resist, contact holes are formed by etching, and then a wiring 51 connecting the TFTs to each other and a connecting wiring 21 for connecting to an external antenna are formed (FIG. 13D). As a gas to be used for etching when the contact holes are formed, a mixed gas of $CHF_3$ and He is used. However, the gas to be used for etching is not to be considered limited to this mixed gas. The wiring 51 and the connecting wiring 21 may be formed at the same time by using the same material, or may be formed separately. The wiring 51 connected to the TFT has a five-layered structure of from a substrate Ti, TiN, Al—Si, Ti, and TiN here, which is formed by patterning after forming by sputtering.

By mixing Si in the Al layer, a hillock can be prevented from being generated in resist baking of the wiring patterning. Instead of Si, Cu may be mixed in at approximately 0.5%. In addition, by sandwiching the Al—Si layer between Ti and TiN, the hillock-resistant property is further improved. During the patterning, it is preferable to use the above-mentioned hard mask including a material such as SiON. The materials or forming method of the wring are not to be considered limited to these. The above-mentioned materials to be used for the gate insulating layers may be employed.

The present embodiment shows a case of integrally forming only a terminal area 80 for connecting the TFT regions forming a CPU 73 and a memory 74, or the like, and the antenna to each other. However, the present invention can be applied also in the case of integrally forming TFT regions and an antenna. In this case, the antenna is preferably formed on the interlayer film 53 or the protective film 54, and further covered with another protective film. As a conductive material for the antenna, a metal such as Ag, Au, Al, Cu, Zn, Sn, Ni, Cr, Fe, Co, or Ti, or an alloy including the metal can be used. However, the material is not to be considered limited to these. The wirings and the antenna may be different in material from each other. The wirings and the antenna are formed to have a metal material with malleability and ductility, and more preferably, the film thicknesses are made thicker to withstand stress due to a deformation.

As a forming method thereof, patterning may be performed with the use of a resist mask after all over deposition by sputtering, or droplet discharge may be used for forming selectively from a nozzle. The wiring and the antenna may be formed at the same time, or one may be formed on the other which is formed in advance.

Through the processes described above, a thin film integrated circuit device including the TFTs is completed. Although a top-gate structure is employed in the present embodiment, a bottom-gate structure (inversely staggered structure) may be employed. The materials of the base insulating film, the interlayer insulating film, and the wiring are mainly provided in a region where there is no thin film active element such as a TFT, where it is preferable that the region occupies 50% or more of the whole of the thin film integrated circuit device, preferably 70 to 95% thereof. This makes it easier to fold the IDF chip and treat a completed product such as an ID label. In this case, it is preferable that the island-shaped semiconductor region (island) of active elements including the TFT portions occupies 1 to 30% of the whole of the thin film integrated circuit device, preferably 5 to 15% thereof.

In addition, as shown in FIG. 13D, it is preferable to control the thickness of the upper or lower protective film or the interlayer film so that the distance ($t_{under}$) from the semiconductor layer of the TFT to the lower protective film and the distance ($t_{over}$) from the semiconductor layer to the upper interlayer film (the protective film in the case where the protective film is formed) are equal or substantially equal to each other in the thin film integrated circuit device. By locating the semiconductor layer in the center of the thin film integrated circuit device in this way, stress to the semiconductor layer can be eased, and cracks can be prevented from being generated.

Figure 14A:
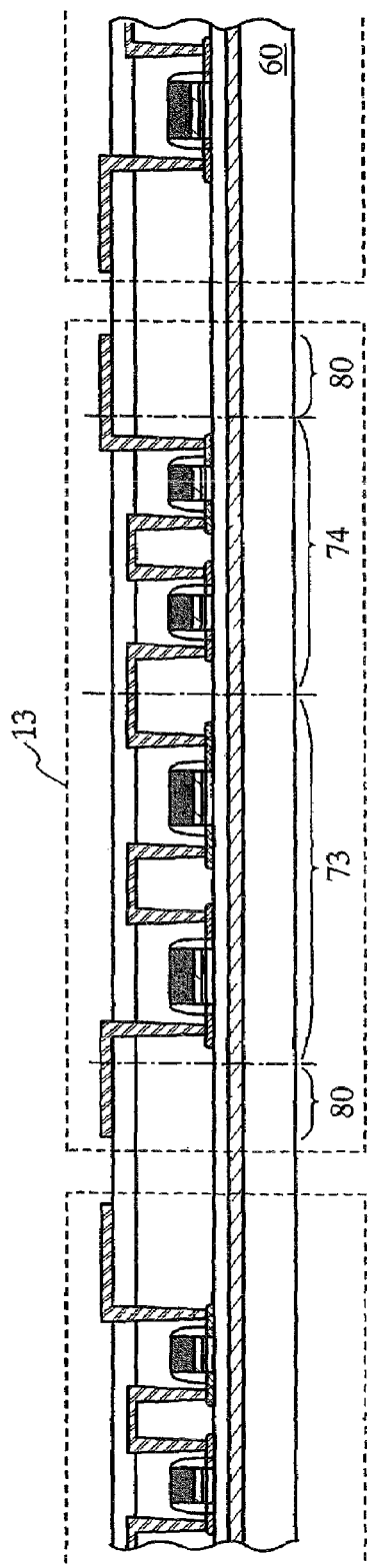
FIGS. 14A to 14C are diagrams illustrating manufacturing processes of a CPU and a memory in the thin film integrated circuit device to be used in the present invention.
Figure 14B:
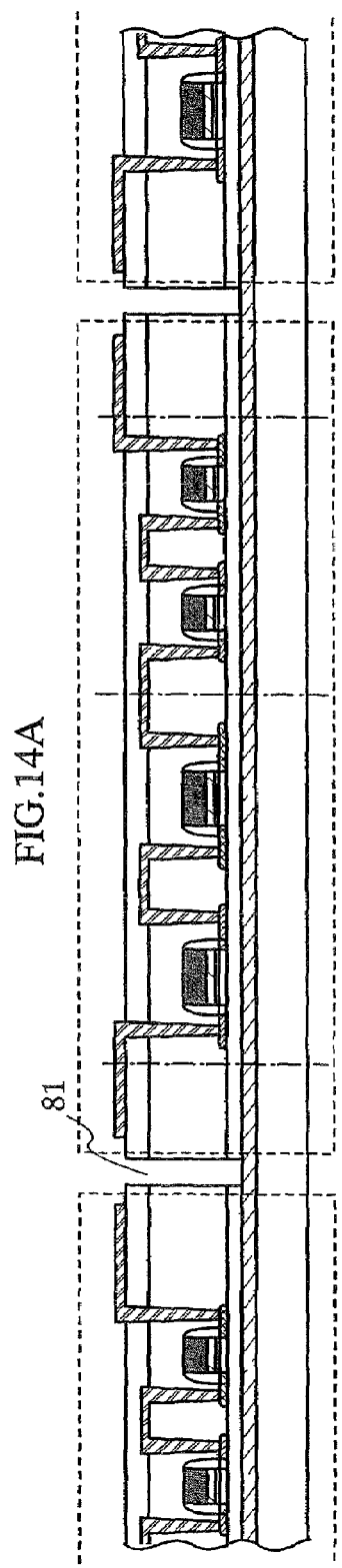

The TFTs manufactured according to the present embodiment have a S value (subthreshold value) of 0.35 V/dec or less (preferably, 0.07 to 0.25 V/dec) and a mobility of 10 cm$^2$V/sec or more, and further have a characteristic (at 3 to 5 V) of 1 MHz or more, preferably 10 MHz or more on the level of ring oscillator or have a frequency characteristic per gate (at 3 to 5 V) of 100 kHz or more, preferably 1 MHz or more In the case where a plurality of TFTs, a protective film, various wirings, and an antenna are integrated on a substrate 60 (these are collectively referred to as "a thin film integrated circuit device"), an antenna is formed (FIG. 14A), and next, a groove 81 is formed by dicing in a boundary region between thin film integrated circuit devices 13 (FIG. 14B). In this case, a blade dicing method using a dicing system (dicer) is commonly used. The blade is a grinding stone into which a diamond abrasive is implanted, which has a width of about 30 to 50 μm. By rapidly spinning this blade, the thin film integrated circuit devices are separated from each other. A necessary area for dicing is referred to as a street, which preferably has a width of 80 to 150 μm in consideration of damage to the devices.

In addition to dicing, a method such as scribing or etching with the use of a mask can be used to form the groove 81. In the case of scribing, there are methods such as diamond scribing and laser scribing. In the case of employing laser scribing, from a laser resonator, for example, Nd:YAG laser, linear laser light with power of 200 to 300 W in pulse oscillation such as a fundamental wave with an oscillation wavelength 1064 nm or the second harmonic with an oscillation wavelength of 532 nm can be used.

In the case of etching, after forming a mask pattern according to processes of exposure and development, the devices can be separated from each other by etching such as dry etching. In dry etching, atmospheric pressure plasma may be used. As gas for dry etching, a chlorine-based gas typified by $Cl_2$, $BCl_3$, $SiCl_4$, $CCl_4$, or the like, a fluorine-based gas typified by $CF_4$, $SF_6$, $NF_3$, $CHF_3$, or the like, or $O_2$ is used. However, the gas for etching is not to be considered limited to these. The etching can be performed by using atmospheric pressure plasma. In this case, mixed gas of $CF_4$ and $O_2$ is preferably used as etching gas. The groove 81 may be formed by etching more than once with the use of different kinds of gasses. Of course, the groove 81 may be formed by wet etching.

When the groove is formed, the groove may have a depth to the point that at least a surface of the peel-off layer is exposed, and it is preferable that the method such as dicing is appropriately controlled in order not to scratch the substrate so that the substrate 60 can be used repeatedly.

Figure 14C:
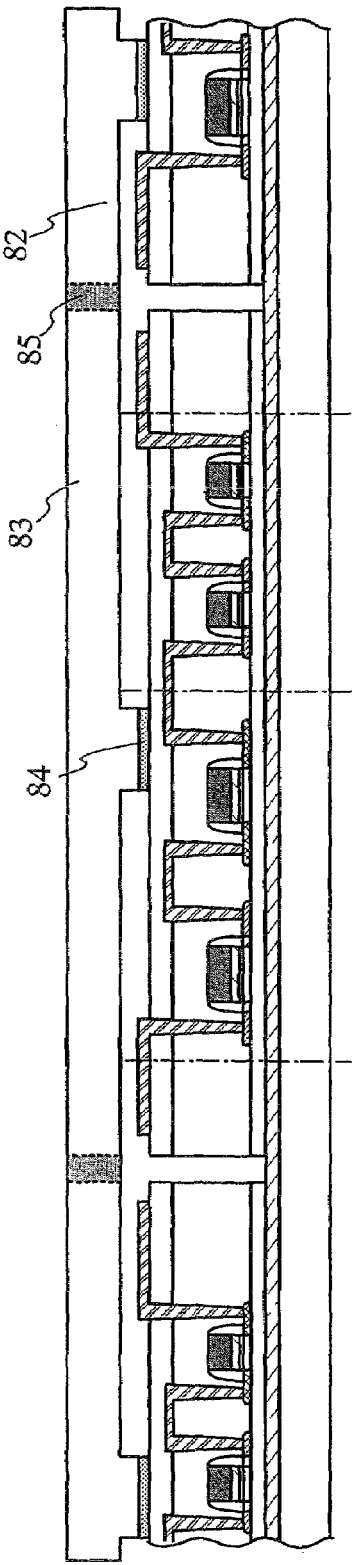

Next, a jig 83 (supporting substrate) with projecting portions 82 is attached to fix each of the thin film integrated circuits devices 13 with an adhesive material 84 interposed therebetween (FIG. 14C). The jig has a role of temporarily fixing the plurality of thin film integrated circuit devices in order to prevent the thin film integrated circuit devices from separating discretely after removing the peel-off layer. It is preferable that the jig has a structure with projecting portions provided like a comb, as shown in FIG. 14C, in order to make it easier to introduce gas or liquid including halogen fluoride later. However, a flat jig may be used. More preferably, openings 85 may be provided in order to make it easier to introduce gas or liquid including halogen fluoride later.

As the jig, for example, a glass substrate, quartz substrate, and stainless (SUS) substrate including silicon oxide, which is not damaged by halogen fluoride, as its main component can be used. As long as a material that is not damaged by halogen fluoride is used, the jig is not to be considered limited to these substrates.

As the adhesive material, a material that has adhesive force (adhesion) to be reduced or lost by UV light irradiation can be used. An UV-irradiation peeling tape manufactured by Nitto Denko is used here. In addition to this, an adhesive material that can be attached and detached repeatedly, which is used for products such as "Post-it" (registered trademark) manufactured by THREE M INNOVATIVE PROPERTIES and "NOTESTIX" (registered trademark) manufactured by MOORE BUSINESS FORMS INC., may be used. For example, an acrylic adhesive, a synthetic rubber adhesive, and a natural rubber adhesive, described in Japanese Patent Application Laid-Open No. 2001-30403, Japanese Patent No. 2992092, and Japanese Patent Application Laid-Open No. 6-299127, can be used. Of course, as long as the jig can be easily removed, the adhesive material is not to be considered limited to these materials.

Figure 15A:
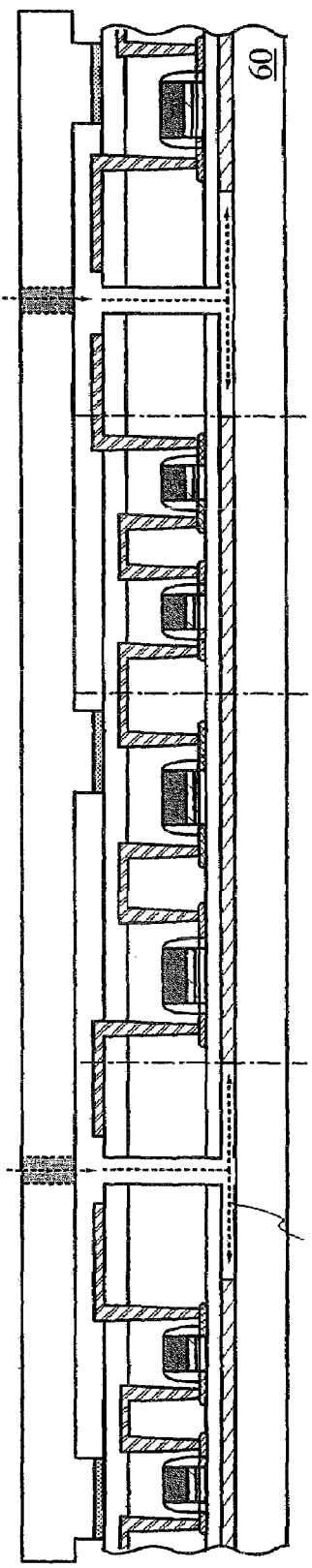
FIGS. 15A to 15C are diagrams illustrating manufacturing processes of CPUs and memories in thin film integrated circuit devices to be used in the present invention.
Figure 18:
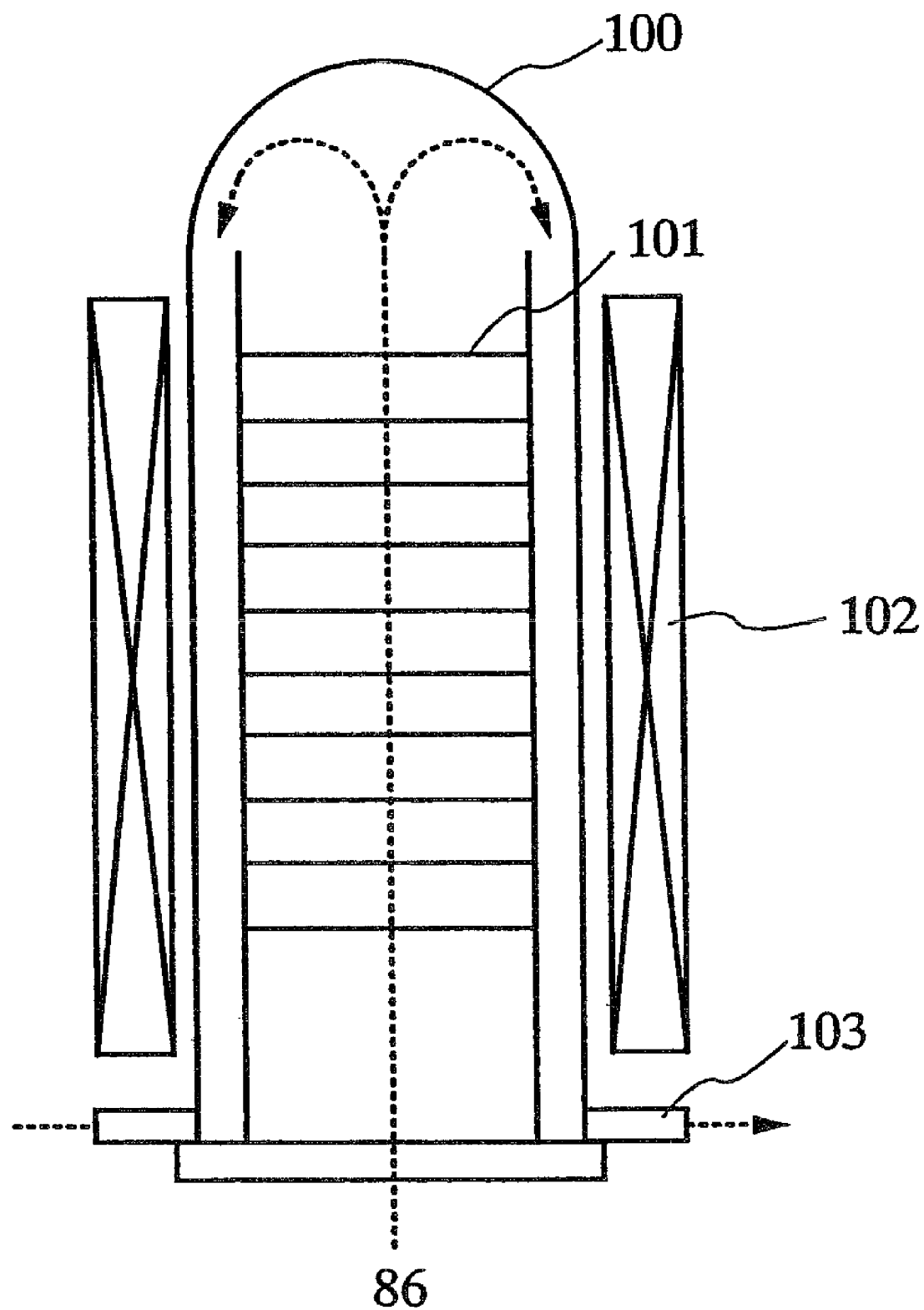
FIG. 18 is a schematic view of a low pressure CVD system.

Next, an a-Si film that is the peel-off layer is etched and removed and by introducing a halogen fluoride gas into the groove 81 (FIG. 15A). A low pressure CVD system shown in FIG. 18 is used here to etch and remove the a-Si film under conditions of gas: $ClF_3$ (chlorine trifluoride), temperature: 350° C., flow rate: 300 sccm, pressure: 6 Torr, and time: 3 h. However, the conditions, which are not limited, may be appropriately changed. Alternatively, a gas of $ClF_3$ gas mixed with nitrogen may be used, where the flow rate of the both gases can be appropriately set. In addition to $ClF_3$, A gas such as $BrF_3$ or $ClF_2$ may also be used.

The low pressure CVD system shown in FIG. 18 works in accordance with a mechanism that a halogen fluoride gas such as a $ClF_3$ gas 86 is introduced into a bell jar 100 that is a reaction field to circulate the gas to a substrate 101. In addition, a heater 102 is provided outside the bell jar, and remaining gas is exhausted from an exhaust pipe 103.

Figure 15B:
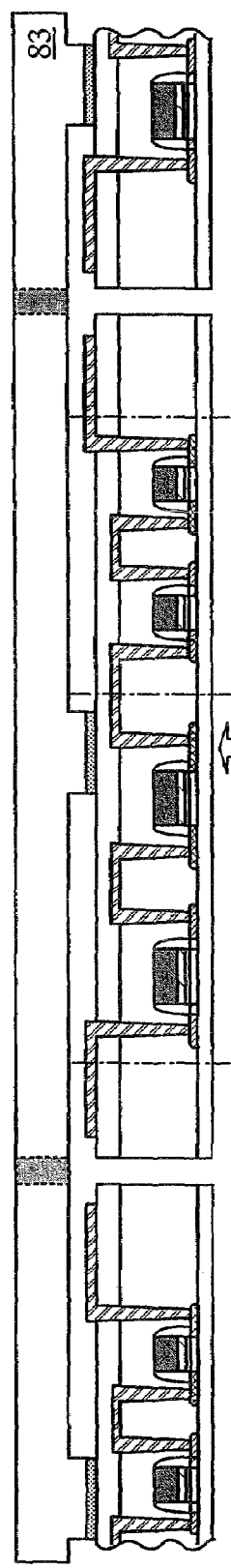

While silicon is selectively etched by halogen fluoride such as $ClF_3$, silicon oxide, silicon nitride, SiOxNy, or SiNxOy is hardly etched. Accordingly, the peel-off layer 61 is etched with time so that the substrate 60 can finally be peeled) (FIG. 15B). On the other hand, the base film (protective film), interlayer film, or protective film including a material such as silicon oxide, silicon nitride, silicon oxynitride (silicon oxide including nitrogen), or a heat-resistant resin is hardly etched, damage to the thin film integrated circuits can be prevented. The peeled substrate 60 can be of course used again, which leads to reduction in cost.

The material of the peel-off later 61 is not to be considered limited to the silicon-based material mentioned above as long as the peel-off layer 61 can be removed by using halogen fluoride such as $ClF_3$. In addition, the material of the protective film or interlayer film is not limited to the materials mentioned above as long as the layer is not damaged by halogen fluoride such as $ClF_3$.

Figure 15C:
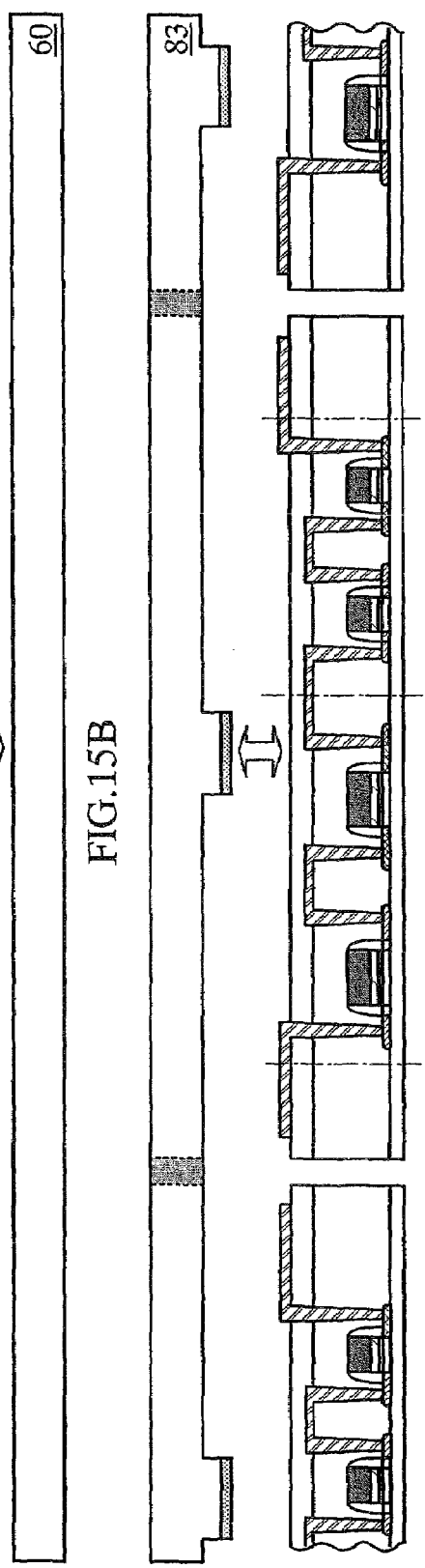

Next, the adhesion of the adhesive material 84 is reduced or lost by UV light irradiation to separate the jig from the thin film integrated circuit devices. This makes it possible to mass-produce thin film integrated circuit devices 13. It is preferable to use the jig again for reduction in cost (FIG. 15C).

The thin film integrated circuit devices 13 manufactured according to the method described above can be carried with the use of, for example, small vacuum tweezers, and attached to desired portions of articles such as ID labels and ID cards.

As a method for separating the substrate, a method may be employed, in which stress is given to a substrate with thin film integrated circuit devices formed to separate the substrate physically. In this case, materials such as W, $SiO_2$, and $WO_3$ can be used for a peel-off layer. In order to give stress, shock may be applied with a diamond pen or the like. The present embodiment can be freely combined with any of the other embodiment modes and embodiments.

Embodiment 2

In the present embodiment, a case will be described, where the substrate 60 is used again in the case of scratching the substrate 60 on forming the groove 81 by a method such as dicing.

Figure 19A:
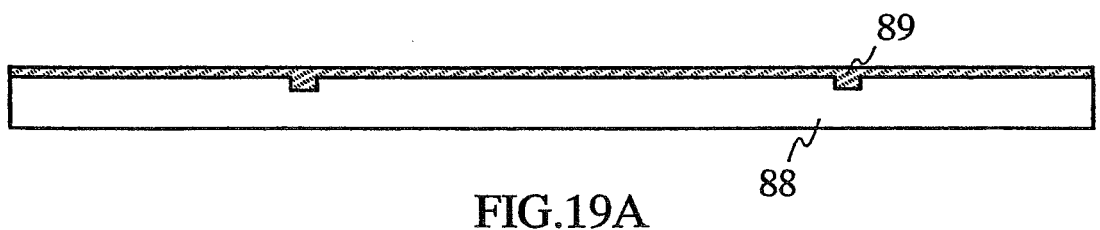
FIGS. 19A to 19C are diagrams illustrating various substrates to be peeled.

As a first method, a planarization film 89 is formed on a used substrate 88 as shown in FIG. 19A. As the planarization film 89, polyimide, acrylic, polyamide, or a heat-resistant resin such as siloxane can be formed by a method such as spin coating, dipping, spraying, or droplet discharge. In consideration of a post-process of thermal treatment, it is preferable to use a heat-resistant resin such as siloxane. Alternatively, an inorganic material such as PSG (phosphosilicate glass), BPSG (borophosohposilicate glass), or alumina may be used. The following processes are the same as in the other embodiment mode or embodiment.

As a second method, not shown in a figure, there is a method of using CMP (chemical mechanical polishing) for planarization of a surface of a substrate, which is particularly effective in the case where the used substrate 88 has minute scratches. In CMP, a polishing solvent referred to as slurry is supplied in a pad for polishing, and pressure is applied by spinning of a wafer carrier and spinning of a turntable referred to as a platen as polishing by the pad for polishing to conduct planarization. As the slurry, slurry mixed with alkali colloidal silica is commonly used. The following processes are the same as in the other embodiment mode or embodiment. The present embodiment can be freely combined with any of the other embodiment modes and embodiments.

Embodiment 3

In the present embodiment, a case of using a substrate other than a glass substrate or a quarts substrate as a substrate to be peeled) will be described.

Figure 19B:
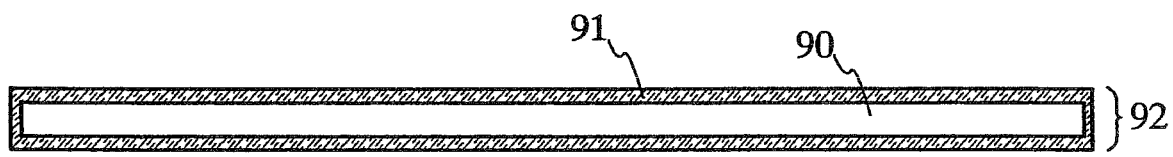

In a first example, a silicon wafer 90 is prepared, and an oxide film 91 (silicon oxide film) is formed at a surface of the silicon wafer 90 by performing a thermal treatment to obtain a thermally oxidized silicon substrate 92 (FIG. 19B). As a method for the thermal treatment, for example, a thermal treatment at 800 to 1200° C. (preferably at about 900° C. or 1150° C.) in the atmosphere which oxygen and nitrogen exist may be performed, which, however, is not limited to these temperatures.

Although all surfaces or at least one surface around the semiconductor substrate may be oxidized, it is preferable that all of the surfaces around the semiconductor substrate are oxidized to form silicon oxide, in order not to damage the semiconductor substrate when halogen fluoride such as $ClF_3$ is used to separate a thin film integrated circuit from the substrate later. The semiconductor forming the semiconductor substrate is not limited to silicon.

Instead of the semiconductor substrate with the oxide surface, a substrate with a nitride or oxynitride surface may be used. For example, a substrate such as a single-crystal silicon substrate or thermally oxidized silicon substrate with a surface into which a nitride ion is injected may be used. Also, a substrate including a metal such as a stainless substrate (SUS substrate), which has a surface on which an insulating film such as silicon oxide or silicon nitride is formed, may be used.

After that, a peel-off layer, a base protective film, and a TFT is formed on the oxide film 91, and gas such as halogen fluoride is used to perform separation. After forming a TFT directly on the oxide film 91 without providing a peel-off layer or a base protective film, separation may be performed by removing the silicon wafer 90.

Figure 19C:
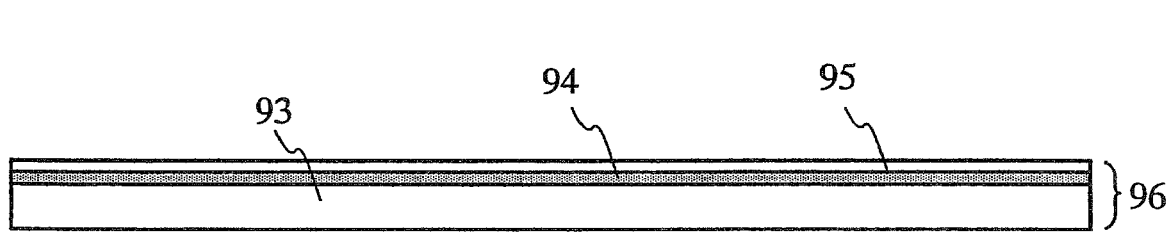

In a second example, a silicon wafer is prepared, and oxygen ions are injected by doping. Then, a buried oxide film 94 is formed by a heat treatment at 900 to 1200° C. (FIG. 19C). This heat treatment temperature is not to be considered limited to this. However, since the heat treatment also has a role of improving the degree of crystallinity of a single-crystalline silicon layer on the surface side (an upper c-Si layer 95) damaged by doping as well as the role of forming the buried oxide film, it is necessary to control the heating temperature in consideration of these roles. Thus, a SIMOX substrate 96 comprising a lower c-Si layer 93, the buried oxide film 94, and the upper c-Si layer 95 is obtained.

Instead of oxygen ions, nitrogen ions may be injected by doping to obtain a SOI substrate. Although not shown in the figure, a polished substrate (a so-called laminated substrate) may be used, which has a device wafer on which an oxide film is formed (a Si substrate on the side of a device to be formed) and a handle wafer (a Si substrate) bonded to each other so that the oxide film is disposed in the center.

After that, when a TFT is formed, the upper c-Si layer 95 may be used as a semiconductor layer (active layer) of the TFT. In the case of separation with the use of halogen fluoride gas, the lower c-Si layer 93 may be all or partially removed. The buried oxide film 94 functions as a protective film (base film). The present embodiment can be freely combined with any of the other embodiment modes and embodiments.

Embodiment 4

Figure 17A:
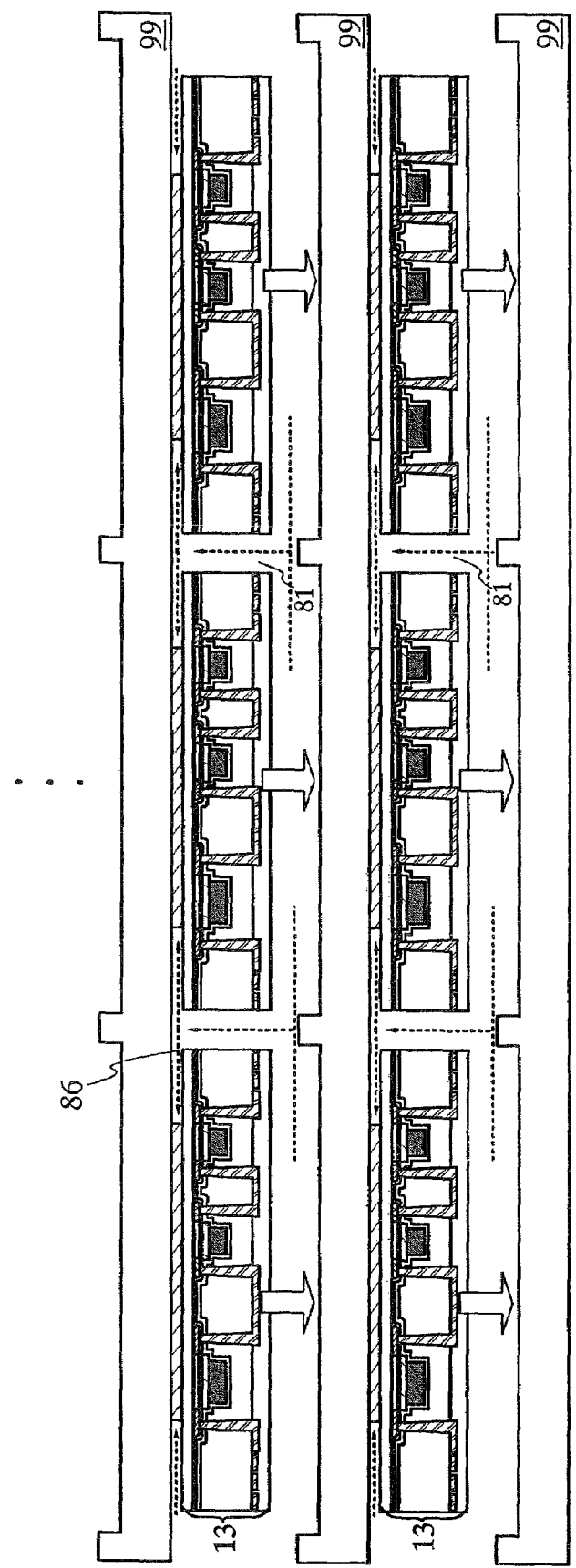
FIGS. 17A and 17B are diagrams illustrating a method of peeling thin film integrated circuit devices (using a substrate to be used also as a tray)
Figure 17B:
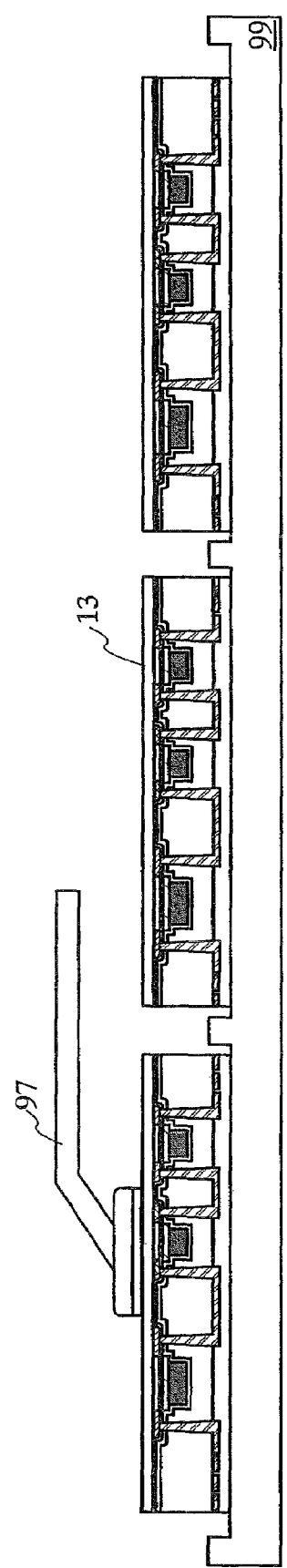

In the present embodiment, a thin film integrated circuit device and manufacturing method thereof according to the present invention will be described with reference to FIGS. 17A and 17B. The method has no adhesive bonding with the use of a jig. First, the state of FIG. 14B (the state in which the groove 81 is formed) is made in the same way as in the embodiment described above.

Next, in the state of FIG. 14B, a plurality of substrates 99 to be used also as a tray, over which thin film integrated circuit devices are formed, are put with their faces down in a furnace (bell jar; refer to FIG. 18) of a low pressure CVD system and fixed, where the substrates over which the thin film integrated circuit devices are formed also has a function as a tray that receives thin film integrated circuit devices. Of course, substrates and trays may be provided separately. Then, when halogen fluoride such as ClF$_3$ is used to etch a peel-off layer, the separated upper thin film integrated circuit devices are made to fall into the back (tray region) of the substrate 99 to be used also as a tray, over which the lower thin film integrated circuit devices are formed.

The distance between the tray region and the thin film integrated circuit device is preferably 0.5 to 1 mm in order to prevent the separated thin film integrated circuit devices from separating discretely and easily supply halogen fluoride such as ClF$_3$. Further, in order to prevent the separated thin film integrated circuit devices from separating discretely, it is preferable to form projecting portions in the tray region of the substrate 99 to be used also as a tray depending on the size of the thin film integrated circuit device, as shown in FIG. 17A.

After separating the devices, the thin film integrated circuit device loaded on the tray region is carried by adsorption with the use of small vacuum tweezers 97 or the like (FIG. 17B), and transferred to a desired product.

As the tray 97 and the substrate 99 to be used also as a tray, various substrates, for example, a thermally oxidized silicon substrate, a SOI substrate such as a SIMOX substrate, a glass substrate, a quartz substrate, a SUS substrate, an alumina substrate, and a heat-resistant flexible substrate (plastic substrate or the like), can be used. However, it is preferable to be resistant to halogen fluoride and heat.

The use of the method described above makes it possible to mass-produce thin film integrated circuit devices without using a jig. The present embodiment can be freely combined with any of the other embodiment modes and embodiments.

Embodiment 5

In the present embodiment, a method will be described with reference to FIGS. 20A to 20C and FIGS. 21A to 21D, where an antenna manufactured on a flexible substrate and a thin film integrated circuit device manufactured separately from the antenna are later connected.

Figure 20A:
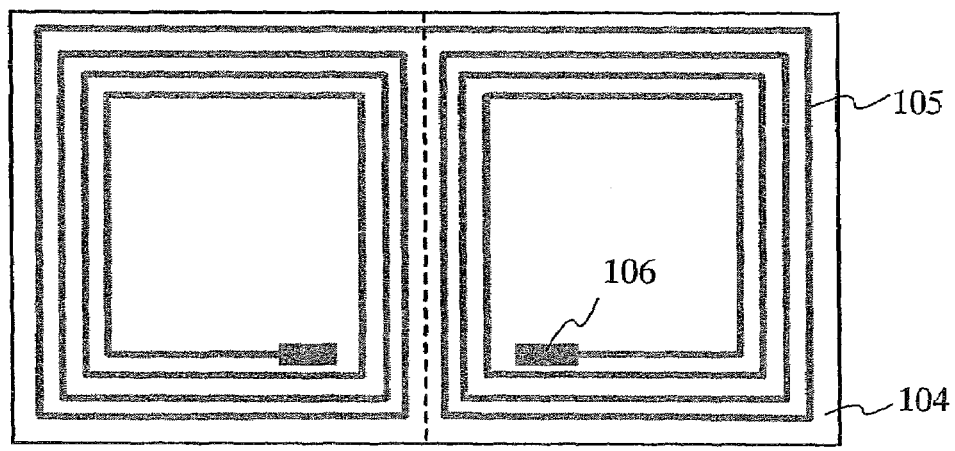
FIGS. 20A to 20C are diagrams illustrating a case of folding an antenna substrate.
Figure 20B:
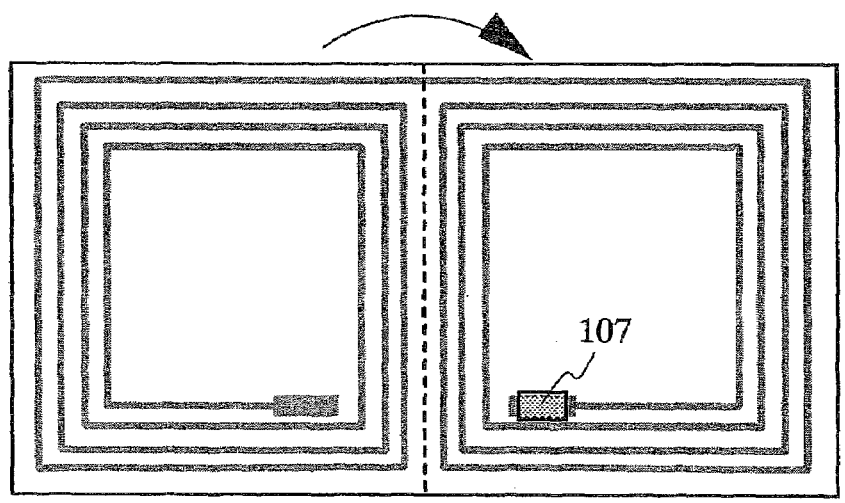
Figure 20C:
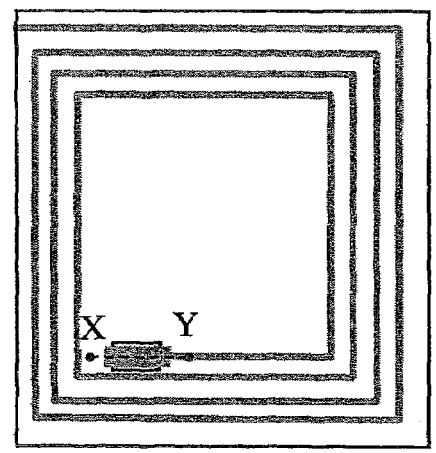

FIGS. 20A to 20C show a case of manufacture an ID label, an ID card, or the like by forming an antenna 105 on a foldable flexible substrate 104, connecting a separately formed IDF chip 107 to the antenna 105, and then, folding the flexible substrate 104 in half for sealing, where the antenna 105 may be formed by patterning after sputtering or the like, or by using droplet discharge to selectively discharge a composition including a conductive material, and then drying and sintering the composition. After forming the antenna 105, flatness may be improved by a method such as CMP or press.

For the antenna 105, a connecting pad 106 for connecting the antenna 105 and the thin film integrated circuit device (IDF chip) 107 to each other may be formed. The connecting pad 106 may be formed on the side of the thin film integrated circuit device. The thin film integrated circuit device 107 and the antenna 105 can be connected by using an anisotropic conductive film or a known method such as bonding. The shape of the antenna 105 is not limited to the shape shown in FIGS. 20A to 20C, in the case of an electromagnetic induction type, as long as the antenna 105 has a symmetrically coiled shape when folded. Of course, another communication systems such as an electromagnetic coupling type, a microwave type, and an optical communication type can also be appropriately employed.

Figure 21A:
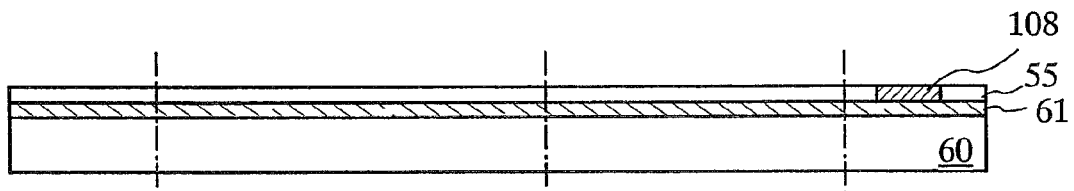
FIGS. 21A to 21D are diagrams illustrating manufacturing processes of a thin film integrated circuit device in the case of folding an antenna substrate.
Figure 21B:
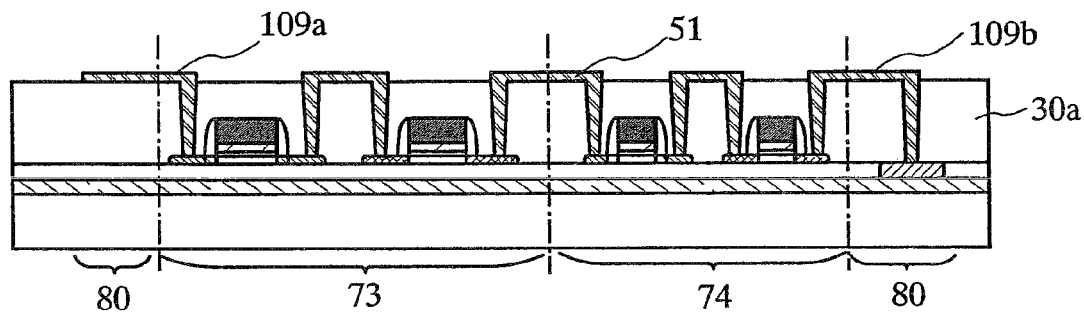
Figure 21C:
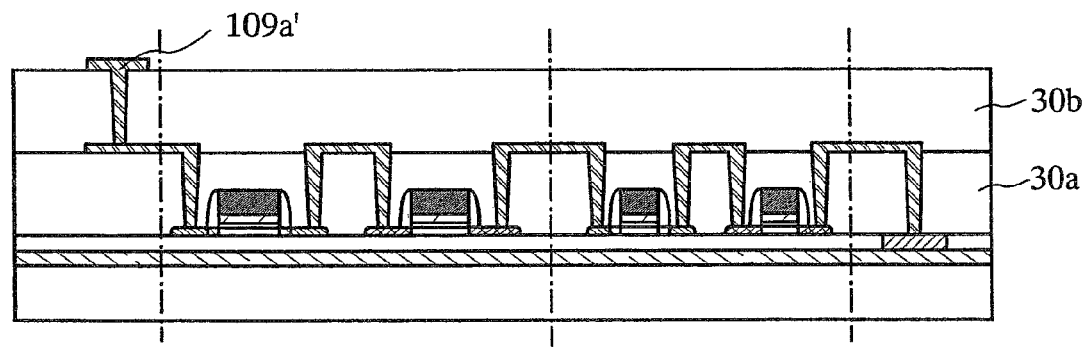
Figure 21D:
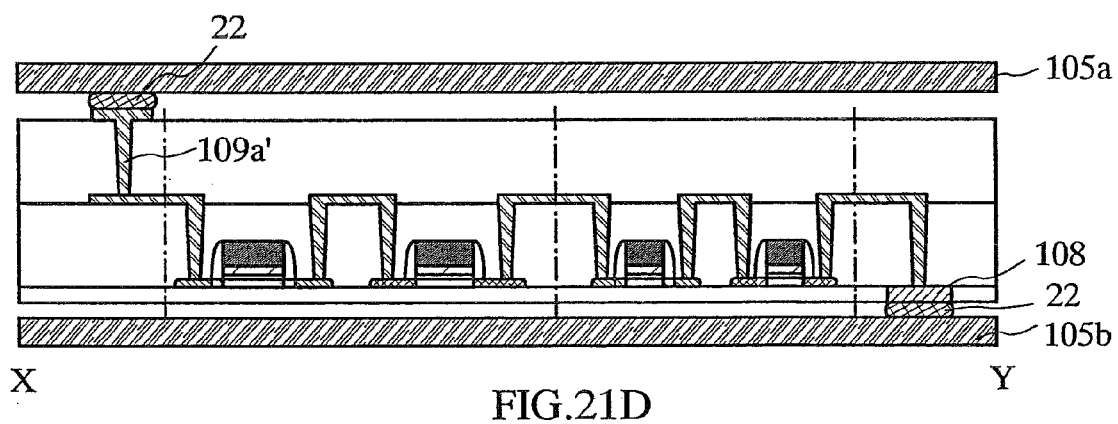

FIG. 21D is a cross-sectional view illustrating a state of the folded antenna substrate along the line X-Y in FIG. 20C. Now, a method for connecting a foldable antenna substrate and a thin film integrated circuit device (IDF chip) to each other will be described with reference to FIGS. 21A to 21D.

First, a peel-off layer 61 including a material such as a-Si is formed on a substrate 60, and a protective film 55 is formed. In this case, a connecting terminal 108 is formed, which is connected to a lower antenna 105b after folding an antenna substrate (FIG. 21A). A planarization treatment may be carried out after forming a connecting terminal by patterning of a conductive film and then forming a protective film. Alternatively, after forming a protective film selectively to leave a portion on which a connecting terminal is to be formed, the connecting terminal may be formed by discharging and filling a conductive material by a method such as droplet discharge.

Next, after forming TFTs constituting a CPU, a memory, and the like according to the embodiment described above, a first interlayer film 30a is formed, and further, contact holes are formed to form an upper connecting wiring 109a for connecting to an upper antenna 105a, a lower connecting wiring 109b for connecting to a lower antenna 105b, and a wiring 51 (FIG. 21B). Next, after forming a second interlayer film 30b, contact holes are formed to form an upper connecting wiring 109a for connecting to the upper antenna 105a (FIG. 21C). A filler may be mixed in the first interlayer film 30a and the second interlayer film 30b.

Next, the IDF chip including the various wirings formed is attached to a connecting pad 106 of the flexible substrate 104 on which the antenna 105 is formed. In this case, the IDF chip can be connected according to the method shown in FIGS. 4A and 4B or FIGS. 5A and 5B. In the present embodiment, the connecting terminal 108 and the connecting pad 106 provided on the lower antenna 105b are connected to each other with an ACF 22 provided therebetween. In addition to an ACF, a bonding method such as a known bonding, ultrasonic bonding or UV bonding may be used.

Next, the flexible substrate 104 is folded, the connecting pad of the upper antenna 105a and the upper connecting wiring 109a' are connected in the same way with an ACF interposed therebetween. It is preferable to mold a material such as an epoxy resin between the antenna and thin film integrated circuit device. In this case, stress due to a difference in coefficient of thermal expansion between the resin and the antenna can be prevented from being generated by including a filler in the resin. This makes it possible to prevent peeling and cracks of the resin.

As described in the present embodiment, by connecting the antenna to the upper and lower portion of the thin film integrated circuit device with the antenna folded, the antenna can be formed above and below the thin film integrated circuit device so that the receiving area is increased so as to improve the receiving accuracy. The present embodiment can be freely combined with any of the other embodiment modes and embodiments.

Embodiment 6

Figure 22A:
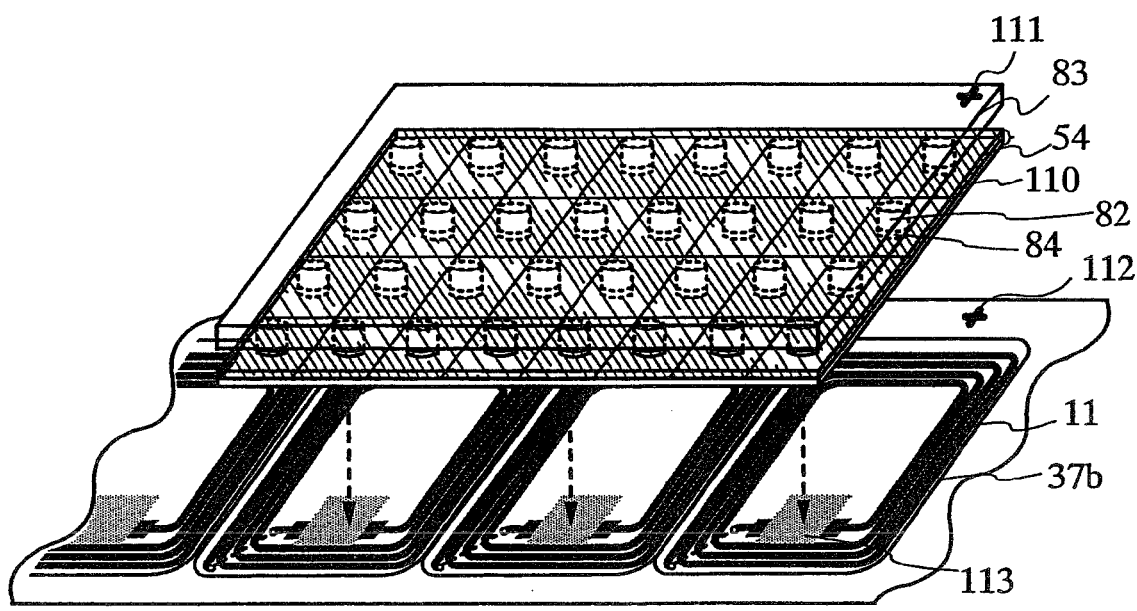
FIGS. 22A to 22C are diagrams illustrating a method of attaching an IDF chip to a substrate of a commercial product (selective UV light irradiation)

In the present embodiment, a method will be described with reference to FIGS. 22A to 22C, in which a device separated by using a halogen fluoride gas is directly bonded to a commercial product such as an ID card without removing a jig 83 bonded to the IDF chip.

First, in manner of the embodiment described above, a plurality of IDF chips 110 is formed, and the jig 83 is attached with an adhesive material 84 interposed therebetween. As the jig 83, a jig with projecting portions 82 is used as shown in FIG. 22A. As the adhesive material 84, a material that has adhesion to be reduced or lost by UV light irradiation is used here. In addition, a protective film 54 including an organic material or an inorganic material is provided in order to prevent damage to the devices. Then, the devices are separated from each other by etching with halogen fluoride such as $ClF_3$.

Next, the devices with the jig 83 bonded are transferred and aligned with a stage on which the commercial product such as an ID card. In this case, alignment marks 111 and 112 provided with the jig and stage can be used as shown in FIG. 22A, and not shown in the figure, a mark formed directly on a commercial product can be used. At a portion of the commercial product on which a thin film integrated circuit device is to be formed (here, a lower card substrate 37b of the ID card), an adhesive material 113 is formed in advance, and a desired device is attached to a desired portion of the commercial product by controlling the position of the jig (FIG. 22A).

Figure 22B:
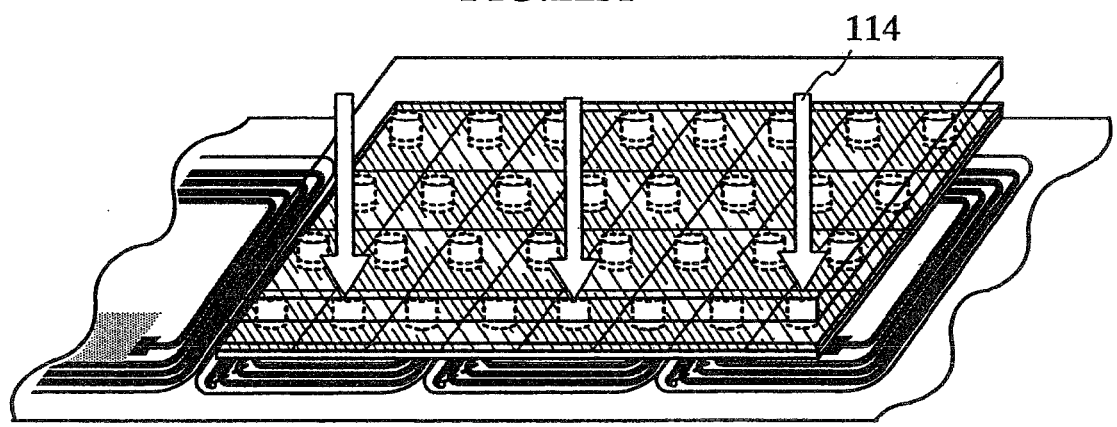
Figure 22C:
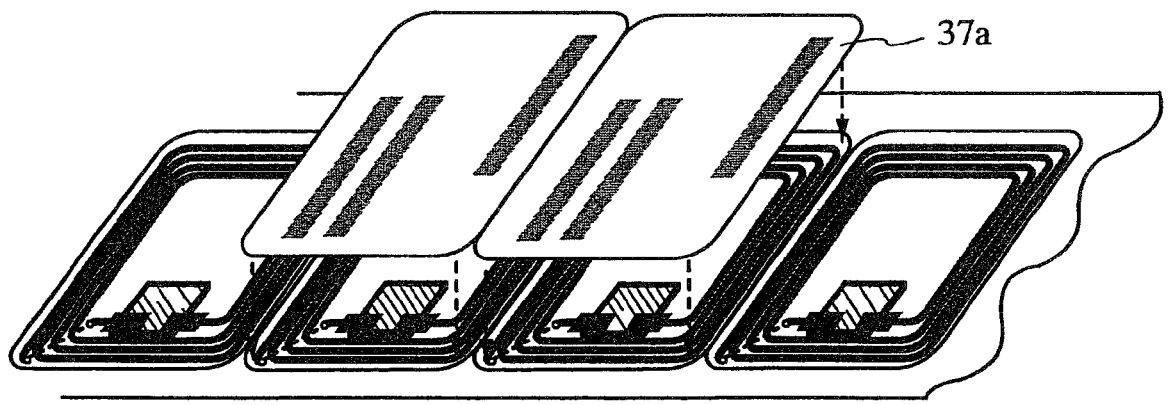

Next, the device to be attached to the lower card substrate 37b is irradiated selectively with UV light 114 through a mask to reduce or lose adhesion of the adhesive material 84, and thereby the jig is separated from the device (FIG. 22B). This makes it possible to form a desired IDF chip 110 at a desired portion of the commercial product. After forming the device, the device is covered with, for example, an upper card substrate 37a (FIG. 22C). Although a case of forming an antenna 11 in the card substrate is shown here, an antenna may be formed in the device.

By using the method described in the present embodiment according to the present invention, a desired device can be formed at a desired portion without allowing the devices to separate discretely when the devices are separated from each other by etching with halogen fluoride such as $ClF_3$.

It is obvious that the present embodiment can be applied to not only ID cards but also various commercial products. The present embodiment can be freely combined with any of the other embodiment modes and embodiments.

Embodiment 7

In the present embodiment, the structure of a TFT, in the case of disposing an IDF chip to a commercial product such as an ID label that is foldable in one direction, will be described.

Figure 23:
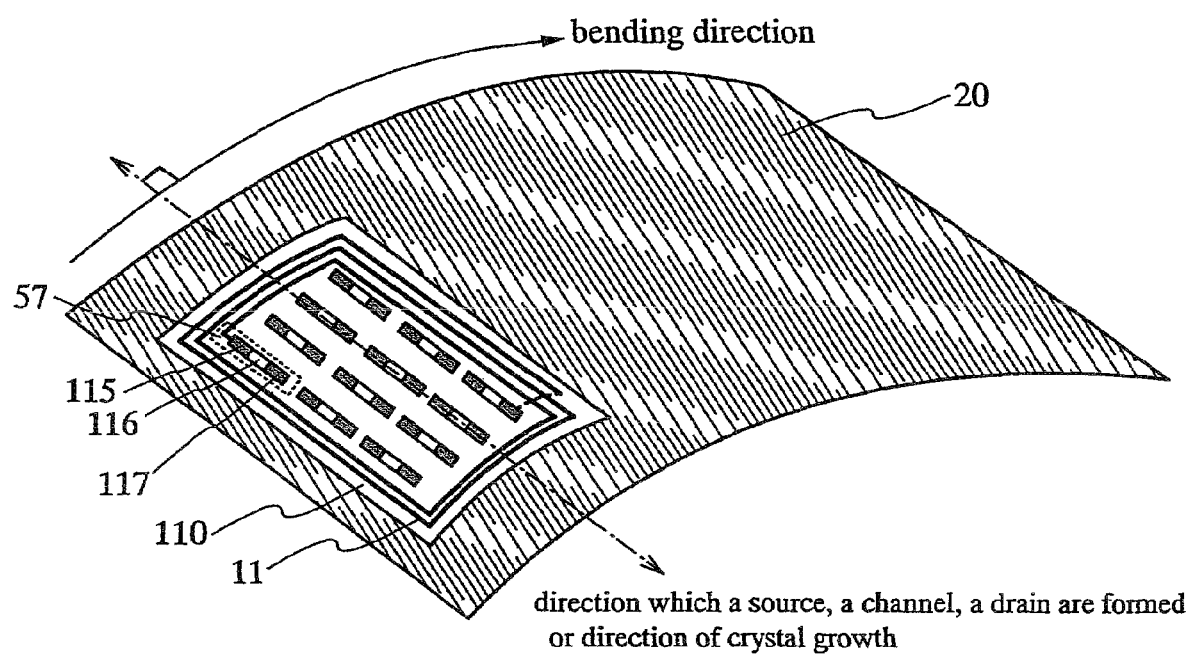
FIG. 23 is a diagram showing the relationship between a direction of forming a source/channel/drain region of a TFT and a direction of folding a substrate of a commercial product.

FIG. 23 is a top view of island-shaped semiconductor films 57 in TFTs in an IDF chip 110 formed on an ID label 20. In the island-shaped semiconductor film 57, a source region 115 and a drain region 117 to which an n-type or p-type impurity is given and a channel region 116 to which the impurity is not given are formed. The semiconductor region of at least one of the TFTs in the IDF chip 110 is connected to an antenna 11.

The bending direction of the ID label 20 is arranged so as to be a direction substantially perpendicular to the direction in which the source (S), the channel (C), the drain (D) are formed or the direction of crystal growth in the semiconductor film. Therefore, when the ID label 20 is bent, cracks can be prevented from being generated in the island-shaped semiconductor films 57, and stable TFT operations can be supplied regardless of handling of the ID label 20.

Embodiment 8

In the present embodiment, a case of employing high-temperature polysilicon (HPS) in the process of Embodiment 1 will be described. In general, a semiconductor process including a crystallization process at the upper temperature limit (about 600° C.) of a glass substrate or more is referred to as a high-temperature process.

After forming a semiconductor film, the above-mentioned catalyst such as Ni is added to the semiconductor film, and then a heat treatment is performed in a LPCVD furnace. At about 700° C. or more, a crystal nucleus is generated in the semiconductor film to promote crystallization.

After that, a gate insulating film is formed by LPCVD after forming island-shaped semiconductor films. For example, gas of a silane-based gas mixed with $N_2$ or $O_2$ is used to form a HTO film (High Temperature Oxide Film) at a high temperature of 900° C. or more.

Next, by depositing polysilicon (p-Si) including an n-type impurity such as phosphorus to be a film thickness of 150 nm, gate electrode layers are formed. Further, W—Si (tungsten silicide) may deposited to be a film thickness of 150 nm. As a forming method thereof, a method such as sputtering or CVD can be appropriately employed. Doping processes thereafter can be performed in the same way as in Embodiment 1.

After the doping processes, thermal activation at 950° C. for 30 minutes is performed to activate impurity regions. Further, BPSG is used for reflow, and planarization is conducted by etch back with a resist. Furthermore, hydrogenation annealing at 350° C. is performed to recover plasma damage.

The other processes can be performed in the same way as in Embodiment 1. Although the TFTs have a top-gate structure in the present embodiment, a bottom-gate structure (inversely staggered structure) may be employed. The present embodiment can be freely combined with any of the other embodiment modes and embodiments.

Embodiment 9

In the present embodiment, a case of employing SAS (Semi-Amorphous Silicon) for the island-shaped semiconductor films 57 in the process of Embodiment 1 will be described. The SAS can be obtained by glow discharge decomposition of silicide gas. $SiH_4$ is a typical silicide gas, and in addition, it is also possible to use gasses such as $Si_2H_6$, $SiH_2Cl_2$, $SiHCl_3$, $SiCl_4$, and $SiF_4$. When this silicide gas is used after being diluted with one or more rare gas elements selected from the group consisting of hydrogen, hydrogen and helium, argon, krypton, and neon, the SAS can be easily formed. It is preferable to dilute the silicide gas at a dilution ratio in the range of 10 to 1000 times. Of course, under reduced pressure, which may be in the range of approximately 0.1 Pa to 133 Pa, a film is formed by glow discharge decomposition. In order to generate glow discharge, electric power from 1 to 120 MHz, preferably high-frequency power from 13 to 60 MHz may be supplied. The substrate heating temperature is preferably 300° C. or less, and a substrate heating temperature from 100 to 200° C. is recommended.

In addition, a carbide gas such as $CH_4$ or $C_2H_6$ or germanide gas such as $GeH_4$ or $GeF_4$ may be mixed in the silicide gas to control the energy band width to be 1.5 to 2.4 eV or 0.9 to 1.1 eV.

The SAS shows a weak n-type electric conduction property when no impurity element is added purposefully for valence electron control. This is because oxygen is easily mixed in the semiconductor film due to glow discharge at a higher electric power than in the case of depositing an amorphous semiconductor Consequently, by doping the first semiconductor film, in which a channel forming region of a TFT is provided, with an impurity element imparting p-type conductivity at the same time as this deposition or after the deposition, it becomes possible to control a threshold voltage. As the impurity element imparting p-type conductivity, boron is common, and an impurity gas such as $B_2H_6$ or $BF_3$ may be mixed in the silicate gas at a ratio of 1 to 1000 ppm. For example, in the case of using boron as the impurity element imparting p-type conductivity, the concentration of the boron may be controlled to be $1\times10^{14}$ to $6\times10^{16}$ atoms/cm. By using the SAS to form a channel forming region, a field effect mobility of 1 to 10 $cm^2/V\cdot sec$ can be obtained.

In the case of using SAS, it is also possible to omit a process of crystallizing a semiconductor film (high-temperature heating process). In this case, a chip can be formed also directly on a flexible substrate. Although a TFT is not formed on a silicon wafer in principle in the present invention, it is possible to use a silicon wafer as a substrate to be peeled before to a flexible substrate or the like. The present embodiment can be freely combined with any of the other embodiment modes and embodiments.

Embodiment 10

In the present embodiment, applications of an ID label, an ID tag, and an ID card according to the present invention and examples of commercial products to which those are attached will be described with reference to FIGS. 24A to 24E and FIGS. 25A to 25D.

FIG. 24A shows an example of a state of completed products of ID labels according to the present invention. On a label board 118 (separate paper), a plurality of ID labels 20 incorporating an IDF chip 110 is formed. The ID labels 20 are put in a box 119. In addition, on the ID label 20, information on a commercial product or service (for example, an name of article, a brand, a trademark, a trademark owner, a seller, and a manufacturer) is written, while an ID number that is unique to the commercial product (or the kind of the commercial product) is assigned to the incorporated IDF chip to make it possible to easily figure out forgery, infringement of intellectual property rights such as a patent and a trademark, and illegality such as unfair competition. In addition, a lot of information that is too much to write clearly on a container of the commercial product or the label, for example, the production area, selling area, quality, raw material, efficacy, use, quantity, shape, price, production method, directions for use, time of the production, time of the use, expiration date, and instructions of the commercial product, and information on the intellectual property of the commercial product, can be input in the IDF chip so that a transactor and a consumer can access the information by using a simple reader. While the producer can also easily rewrite or delete the information, a transactor or consumer is not allowed to rewrite or delete the information, either.

Figure 24B:
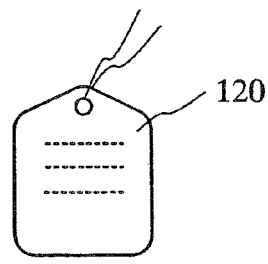

FIG. 24B shows an ID tag 120, which has an IDF chip incorporated. By mounting the ID tag 120 on commercial products, the management of the commercial products becomes easier. For example, in the case where the commercial product is stolen, the thief can be figured out quickly by tracing the pathway of the commercial product. In this way, by providing the ID tag, commercial products that are superior in so-called traceability can be distributed.

Figure 24C:
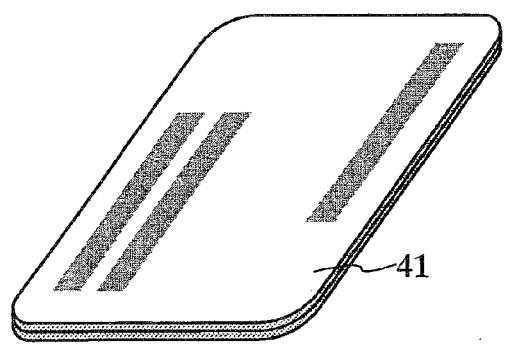

FIG. 24C shows an example of a state of a completed product of an ID card 41 according to the present invention. The ID card includes all cards such as a cash card, a credit card, a prepaid card, an electronic ticket, electronic money, a telephone card, and a membership card.

Figure 24D:
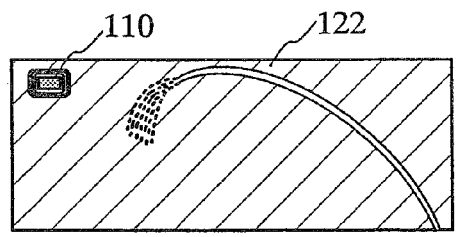

FIG. 24D shows a state of a completed product of a bearer bond 122 to which the present invention is applied. The bearer bond 122 has an IDF chip 110 implanted, and resin is molded at the periphery thereof to protect the IDF chip 110, where a filler is included in the resin. The bearer bond 122 can be made in the same way as an ID label, an ID tag, or an IC card according to the present invention. The bearer bonds include, but not limited to of course, stamps, tickets, admission tickets, gift coupons, book coupons, stationery coupons, beer coupons, rice coupons, various gift coupons, various service coupons.

Figure 24E:
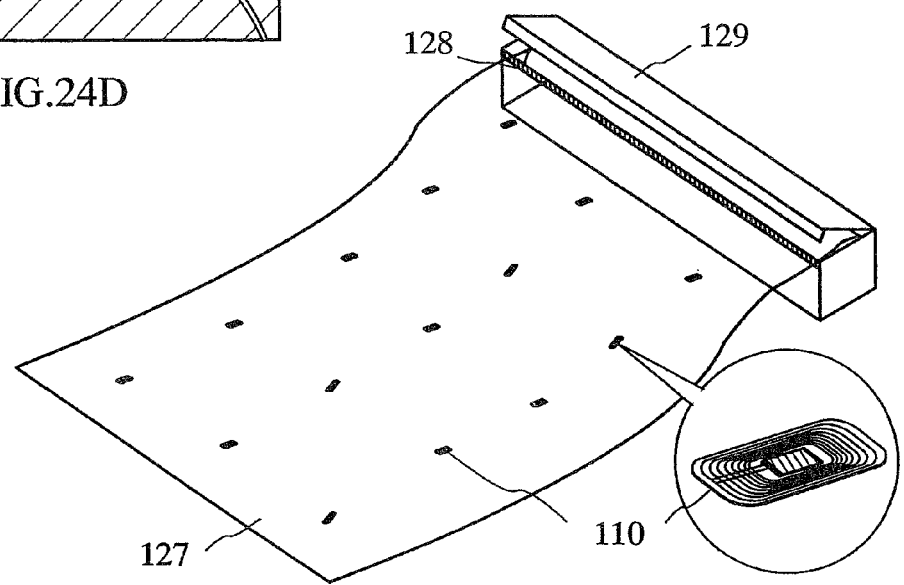

FIG. 24E shows a state of a completed product of a film 127 for wrapping, to which the present invention is applied. The film 127 for wrapping has an IDF chip 110, and resin is molded at the periphery thereof to protect the IDF chip 110, where a filler is included in the resin. The films 127 for wrapping can be manufactured, for example, by scattering IDF chips at will on a lower film and covering the IDF chip with an upper film is with a filling layer interposed therebetween. The films 127 for wrapping are put in a box 129, and a desired amount of film can be cut away with a cutter 128 and used. The material of the films 127 for wrapping is not particularly limited. For example, materials such as thin film resin, aluminum foil, and paper can be used.

FIGS. 25A and 25B respectively show a book 123 and a plastic bottle 124 to which an ID label 20 is attached. The ID label that is used in the present invention is quite thin. Therefore, when the ID label is mounted on articles such as the book 123, the function or design is not damaged. Further, in the case of a non-contact type thin film integrated circuit device, an antenna and a chip can be integrally formed to make it easier to transfer the non-contact type thin film integrated circuit device directly to a commercial product with a curved surface.

FIG. 25C shows a state in which an ID label 20 is directly attached to fresh food such as fruits 131. In addition, FIG. 25D shows an example in which fresh food such as vegetables 130 is wrapped in films for wrapping. When an IDF chip 110 is attached to a commercial product, there is the possibility that the IDF chip 110 is peeled. However, when the commercial product is wrapped in films 127 for wrapping, it is difficult to peel the film 127 for wrapping, which brings some merit for security. An IDF chip according to the present invention can be applied to all commercial products including the commercial products described above.

Embodiment 11

In the present embodiment, a method for managing commercial products carrying an ID label or an ID tag according to the present invention and flows of information and commercial products will be described with reference to FIGS. 26A and 26B, FIG. 27, and FIG. 28.

First, a case of a customer purchasing a commercial product in a shop will be described with reference to FIG. 26A. To a commercial product 132 displayed in a shop, an ID label 20 or an ID tag storing information such as information unique to the commercial product 132 and history of producing is attached. When a customer holds a R/W 133 prepared in the shop for customers or his/her own R/W over the commercial product 132 to communicate with the ID label 20 or ID tag attached to the commercial product 132 through an antenna portion 134 of the R/W 133, the customer can read the information store in the ID label 20 or ID tag.

It is preferable that customers can freely read information and select purchase/non-purchase with use of operation keys 136. Further, read information is displayed on a display portion 135 provided in the R/W 133. The information includes the price of a commercial product, consumption tax, country of origin, producer, where the commercial product is imported from, time of producing, best-before date, and applications of the commercial product (such as a recipe in the case of food). Further displaying the total purchased amount at the purchase offers convenience.

When the R/W 133 for customers is connected to a POS system 137 (point-of-sale system: system of information management at the time of selling, in other wards, system for sales management, customer management, inventory management, purchase management, and the like by making an automatic reader to read an ID label, an ID tag, or the like that is attached to a commercial product at the time of selling the commercial product and directly inputting into a computer), conventional reading of a bar-code at checkout counter is unnecessary.

When the R/W 133 or the POS system 137 is connected to a personal account 138 such as electronic money to result in automatic withdrawal of the purchase amount or using expense, efficient purchasing with cashless, or the like without a register is possible. In addition, when an individual has an electronic money card, communicating with the R/W makes a settlement possible on the spot. As the electronic money card, of course, an ID card according to the present invention can be employed. Further, when a gate for management of commercial products is provided in the doorway of the inside of a shop, a commercial product that is not input into the R/W or the POS system (namely, not purchased) is checked to enable preventing a theft.

Figure 26A:
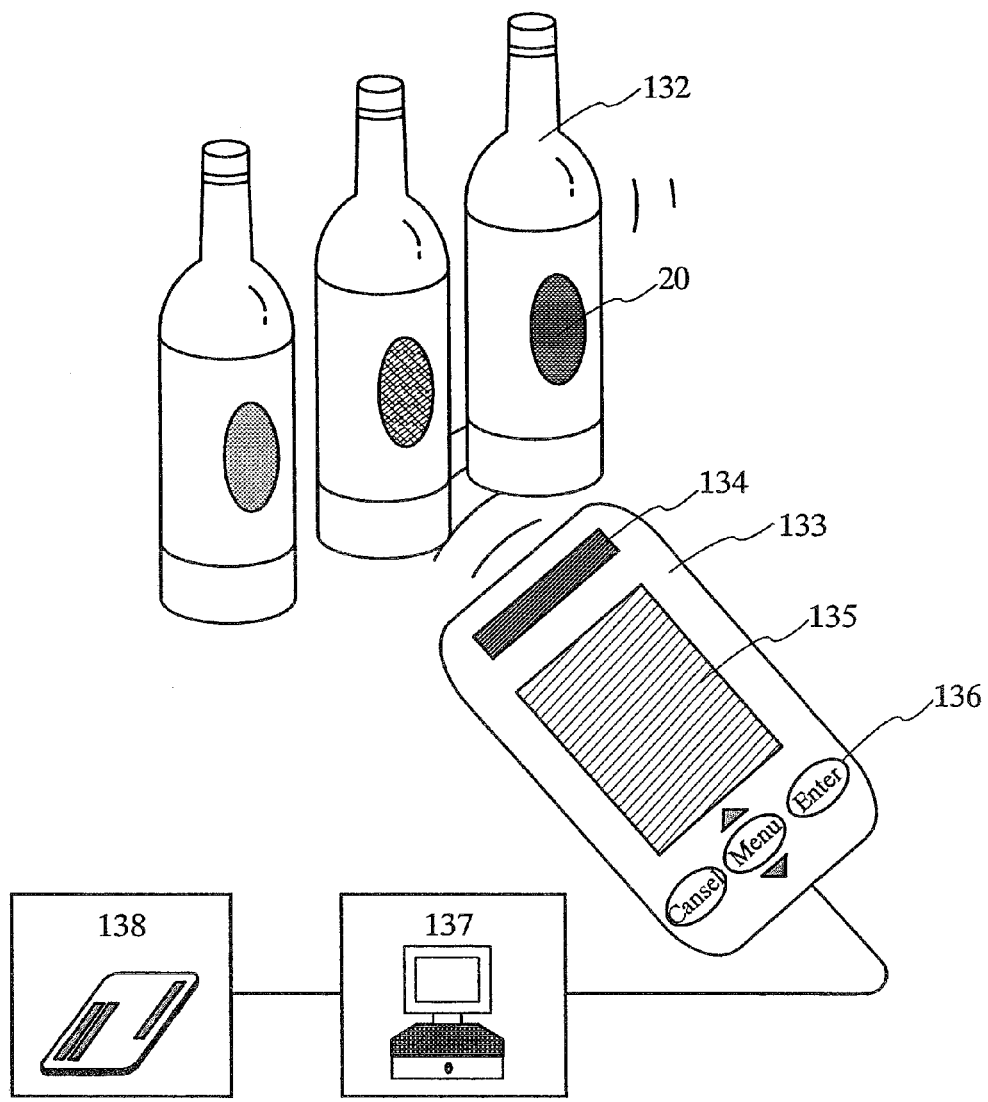
FIGS. 26A and 26B are diagrams illustrating an example of purchasing a commercial product in a store.
Figure 26B:
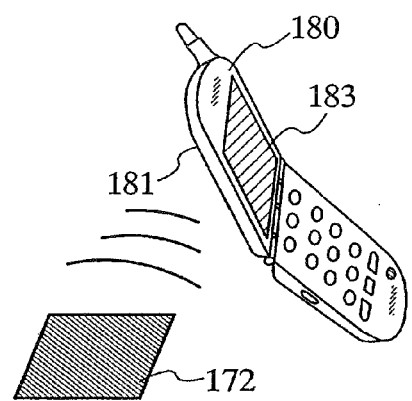

The shape or function of the R/W is not limited to what is shown in FIG. 26A. For example, as shown in FIG. 26B, a portable information terminal owned by an individual, such as a cellular phone body 180 with a R/W function, may be used to display information on a commercial product 172 carrying an ID label or an ID tag on a display portion 183 through a sensor portion 181. In this way, as compared with information provided from a conventional radio frequency tag or the like, consumers can freely obtain more information on commercial products.

In the case of a non-contact type thin film integrated circuit device incorporated in a commercial product according to the present invention, the commercial product is classified into a very close type, a close type, an adjacent type, or a remote type depending on the distance and frequency between the commercial product such as a card and a reader/writer. The very close type is an electromagnetic induction type with a communication distance of 0 to 2 mm, where a communication frequency of 4.92 GHz is used. The close type is an electromagnetic induction type with a communication distance of approximately 10 cm, where a communication frequency of 13.56 MHz is used. The adjacent type is an electromagnetic induction type with a communication distance of approximately 70 cm, where a communication frequency of 13.56 MHz is used. The remote type is a microwave type with a communication distance of approximately several meters.

It is a feature of a non-contact IC that electric power is supplied by electromagnetic induction (electromagnetic induction type), mutual induction (electromagnetic coupling type), or induction due to static electricity (static coupling type) of a coiled antenna. By controlling the number of windings of this antenna, the frequency to be received can be selected. For example, by increasing the frequency to make the wavelength shorter, the number of windings of an antenna can be reduced.

As compared with a contact type thin film integrated circuit device, a non-contact type thin film integrated circuit device is not made to come in contact with the reader/writer, and supply of power and communication of information are conducted without contact. Therefore, the non-contact type thin film integrated circuit device is not destroyed to have higher ruggedness, it is unnecessary to worry about errors due to a cause such as static electricity. Further, it is easy to handle the thin film integrated circuit device, which may merely be held over the reader/writer with an uncomplicated structure.

Figure 27:
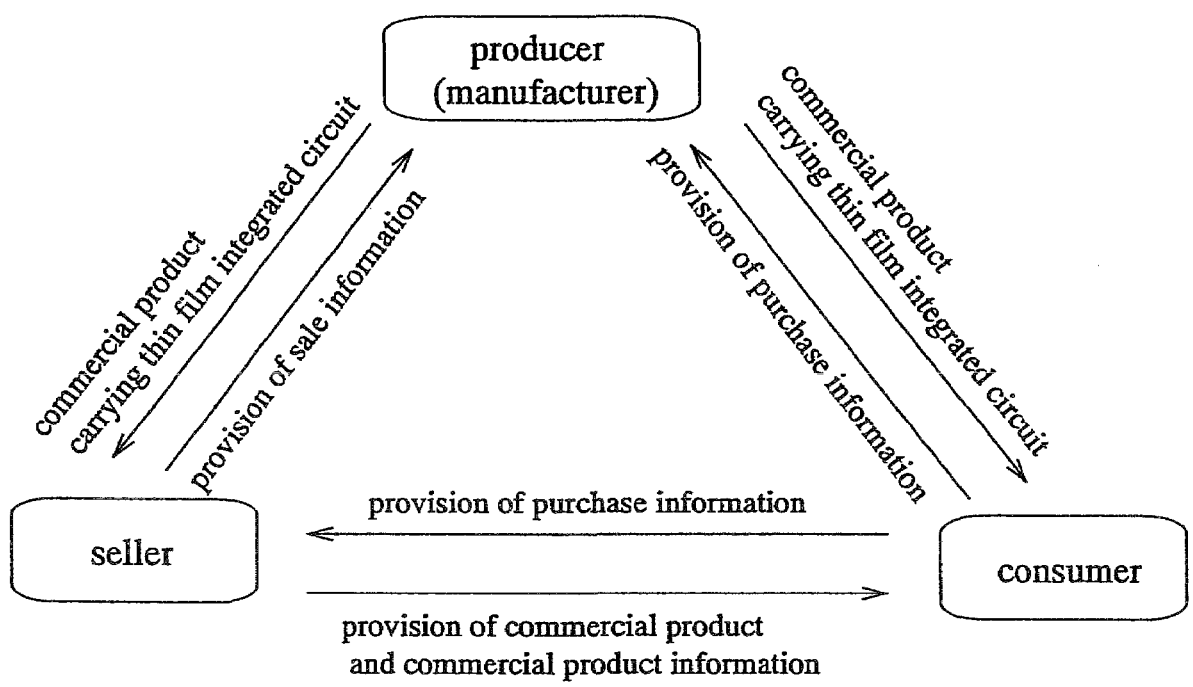
FIG. 27 is a diagram showing the relationship among a producer (manufacturer), a seller, and a consumer.

Here, flows of commercial products carrying an ID label, an ID tag, or the like according to the present invention will be briefly described. In FIG. 27, a producer (manufacturer) provides commercial products carrying a thin film integrated circuit device to a seller (such as a retailer or a distributor) or a consumer. Then, the seller can provide sales information such as price information, the number of sold commercial products, and time of the sales to the producer on settlement of the consumer, for example. On the other hand, the consumer can provide purchase information such as personal information. For example, by using a credit card carrying a thin film integrated circuit device or a personal reader, or the like, the purchase information can be provided through the Internet or the like to the seller and the producer. Further, the seller can provide commercial product information to the consumer by using the thin film integrated circuit device while the seller can obtain the purchase information from the consumer. These sales information, purchase information, or the like are valuable information, and useful for future marketing strategy.

As a means for providing all kinds of information, there is a method in which information read from the thin film integrated circuit device by a reader of the seller or the consumer is disclosed through a computer or a network to the producer (manufacturer), the seller, or the consumer. As described above, the wide variety of information can be provided through the thin film integrated circuit device to the party that needs the information. Therefore, the ID label and ID tag according to the present invention are also useful in commercial product exchange and commercial product management. The system described above can be applied to a case of distributing commercial products further from the consumer to a used product distributor.

Figure 28:
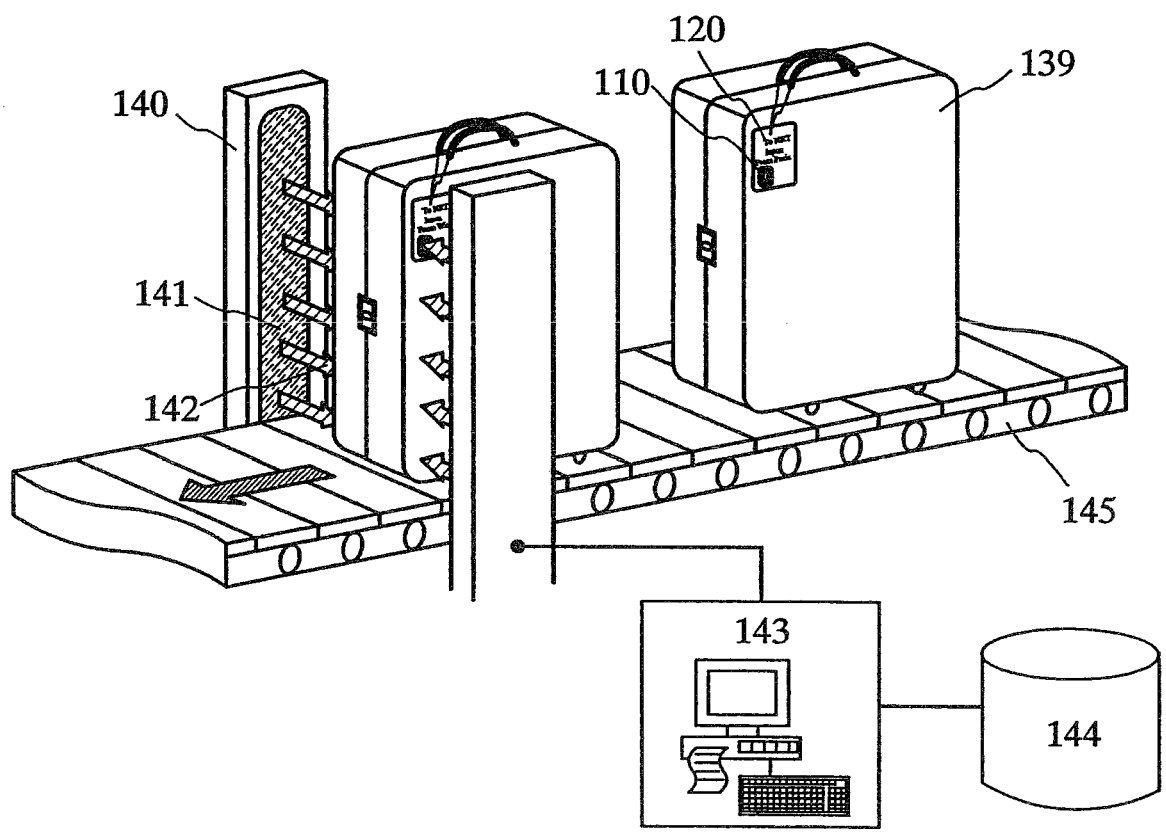
FIG. 28 is a diagram illustrating an inspection method of articles to which an ID tag is attached at a security check.

Next, a case of a luggage check at the airport will be described with reference to FIG. 28. When luggage 139 provided with an ID tag 120 into which an IDE chip 110 is incorporated is moved by a conveyor 145 to pass through a reader/writer 140, the IDF chip 110 is started by an electromagnetic wave 142 oscillated from an antenna 141 to convert information included in a memory into signals and send the signals back to the reader/writer 140 so that the information can be recognized by a computer 143.

The computer 143 is connected to a database 144 in which information on only commercial products distributed properly (lawfully) in the marketplace (hereinafter, referred to as "authentic products") to which an ID label or an ID tag is attached or into which an IDF chip is incorporated is stored so that information on commercial products included in the luggage 139 can be checked against the database 144. Then, in the case where an object other than authentic products is included in the luggage 139, inspection is carried out, and according to need, attachment, cassation, disposal, or the like can be carried into execution. In the case of including hazardous objects or weapons that is prohibited to be carried onto the plane, which is even an authentic product, the computer 143 detects the hazardous objects or weapons. In this case, software in the computer 143 may be programmed so as to prevent the luggage from passing through the gate.

Of course, in the case of including an article responsible for illegality such as a forged article, an imitation, a contraband article, or a smuggled goods besides authentic products, the luggage is not allowed to pass through the gate. This makes it possible to prevent a forged article at the border from flowing into the country or flowing out the country. Further, hazardous objects and weapons can be detected, which leads to measures against terrorism.

Embodiment 12

In the present embodiment, examples of communication principles of an ID label, an ID tag, an ID card, and the like according to the present invention will be described with reference to FIGS. 29 to 31.

Figure 29:
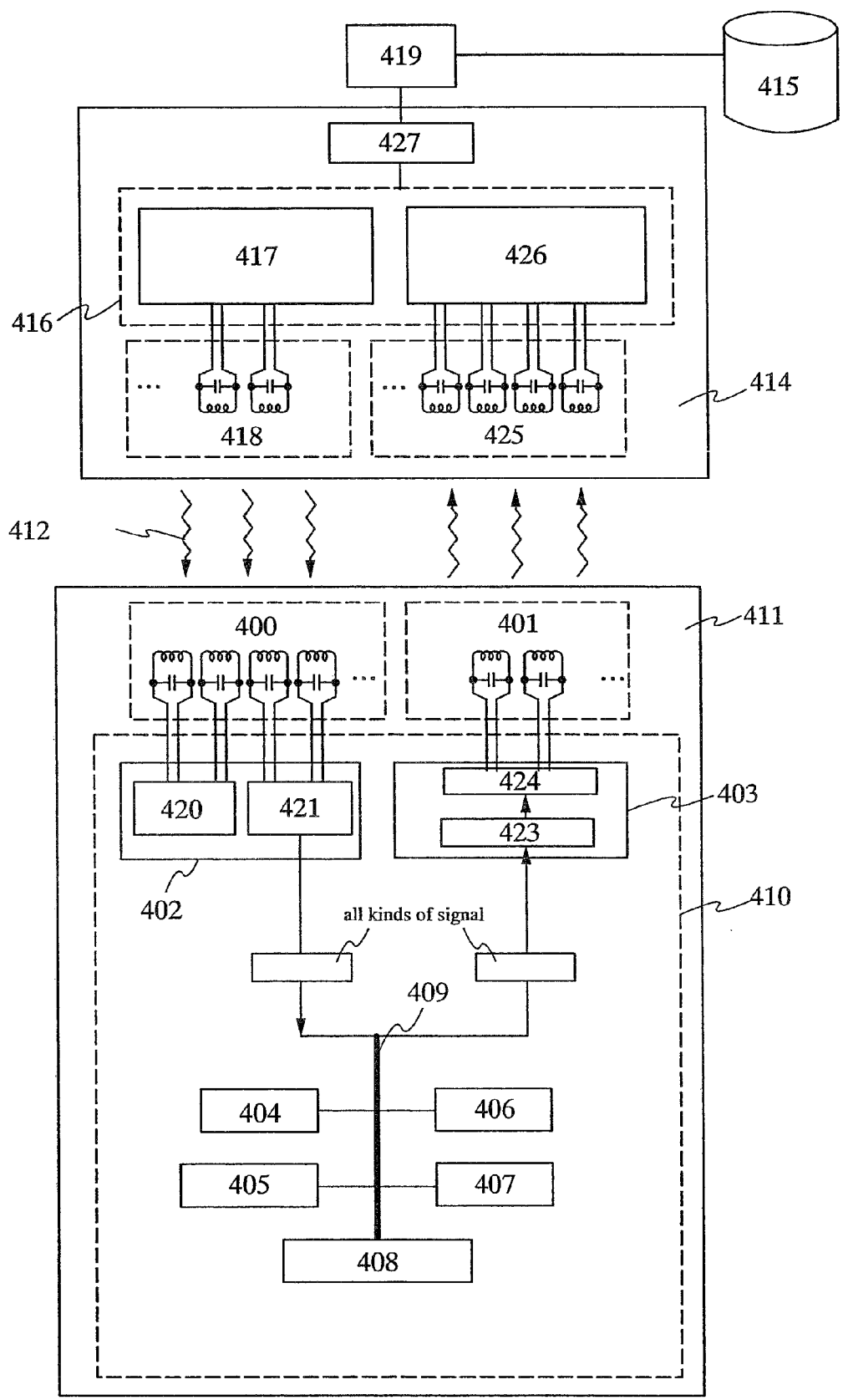
FIG. 29 is a block diagram illustrating a configuration of an ID label according to the present invention.

FIG. 29 shows a block diagram of an article 411 such as an ID label and reader/writer 414. Reference numeral 400 denotes an antenna for input, and reference numeral 401 denotes an antenna for output. In addition, reference numeral 402 denotes an interface for input, and reference numeral 403 denotes an interface for output. The number of the all kinds of antennas is not limited to the number shown in FIG. 29. The shapes of the antennas are not limited to a coiled shape, either. An electromagnetic wave 412 received by the antenna 400 for input from an antenna 418 for output of the reader/writer 414 is demodulated or converted into a direct-current in the interface 402 for input, and then, supplied through a bus 409 to various circuits such as a CPU 404, a coprocessor 405, a ROM 406, a RAM 407, and a nonvolatile memory 408.

The coprocessor 405 serves as an assistant processor that works to aid the CPU 404 as a main processor when all processing is controlled in a thin film integrated circuit device 410. Generally, the coprocessor 405 functions as an instruction execution unit exclusively for processing codes, and can execute processing of codes, which is necessary for applications such as settlements. As the nonvolatile memory 408, for example, an EPROM, an EEPROM, an UV-EPROM, a flash memory, or an FRAM in which information can be rewritten more than once is preferably used.

The nonvolatile memory 408 is separated into a program memory (a region in which a program is stored), a working memory (a region in which data is temporarily saved in the process of executing a program), and a data memory (a region in which fixed data treated by a program is stored in addition to information unique to a commercial product). Generally, a ROM is used as the program memory, and a RAM is used as the working memory. In addition, the RAM also functions as a buffer during communicating with a R/W. In order to store data input as signals in a predetermined address, an EEPROM is generally used.

Information unique to a commercial product, which is stored in the memory, is converted into signals in the various circuits described above, and further modulated in the interface 403 for output, and transmitted to the R/W 414 by the antenna 401 for output. In the interface 402 for the input, a rectifier circuit 420 and a demodulator circuit 421 are provided. An alternating-current power supply voltage input from the antenna 400 for input is rectified in the rectifier circuit 420 and supplied to the above-mentioned various circuits as a direct current power supply voltage. In addition, various alternating-current signals input from the antenna 400 for input are demodulated in the demodulator circuit 421. Then, the various signals with waveforms shaped by the demodulation are supplied to the various circuits.

In the interface 403 for output, a modulation circuit 423 and an amplifier 424 are provided. Various signals input from the various circuits to the interface 403 for output are modulated in the modulation circuit 423 and amplified or buffer-amplified, and then, transmitted from the antenna 401 for output to a terminal device such as a R/W. After an antenna 425 of the R/W 414 for input receives signals transmitted from the non-contact type thin film integrated circuit device 411 and the signals are demodulated in an interface 426 for input, the demodulated signals are transmitted through a controller 427 to a computer 419, and data processing is performed with or without a database 415 so that information unique to a commercial product can be recognized.

Although the computer 419 described above has software that has a function of processing information on commercial products, of course, hardware may be used for information processing. Consequently, as compared with work of reading a bar-code one-by-one in the conventional way, time and labor for information processing and errors are reduced to reduce burden for management of commercial products.

The various circuits shown in FIG. 29 show just one of configurations according to the present invention. The various circuits mounted on an article 411 and R/W 414 are not limited to the above-mentioned circuits. FIG. 29 shows an example using antennas as the non-contact type. However, the non-contact type is not limited to this example. A light-emitting element, a light sensor, or the like may be used to transmit and receive data with light.

In FIG. 29, the interface 402 for input and the interface 403 for output, which include an analog circuit such as the rectifier circuit 420, the demodulator circuit 421, or the modulation circuit 423, the CPU 404, the various memories, and the like are formed in a thin film integrated circuit. In addition, in the R/W 414, an interface for output 417 and the interface 426 for input may be formed in an integrated circuit 416. However, the configuration is just one example, and the present invention is not limited to this configuration. For example, the interface 402 for input and the interface 403 for output, which include an analog circuit such as the rectifier circuit 420, the demodulator circuit 421, and the modulation circuit 423 can be formed in an IC chip while the CPU 404, the various memories, and the like can be formed in a thin film integrated circuit formed by using TFTs.

FIG. 29 shows an example of supplying a power supply voltage from a reader/writer that is a terminal device. However, the present invention is not limited to this configuration. For example, not shown in the figure, a solar cell may be provided in a non-contact type integrated circuit device. Alternatively, an extremely thin battery such as a lithium battery may be incorporated.

Figure 30:
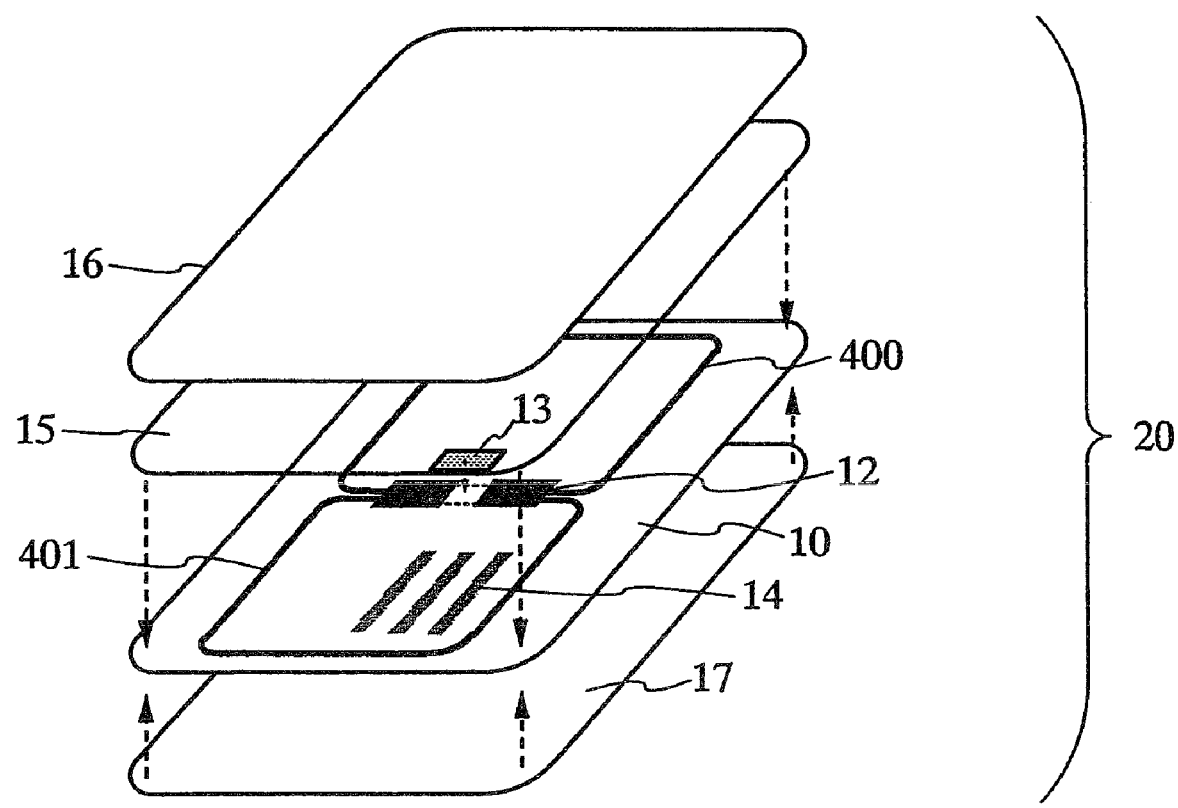
FIG. 30 is a perspective view illustrating a structure of an ID label according to the present invention (antenna for input and antenna for output)
Figure 31:
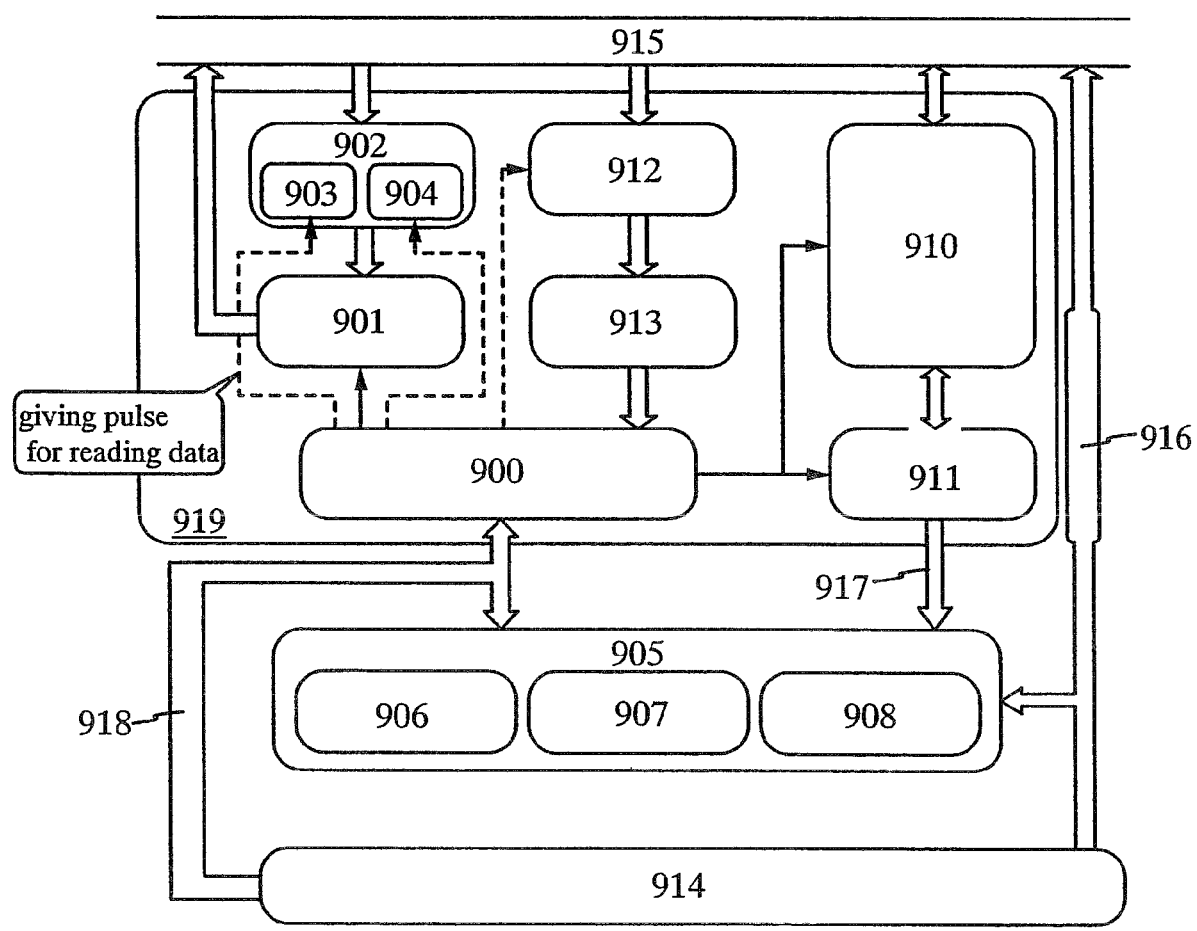
FIG. 31 is a block diagram illustrating a configuration of a CPU in a thin film integrated circuit device.

FIG. 30 is a perspective view illustrating an ID label 200 in the case where an antenna 400 for input and an antenna 401 for output are formed separately. Although the specific manufacturing method of the ID label 20 is the same as the method of Embodiment Mode 1, there are four terminal areas for connecting a thin film integrated circuit device 13 to the antennas. The structure in the case where the antenna 400 for input and the antenna 401 for output are formed separately is not to be considered limited to this.

Now, the structure of a CPU in a thin film integrated circuit device will be described briefly. FIG. 31 shows a block diagram of an integrated circuit including a CPU, a memory, and interface for input and output. First, for a CPU 919, the step of reading an instruction from a program memory 906 in a main memory 905 is indispensable. Therefore, it is necessary to specify the address where there is the instruction through an address bus 917. In this case, an address administration portion 911 executes specification of addressing to the main memory 905. Information in the main memory 905 is executed through a control bus 918.

When the address is specified to the program memory 906, the instruction stored in the address is output, and the output instruction is once taken in an instruction register 912 through a data bus 916 and an internal bus 915. Various registers or a group of resisters 910 includes a memory element for working, which is used for storing data and execution states in the CPU 919, and used for performing various processes in the CPU 919.

The instruction once taken in the instruction register 912 is transmitted to an instruction decoder 913. The instruction decoder 913 first translates the received instruction to convert to controlling information that can be comprehended by a controlling portion 900, and instructs the controlling portion 900 on what to do. The instruction decoder 913 specifies the whereabouts (register or memory) of information to be processed in accordance with the instruction. The term "translation" here indicates that data of a plurality of input signals (bits) are converted into a specific signal.

The instruction from the instruction decoder 913 to the controlling portion 900 is executed with the use of a signal. The controlling portion 900 has signal lines (controlling signals) for controlling circuits that perform various processes corresponding to classes of information, and each of the controlling signals has a switch circuit attached. When the switch is on, the controlling signal can be output to the circuit.

In the case where the content of the instruction is related to the arithmetic, the controlling portion 900 outputs a controlling signal for the arithmetic processing (a pulse signal for reading data) to a processor 901. An arithmetic register 902 to be subject to the arithmetic is divided into two registers 903 and 904 of processing subject and processed subject. The roles of various memories are as described above. In addition, an interface 914 for input and output plays a role in converting a signal that has a different standard into a signal that can be processed in the CPU 919 when the CPU 919 communicates with an external device (for example, a R/W).

Further, a working memory 907 is a region in which data is temporarily saved in the process of executing a program, and a data memory 908 is a region in which fixed data treated by a program is stored. As the working memory 907, a RAM (Random Access Memory) is generally used, and functions as a working area during data processing. In addition, the RAM also functions as a buffer during communicating with a R/W. In order to store data input as signals in a predetermined address, an EEPROM is generally used.

Embodiment 13

Figure 32A:
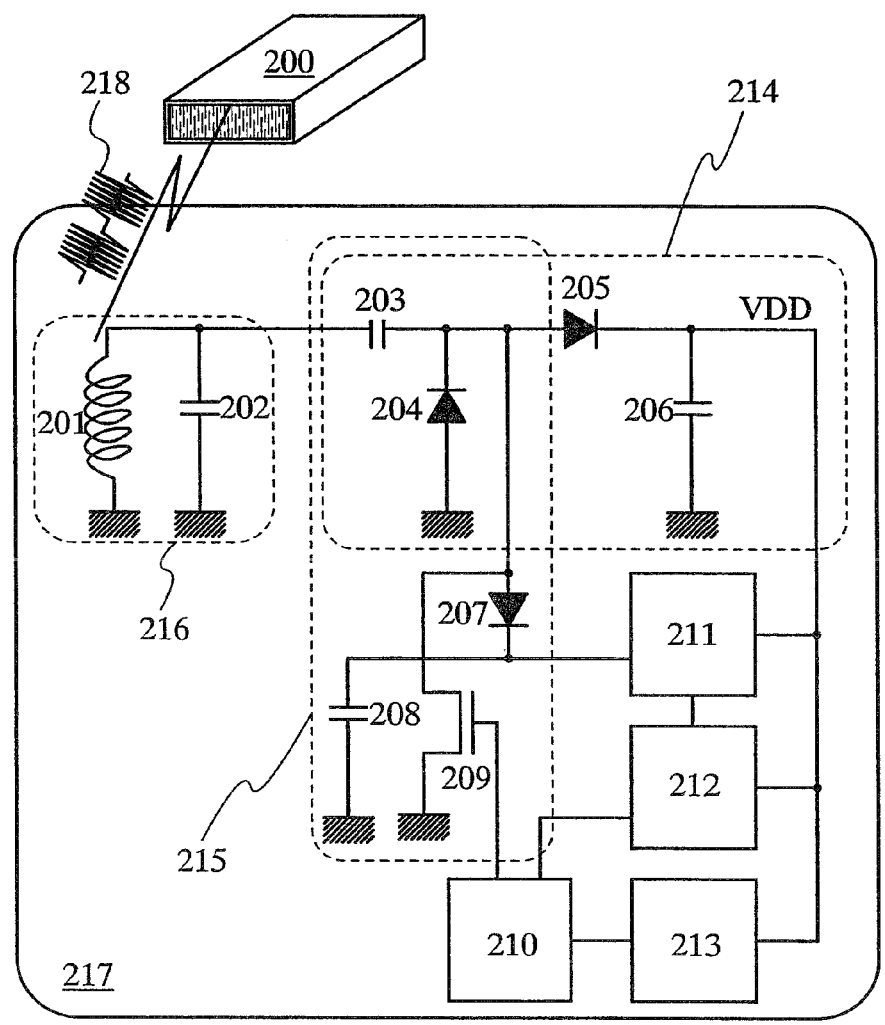
FIGS. 32A and 32B are circuit diagrams of a thin film integrated circuit device to be used in the present invention.

In the present embodiment, an example of a configuration of an IDE chip according to the present invention will be more specifically described with reference to FIGS. 32A and 32B. FIG. 32A shows a schematic diagram of an IDE chip 217, which includes a power supply circuit 214, an input and output circuit 215, an antenna circuit 216, a logic circuit 210, an amplifier 211, a clock generation circuit and decoder 212, a memory 213, or the like. The antenna circuit 216 has an antenna wiring 201 and an antenna capacitor 202.

The IDE chip 217 operates without its own power supply since electric power is supplied by receiving an electromagnetic wave 218 oscillated from a reader/writer 200. When the antenna circuit 216 receives the electromagnetic wave 218 from the reader/writer 200, a signal as a detected output signal is detected by the input/output circuit 215 including a first capacitor means 203, a first diode 204, a third diode 207, a third capacitor means 208, or the like. This signal is amplified by the amplifier 211 to have a sufficiently large amplitude, and then, separated into a clock with data and an instruction by the clock generation circuit and decoder 212. The transmitted instruction is decoded by the logic circuit 210 to make a reply of data in the memory 213 and write necessary information in the memory, for example.

The reply is made by on/off of a switching element 209 in accordance with the output of the logic circuit 210. This changes the impedance of the antenna circuit 216 to result in a change in reflectivity of the antenna circuit 216. The reader/writer 200 reads information of the IDF chip 217 by monitoring the change in reflectivity of the antenna circuit 216.

The electric power to be consumed by the respective circuits in the IDF chip 217 is supplied from a direct-current power source VDD generated by detecting and smoothing the electromagnetic wave 218 received by the power supply circuit 214. The power supply circuit 214 has the first capacitor means 203, the first diode 204, a second diode 205, and a second capacitor means 206, where the second capacitor means 206 is controlled to have sufficiently large value in order to supply electric power to the respective circuits.

Figure 32B:
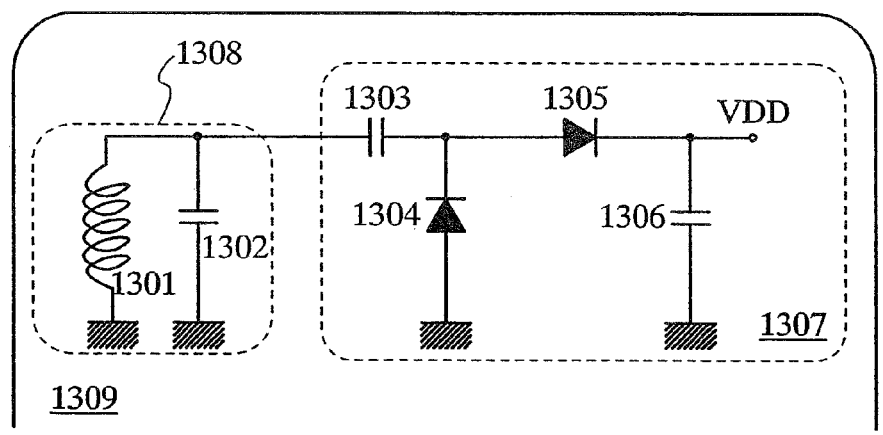

FIG. 32B shows an antenna circuit 1308 and a power supply circuit 1307 extracted from circuits to be used in an IDF chip 1309. The antenna circuit 1308 has an antenna wiring 1301 and an antenna capacitor 1302. The power supply circuit 1307 has a first capacitor means 1303, a first diode 1304, a second diode 1305, and a second capacitor means 1306.

The operation without a battery can be one of features of the IDF chip 1309. As described above, the IDE chip has a mechanism that: an electromagnetic wave oscillated from a reader/writer is taken in by the antenna circuit 1308 and rectified by the power supply circuit 1307 to generate a direct-current power source; and the circuits incorporated in the ID chip operate by the direct-current power source.

In the embodiment modes and embodiments, non-contact type thin film integrated circuit devices are mainly described. However, the thin film integrated circuit device according to the present invention can be employed also for contact type thin film integrated circuit devices, of course. For example, a magnetic stripe type or IC module contact type chip can be made. In the case of a contact type IC, a structure without an antenna may be employed. Alternatively, a combined structure of a magnetic stripe type or IC module contact type thin film integrated circuit device and a non-contact type thin film integrated circuit device may be employed.

The thin film integrated circuit device typified by an IDF chip, which is used in the present invention, can be mounted on various commercial products such as ID labels, ID cards, and ID tags. In addition, the thin film integrated circuit device can be used for banknotes, coins, bearer bonds, certificates, and securities. In particular, when applied to commercial products in the form of paper, plate, or wrap, the thin film integrated circuit device is effective. With reference to the embodiment modes and the embodiments, those products can be manufactured. As described above, the present invention can be widely applied indeed.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An article comprising:
   an antenna;
   an integrated circuit device operationally connected to the antenna; and
   a filling layer provided around the antenna,
   wherein an anisotropic conductive film is included in a connection between the integrated circuit device and the antenna,
   wherein a resin is used as the filling layer, and wherein a filler is included in the filling layer.

2. The article according to claim 1, wherein the integrated circuit device is a thin film integrated circuit device comprising a thin film transistor.

3. The article according to claim 1, wherein said article is an ID label.

4. The article according to claim 1, wherein said article is an ID card.

5. The article according to claim 1, wherein said article is an ID tag.

6. The article according to claim 1 further comprising a separator attached to the filling layer with an adhesive material layer interposed therebetween.

7. The article according to claim 1, wherein a coefficient of thermal expansion of the filling layer including the filler is less than or equal to twice a coefficient of thermal expansion of a conductive material of the antenna.

8. The article according to claim 1, wherein the filler functions to decrease or increase a coefficient of thermal expansion of the filling layer and reduces a difference in coefficient of thermal expansion between the filling layer and a conductive material of the antenna or a film forming the thin film transistor.

9. The article according to claim 1, wherein a shape of the filler is spherical or column-shaped.

10. The article according to claim 1,
    wherein a protective film comprises at least one of silicon oxide layer, silicon nitride layer, SiOxNy (x>y) layer, and SiNxOy (x>y) layer
    wherein the protective film is formed at least above or below the integrated circuit device.

11. The article according to claim 1, wherein at least one of hydrogen and halogen is included in a semiconductor film of the integrated circuit device at a concentration comprised between $1\times10^{19}$ and $5\times10^{20}$ cm$^{-3}$.

12. The article according to claim 1, wherein the integrated circuit device is a thin film integrated circuit, wherein a thickness of the thin film integrated circuit device is comprised between 0.1 and 3 µm.

13. The article according to claim 1, wherein the antenna comprises a material selected from the group consisting of Ag, Au, Al, Cu, Zn, Sn, Ni, Cr, Fe, Go, Ti, and a combination thereof.

14. The article according to claim 1, wherein the resin is a material selected from the group consisting of a photosensitive organic material, a non-photosensitive organic material, and a heat-resistant organic resin.

15. The article according to claim 1, wherein the filler includes a material selected from the group consisting of silica ($SiO_2$), alumina ($Al_2O_3$), boron nitride (BN), magnesia (magnesium oxide), aluminum nitride (AlN), silicon nitride, glass fiber, silicon oxide, carbon fiber, calcium carbonate, talc (talcan), mica, silver powder, copper powder, nickel powder, and copper powder coated with silver.

16. The article according to claim 1, wherein the adhesive material layer includes a material selected from the group consisting of a cyanoacrylate material, a vinyl acetate resin emulsion, a rubber material, a vinyl chloride resin material, a vinyl acetate solution material, an epoxy material, and a hot-melt (thermal melting type) material.

17. The article according to claim 6, wherein the separator includes a material selected from the group consisting of paper, synthetic paper, plastic, PET, polypropylene, polyethylene, polystyrene, nylon, and an inorganic material.

18. An article comprising:
    a substrate;
    an antenna over the substrate;
    an integrated circuit device operationally connected to the antenna;
    a connecting pad operationally connecting the antenna and the integrated circuit;
    a filling layer provided around the antenna; and
    a wiring operationally connecting the integrated circuit device and the antenna,
    wherein an anisotropic conductive film is included in a connection between the integrated circuit device and the connecting pad,
    wherein a resin is used as the filling layer, and
    wherein a filler is included in the filling layer.

19. The article according to claim 18, wherein the integrated circuit device is a thin film integrated circuit device comprising a thin film transistor.

20. The article according to claim 18, wherein a coefficient of thermal expansion of the filling layer including the filler is less than or equal to twice a coefficient of thermal expansion of a conductive material of the antenna.

21. The article according to claim 1, wherein the filler is included in the integrated circuit device.

22. The article according to claim 18, wherein the filler is included in the integrated circuit device.

23. The article according to claim 1 further comprising a non-conductive adhesive material between the integrated circuit device and a substrate of the antenna.

24. The article according to claim 18 further comprising a non-conductive adhesive material between the integrated circuit device and a substrate of the antenna.

* * * * *

UNITED STATES PATENT AND TRADEMARK OFFICE
CERTIFICATE OF CORRECTION

PATENT NO.         : 7,728,734 B2                                    Page 1 of 1
APPLICATION NO. : 12/336611
DATED              : June 1, 2010
INVENTOR(S)        : Yasuyuki Arai et al.

It is certified that error appears in the above-identified patent and that said Letters Patent is hereby corrected as shown below:

On the face of the patent, under OTHER PUBLICATIONS the following duplicative listing should be deleted:

"Nikkei Electronics, *"Sense of Crisis" is a trigger. Ignited evolution of a sesame-grain sized chip*, Nov. 18, 2002, pp. 67-76."

On the face of the patent, under OTHER PUBLICATIONS the following duplicative listing should be deleted:

"EP     0 607 709 A1     7/1994

EP     0 607 709 B1     7/1994"

At column 36, line 51, "IDE" should be --IDF--;

At column 39, line 56, "IDE" should be --IDF--;

At column 39, line 58, "IDE" should be --IDF--;

At column 39, line 64, "IDE" should be --IDF--;

At column 40, line 34, "IDE" should be --IDF--;

At claim 13, column 41, line 54, "Go" should be --Co--.

Signed and Sealed this

Ninth Day of November, 2010

David J. Kappos
*Director of the United States Patent and Trademark Office*